United States Patent
Deneroff et al.

(10) Patent No.: US 6,751,698 B1
(45) Date of Patent: Jun. 15, 2004

(54) MULTIPROCESSOR NODE CONTROLLER CIRCUIT AND METHOD

(75) Inventors: Martin M. Deneroff, Palo Alto, CA (US); Givargis G. Kaldani, San Jose, CA (US); Yuval Koren, San Francisco, CA (US); David Edward McCracken, San Francisco, CA (US); Swami Venkataraman, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/407,428

(22) Filed: Sep. 29, 1999

(51) Int. Cl.[7] .............................................. G06F 13/00
(52) U.S. Cl. ...................................................... 710/317
(58) Field of Search ................................ 710/100, 305, 710/306, 311, 316, 317; 709/238, 218, 249; 712/12; 370/351, 419

(56) References Cited

U.S. PATENT DOCUMENTS

| | | | |
|---|---|---|---|
| 4,330,858 A | 5/1982 | Choquet | 370/111 |
| 4,630,259 A | 12/1986 | Larson et al. | 370/60 |

(List continued on next page.)

FOREIGN PATENT DOCUMENTS

| | | | |
|---|---|---|---|
| EP | 0501524 | 9/1992 | G06F/15/16 |
| EP | 0570729 | 11/1993 | G06F/15/16 |
| WO | 96/37834 | 11/1996 | G06F/9/46 |
| WO | 99/26429 | 5/1999 | H04Q/3/00 |

OTHER PUBLICATIONS

International Search Report for International Application No. PCT/IE95/00047; Date of Completion—Dec. 22, 1995; Authorized Officer—R. Salm.

"Deadlock–Free Routing Schemes on Multistage Interconnection Networks", *IBM Technical Disclosure Bulletin, 35*, 232–233, (Dec., 1992).

"IEEE Standard for Scalable Coherent Interface (SCI)", *IEEE Std 1596–1992*, Table of Contents, (Mar., 1992).

(List continued on next page.)

*Primary Examiner*—Xuan M. Thai
(74) *Attorney, Agent, or Firm*—Schwegman, Lundberg, Woessner & Kluth, P.A.

(57) ABSTRACT

Improved method and apparatus for parallel processing. One embodiment provides a multiprocessor computer system that includes a first and second node controller, a number of processors being connected to each node controller, a memory connected to each controller, a first input/output system connected to the first node controller, and a communications network connected between the node controllers. The first node controller includes: a crossbar unit to which are connected a memory port, an input/output port, a network port, and a plurality of independent processor ports. A first and a second processor port connected between the crossbar unit and a first subset and a second subset, respectively, of the processors. In some embodiments of the system, the first node controller is fabricated onto a single integrated-circuit chip. Optionally, the memory is packaged on plugable memory/directory cards wherein each card includes a plurality of memory chips including a first subset dedicated to holding memory data and a second subset dedicated to holding directory data. Further, the memory port includes a memory data port including a memory data bus and a memory address bus coupled to the first subset of memory chips, and a directory data port including a directory data bus and a directory address bus coupled to the second subset of memory chips. In some such embodiments, the ratio of (memory data space) to (directory data space) on each card is set to a value that is based on a size of the multiprocessor computer system.

31 Claims, 70 Drawing Sheets

U.S. PATENT DOCUMENTS

| | | | | |
|---|---|---|---|---|
| 4,771,391 | A | 9/1988 | Blasbalg | 364/514 |
| 4,811,214 | A | 3/1989 | Nosenchuck et al. | 364/200 |
| 4,868,818 | A | 9/1989 | Madan et al. | 371/11 |
| 4,933,933 | A | 6/1990 | Dally et al. | 370/60 |
| 4,980,822 | A | 12/1990 | Brantley et al. | 364/200 |
| 5,008,882 | A | 4/1991 | Peterson et al. | 370/943 |
| 5,031,211 | A | 7/1991 | Nagai et al. | 379/221 |
| 5,036,459 | A | 7/1991 | Den Haan et al. | 364/200 |
| 5,081,623 | A | 1/1992 | Ainscow | 370/85.4 |
| 5,083,265 | A | 1/1992 | Valiant | 395/800 |
| 5,093,920 | A * | 3/1992 | Agrawal et al. | 712/29 |
| 5,105,424 | A | 4/1992 | Flaig et al. | 370/941 |
| 5,117,350 | A | 5/1992 | Parrish et al. | 395/425 |
| 5,127,092 | A | 6/1992 | Gupta et al. | 395/375 |
| 5,157,692 | A | 10/1992 | Horie et al. | 375/38 |
| 5,161,156 | A | 11/1992 | Baum et al. | 371/7 |
| 5,170,482 | A | 12/1992 | Shu et al. | 395/800 |
| 5,175,733 | A | 12/1992 | Nugent | 370/94 |
| 5,197,130 | A | 3/1993 | Chen et al. | 395/325 |
| 5,201,044 | A | 4/1993 | Frey, Jr. et al. | 395/575 |
| 5,210,705 | A | 5/1993 | Chauvel et al. | 364/572 |
| 5,218,601 | A | 6/1993 | Chujo et al. | 370/16 |
| 5,218,676 | A | 6/1993 | Ben-ayed et al. | 395/200 |
| 5,265,232 | A | 11/1993 | Gannon et al. | 395/425 |
| 5,276,899 | A | 1/1994 | Neches | 395/800 |
| 5,280,474 | A | 1/1994 | Nickolls et al. | 370/60 |
| 5,331,631 | A | 7/1994 | Teraslinna | 370/60 |
| 5,341,504 | A | 8/1994 | Mori et al. | 395/800 |
| 5,347,450 | A | 9/1994 | Nugent | 395/200 |
| 5,365,228 | A | 11/1994 | Childs et al. | 340/825.8 |
| 5,383,191 | A | 1/1995 | Hobgood et al. | 371/112 |
| 5,390,164 | A | 2/1995 | Kremer | 370/16.1 |
| 5,394,528 | A | 2/1995 | Kobayashi et al. | 395/325 |
| 5,434,846 | A | 7/1995 | Tremel et al. | 30/13 |
| 5,434,995 | A | 7/1995 | Oberlin et al. | 395/550 |
| 5,440,547 | A | 8/1995 | Easki et al. | 370/60 |
| 5,453,978 | A | 9/1995 | Sethu et al. | 370/60 |
| 5,475,858 | A | 12/1995 | Gupta et al. | 395/800 |
| 5,504,874 | A | 4/1996 | Galles et al. | 395/472 |
| 5,509,125 | A | 4/1996 | Johnson et al. | 395/300 |
| 5,533,198 | A | 7/1996 | Thorson | 395/200.15 |
| 5,546,549 | A | 8/1996 | Barrett et al. | 395/309 |
| 5,546,596 | A | 8/1996 | Geist | 395/200.02 |
| 5,583,990 | A | 12/1996 | Birrittella et al. | 395/200.01 |
| 5,590,284 | A | 12/1996 | Crosetto | 395/200.05 |
| 5,592,610 | A | 1/1997 | Chittor | 395/182.02 |
| 5,613,071 | A | 3/1997 | Rankin et al. | 395/200.16 |
| 5,625,836 | A | 4/1997 | Barker et al. | 395/800 |
| 5,634,004 | A * | 5/1997 | Gopinath et al. | 710/317 |
| 5,634,110 | A | 5/1997 | Laudon et al. | 395/472 |
| 5,659,796 | A | 8/1997 | Thorson et al. | 395/200.71 |
| 5,664,151 | A | 9/1997 | Galles et al. | 711/145 |
| 5,669,008 | A | 9/1997 | Galles et al. | 395/800.12 |
| 5,680,576 | A | 10/1997 | Laudon | 395/472 |
| 5,682,479 | A | 10/1997 | Newhall et al. | 395/200.15 |
| 5,701,416 | A | 12/1997 | Thorson et al. | 395/200.11 |
| 5,721,819 | A | 2/1998 | Galles et al. | 395/200.15 |
| 5,721,828 | A * | 2/1998 | Frisch | 709/217 |
| 5,721,921 | A | 2/1998 | Kessler et al. | 395/672 |
| 5,737,628 | A | 4/1998 | Birrittella et al. | 395/800.11 |
| 5,752,258 | A | 5/1998 | Guzovskiy et al. | 711/120 |
| 5,778,437 | A | 7/1998 | Baylor et al. | 711/141 |
| 5,787,477 | A | 7/1998 | Rechtschaffen et al. | 711/141 |
| 5,790,776 | A | 8/1998 | Sonnier et al. | 395/189.08 |
| 5,793,962 | A | 8/1998 | Badovinatz et al. | 395/200.31 |
| 5,794,059 | A * | 8/1998 | Barker et al. | 712/10 |
| 5,802,374 | A | 9/1998 | Gupta et al. | 712/216 |
| 5,864,738 | A | 1/1999 | Kessler et al. | 395/200.69 |
| 5,878,241 | A | 3/1999 | Wilkinson et al. | 395/379 |
| 5,900,015 | A | 5/1999 | Herger et al. | 711/141 |
| 5,915,104 | A | 6/1999 | Miller | 395/309 |
| 5,925,097 | A * | 7/1999 | Gopinath et al. | 709/200 |
| 5,963,746 | A * | 10/1999 | Barker et al. | 712/20 |
| 5,970,510 | A * | 10/1999 | Sher et al. | 711/149 |
| 5,978,578 | A * | 11/1999 | Azarya et al. | 717/100 |
| 5,995,512 | A * | 11/1999 | Pogue, Jr. | 370/419 |
| 6,334,159 | B1 * | 12/2001 | Haupt | 710/6 |
| 6,457,146 | B1 * | 9/2002 | Keen et al. | 714/48 |
| 6,484,220 | B1 * | 11/2002 | Alvarez et al. | 710/46 |
| 6,546,451 | B1 * | 4/2003 | Venkataraman et al. | 710/317 |
| 6,564,277 | B1 * | 5/2003 | Keen et al. | 710/268 |
| 6,578,115 | B2 * | 6/2003 | McCracken et al. | 711/144 |

OTHER PUBLICATIONS

"International Search Report for International Application No. PCT/US95/15483", *Date of completion—Apr. 24, 1996; Authorized Officer—P. Schenkels.*

"Message Routing Systems for Transputer Based Multicomputers", *IEEE Micro, Jun. 13, 1993, No. 3, Los Alamitos, CA.*

Carlile, B.R., "Algorithms and Design: The CRAP APP Shared–Memory System", *COMPCON SPRING '93, San Francisco, CA,* 312–320, (Feb. 22, 1993).

Chaiken, D., et al., "LimitLESS Directories: A Scalable Cache Coherence Scheme", *Proceedings: Fourth International Conference on Architectural Support for Programming Languages and Operating Systems,* Santa Clara, CA, 224–234, (Apr. 8–11, 1991).

Dally, W., "Performance Analysis of k–ary n–cube Interconnection Networks", *IEEE Transactions on Computers, 39(6),* 775–785, (Jun. 1990).

Dally, W., et al., "Deadlock–Free Message Routing in Multiprocessor Interconnection Networks", *IEEE Transactions on Computers, C–36,* 547–553, (May 1987).

Dally, W.J., "Virtual Channel Flow Control", *Pro. 17th International Symposium on Computer Architecture,* pp. 60–68, May 1990.

Farkouh, S.C., "Managing ATM–based Broadband Networks", *IEEE Communications, 31(5),* pp. 82–86, (1993).

Galles, M., "Spider: A High–Speed Network Interconnect", *IEEE Micro,* 34–39, (Jan./Feb. 1997).

Gupta, R., et al., "High speed Synchronization of Processors Using Fuzzy Barriers", *International Journakl of Parallel Programming 19 (1990) Feb., No. 1, New York, US* pp 53–73.

Gustavson, D.B., "The Scalable Coherent Interface and related Standards Projects", *IEEE Micro,* 10–22, (Feb., 1992).

Ioannis, S., et al., "Fine–grain Access Control for Distributed Shared Memory", *8398 ACM SIGPLAN Notices,* 297–306, (Nov. , 1994).

Ishihata, H., et al., "Architecture of Highly Parallel AP1000 Computer", *Scripta Technica, Inc.,* Systems and Computers in Japan 24, No. 7,, pp. 69–76, (1993).

Laudon, J., et al., "The SGI Origin: A ccNUMA Highly Scalable Server", *ISCA,* 1–11, (1997).

Lenoski, D., et al., "The Directory–Based Cache Coherence Protocol for the DASH Multiprocessor", *Proceedings: The 17th Annual International Symposium on Computer Architecture,* Seattle, Washington, 148–159, (May 28–31).

Lenoski, D., et al., "The Stanford Dash Multiprocessor", *Computer, 25,* 63–79, (Mar. 1992).

Louri, A., et al., "Scalable optical hypercube–based interconnection network for massively parallel computing", *Applied Optics, 33 (32),* 7588–7598, (Nov. 10, 1994).

Malluhi, Q.M., et al., "The Hierarchical Hypercube: A New Interconnection Topology for Massively Parallel Systems", *IEEE Transactions on Parallel and Distributed Systems, 5* (*1*), 17–30, (Jan. 1994).

Papamarcos, M.S., et al., "A Low–Overhead Coherence Solution for Multiprocessors with Private Cache Memories", *Proceedings: The 11th Annual International Symposium on Computer Architecture*, Ann Arbor, Michigan, 348–354, (Jun. 5–7, 1984).

Scott, S., "Optimized Routing in the Cray T3D", 281–294, (May 16, 1994).

Scott, S., "The SCX Channel: A New, Supercomputer–Class System Interconnect", *Hot Interconnects III*, Abstract, pp. 1–11, (Aug. 1–11, 1995).

Scott, S.L., et al., "Performance of Pruning–Cache Directories for Large–Scale Multiprocessors", *IEEE Transactions on Parallel and Distributed Systems*, vol. 4, No. 5, pp. 520–534, (1993).

\* cited by examiner

Source (and Sometimes Supplemental) Field Format

Control Signal Usage 741/747

| Control Signal | Binary Value | Description |
| --- | --- | --- |
| Xsel [4:2] | | Specifies local destination unit within *Bedrock*: |
| | 000 | Processor Interface 0 |
| | 001 | Memory/Directory |
| | 010 | IO Interface |
| | 011 | Local Block |
| | 100 | Processor Interface 1 |
| | 101-110 | Reserved |
| | 111 | Network Interface (internal only) |
| RqRp [1]a | 0 1 | Request Reply |
| Tail [0] | 0 1 | Not last frame of message Is last frame of message | a. The value of this bit matches the most significant bit of the message's virtual channel.

(TABLE 1)

FIG. 7F

DeviceID Encoding 743

| Source[2:0] or Suppl[2:0] | Unit |
| --- | --- |
| 000 | Processor Interface 0, Processor 0 |
| 001 | Processor Interface 0, Processor 1 |
| 010 | Real Time/GBR IO |
| 011 | Normal I/O |
| 100 | Processor Interface 1, Processor 0 |
| 101 | Processor Interface 1, Processor 1 |
| 110-111 | Reserved |

Note that setting Source[2] or Suppl[2] to 0 results in four SN0-compatible encodings.

(TABLE 2)

FIG. 7G

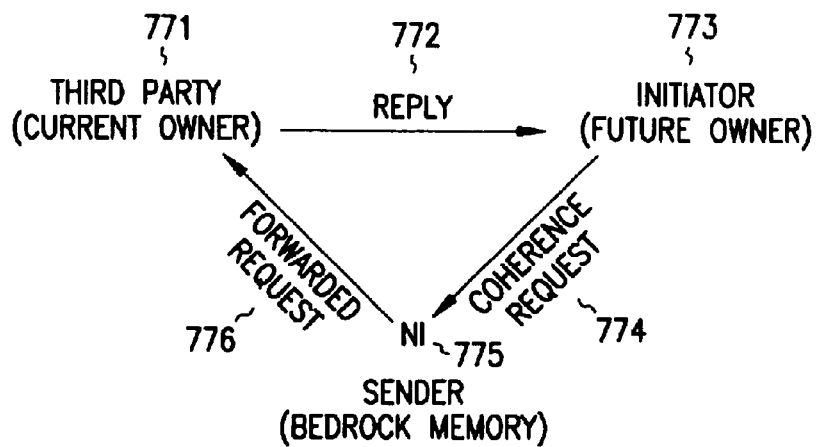

TERMINOLOGY FOR DESCRIBING CONTENT OF SOURCE FIELD HEADER

FIG. 7H

| Command (Abbreviation) - 745 | Source | Suppl. |
|---|---|---|
| Coherent Read Shared (RDSH) | Init[10:0] | Rsrv[10:3], Priority[2:0] |
| Shared Response (SRESP) | Init[10:0] | Rsrv[10:0] |
| Shared Acknowledge (SACK) | Send[10:3], Init[2:0] | Rsrv[10:0] |
| Shared Reply (SRPLY) | Send[10:3], Init[2:0] | Rsrv[10:0] |
| Shared Speculative Reply (SSPEC) | Send[10:3], Init[2:0] | Rsrv[10:0] |
| Coherent Read Exclusive (RDEX) | Init[10:0] | Rsrv[10:3], Priority[2:0] |
| Exclusive Response (ERESP) | Init[10:0] | Rsrv[10:0] |
| Exclusive Acknowledge (EACK) | Send[10:3], Init[2:0] | Rsrv[10:0] |

Internal *Bedrock* Message Source and Supplemental Fields (TABLE 3)

FIG. 7I

| Command (Abbreviation) | Source | Suppl. |
|---|---|---|
| Exclusive Reply Complete (ERPC) | Send[10:3], Init[2:0] | Rsrv[10:0] |
| Exclusive Reply (ERPLY) | Send[10:3], Init[2:0] | AckCnt[10:2], Rsrv[1:0] |
| Exclusive Spec. Reply (ESPEC) | Send[10:3], Init[2:0] | Rsrv[10:0] |
| Coherent Read (READ) | Init[10:0] | Rsrv[10:3], Priority[2:0] |
| Uncached Read Shared (RSHU) | Init[10:0] | Rsrv[10:3], Priority[2:0] |
| Uncached Read Exclusive (REXU) | Init[10:0] | Rsrv[10:3], Priority[2:0] |
| Uncached Response (URESP) | Send[10:3], Init[2:0] | Rsrv[10:0] |
| Uncached Acknowledge (UACK) | Send[10:3], Init[2:0] | Rsrv[10:0] |
| Uncached Reply Complete (URPC) | Send[10:3], Init[2:0] | Rsrv[10:0] |
| Uncached Reply (URPLY) | Send[10:3], Init[2:0] | AckCnt[10:2], Rsrv[1:0] |
| Upgrade (UPGRD) | Init[10:0] | Rsrv[10:3], Priority[2:0] |
| * Upgrade Ack. Complete (UPC) | Send[10:3], Init[2:0] | Rsrv[10:0] |
| Upgrade Acknowledge (UPACK) | Send[10:3], Init[2:0] | AckCnt[10:2], Rsrv[1:0] |
| Access Error Acknowledge (AERR) | Send[10:3], Init[2:0] | Rsrv[10:0] |
| Poison Acknowledge (PERR) | Send[10:3], Init[2:0] | Rsrv[10:0] |
| Directory Error Acknowledge (DERR) | Send[10:3], Init[2:0] | Rsrv[10:0] |

Internal *Bedrock* Message Source and Supplemental Fields (TABLE 3 CONTINUED)

FIG. 7J

| Command (Abbreviation) | Source | Suppl. |
|---|---|---|
| Partial Read Error Acknowledge (PRERR) | Send[10:3], Init[2:0] | Rsrv[10:0] |
| Writeback (WB) | Init[10:0] | Rsrv[10:0] |
| * Ownership Relinquish (RLQSH) | Init[10:0] | Rsrv[10:0] |
| Writeback Excl. Ack. (WBEAK) | Send[10:3], Init[2:0] | Rsrv[10:0] |
| Writeback Busy Ack. (WBBAK) | Send[10:3], Init[2:0] | Rsrv[10:0] |
| Write Error Acknowledge (WERR) | Send[10:3], Init[2:0] | Rsrv[10:0] |
| Partial Write Error Acknowledge (PWERR) | Send[10:3], Init[2:0] | Rsrv[10:3], WRB[2:0] |
| Ownership Transfer (XFER) | Owner[10:0] | Rsrv[10:0] |
| Shared Transfer (SXFER) | Owner[10:0] | Rsrv[10:0] |
| Shared Trans. w Writeback (SXWB) | Owner[10:0] | Rsrv[10:0] |
| Ownership Purge (PURGE) | Owner[10:0] | Rsrv[10:0] |
| Own. Purge w Writeback (PGWB) | Owner[10:0] | Rsrv[10:0] |
| Downgrade (DNGRD) | Owner[10:0] | Rsrv[10:0] |
| Sharing Writeback (SHWB) | Owner[10:0] | Rsrv[10:0] |
| Intervene Shrd. Uncached (IRSHU) | Init[10:0] | Target[10:0] |
| Intervene Excl. Uncached (IREXU) | Init[10:0] | Target[10:0] |
| Intervene Shared (IRDSH) | Init[10:0] | Target[10:0] |
| Intervene Exclusive (IRDEX) | Init[10:0] | Target[10:0] |
| Intervene Remove (IRMVE) | Init[10:0] | Target[10:0] |
| Invalidate Request (INVAL), (no bit vector) | Init[10:0] | Rsrv[10:2],TRex/ BCast[1:0] |
| Local Invalidate Request (LINVAL) (has bit vector) | Init[10:0] | Rsrv[10:1], DirMode |

Internal *Bedrock* Messag Source and Supplemental Fields (TABLE 3 CONTINUED)

FIG. 7K

| Command (Abbreviation) | Source | Suppl. |
|---|---|---|
| Invalidate Acknowledge (IVACK) | Send[10:3], Init[2:0] | Rsrv[10:0] |
| Negative Acknowledge (NACK or DNACK) | Send[10:3], Init[2:0] | Rsrv[10:0] |
| Write Invalidate (WINV) | Init[10:0] | Rsrv[10:3], Priority[2:0] |
| Write Inv. Ack. Complete (WIC) | Send[10:3], Init[2:0] | Rsrv[10:0] |
| Write Inv. Acknowledge (WACK) | Send[10:3], Init[2:0] | AckCnt[10:2], Rsrv[1:0] |
| Write Inv. Spec. Ack (WSPEC) | Send[10:3], Init[2:0] | Rsrv[10:0] |
| Remove Acknowledge (RACK) | Send[10:3], Init[2:0] | Rsrv[10:0] |
| Backoff Intervene Shared (BRDSH) | Send[10:3], Init[2:0] | Target[10:0] |
| Backoff Intervene Excl. (BRDEX) | Send[10:3], Init[2:0] | Target[10:0] |
| Backoff Intervene Rem. (BRMVE) | Send[10:3], Init[2:0] | Target[10:0] |
| Backoff Intervene Unc. (BRSHU) | Send[10:3], Init[2:0] | Target[10:0] |
| Backoff Intervene Unc. (BREXU) | Send[10:3], Init[2:0] | Target[10:0] |
| Backoff Invalidate (BINV) | Send[10:3], Init[2:0] | Rsrv[10:1], DirMode |
| Partial Read (PRDH, PRDI, PRDM, PRDU, PRDB are types HSpec, IO Space, MSpec, Uncached memory, & barrier space) | Init[10:0] | ByteEn[10:3], Rsrv[2:0] |
| Partial Read Retry (PRIRA, PRIRB) | Init[10:0] | ByteEn[10:3], Rsrv[2:0] |

Internal *Bedrock* Message Source and Supplemental Fields (TABLE 3 CONTINUED)

FIG. 7L

| Command (Abbreviation) | Source | Suppl. |
|---|---|---|
| Partial Read Retry Head (PRIHA, PRIHB) | Init[10:0] | ByteEn[10:3], Rsrv[2:0] |
| Partial Read Neg. Ack. (PNKRA, PNKRB) | Send[10:3], Init[2:0] | ByteEn[10:3], Rsrv[2:0] |
| Partial Read Reply (PRPLY) | Send[10:3], Init[2:0] | Rsrv[10:0] |
| Partial Write (PWRH, PWRI, PWRM, PWRU, PWRB are types HSpec, IO Space, MSpec, Uncached memory, & barrier space) | Init[10:0] | ByteEn[10:3], WRB[2:0] |
| Partial Write Retry (PWIRA, PWIRB) | Init[10:0] | ByteEn[10:3], WRB[2:0] |
| Partial Write Retry Head (PWIHA, PWIHB) | Init[10:0] | ByteEn[10:3], WRB[2:0] |
| Partial Write Neg. Ack. (PNKWA, PNKWB) | Send[10:3], Init[2:0] | ByteEn[10:3], WRB[2:0] |
| Partial Write Acknowledge (PACK) | Send[10:3], Init[2:0] | Rsrv[10:3], WRB[2:0] |
| Partial Write Ack. Norm. (PACKN) | Send[10:3], Init[2:0] | Rsrv[10:3], WRB[2:0] |
| Partial Write Ack. Head (PACKH) | Send[10:3], Init[2:0] | Rsrv[10:3], WRB[2:0] |
| WRB Timeout Error (WTERR) PI internal message | Rsrv[10:0] | Rsrv[10:0] |
| RRB Timeout Error (RTERR) PI internal message | Rsrv[10:0] | Rsrv[10:0] |
| Network Barrier (BAR) | Rsrv[10:0] | Rsrv[10:0] |
| Graphics Block Write (GFXWL) | Init[10:0] | Rsrv[10:0] |
| Graphics Doubleword Write (GFXWS) | Init[10:0] | ByteEn[10:3], Rsrv[2:0] |
| Graphics Block Credit (GFXCL) | IGFX0/1 (II register) | Rsrv[10:0] |

Internal *Bedrock* Message Source and Supplemental Fields (TABLE 3 CONTINUED)

FIG. 7M

| Command (Abbreviation) | Source | Suppl. |
|---|---|---|
| Graphics Doubleword Credit (GFXCS) | IGFX0/1 (II register) | Rsrv[10:0] |
| Spool Write Reply (SPRPLY) | Init[10:0] | Rsrv[10:0] |
| Error Reply for Spool Write (ESPRPLY) | Init[10:0] | Rsrv[10:0] |
| Peer to Peer Write (PTPWR) | Init[10:0] | |
| Peer to Peer Credit (PRPCR) | Send[10:3], Init[2:0] | |
| Vector PIO Read (VRD) | Init[10:0] | PIO_ID, LB_VECTOR_PARMS reg. |
| Vector PIO Write (VWR) | Init[10:0] | PIO_ID, LB_VECTOR_PARMS reg. |
| Vector PIO Read Reply (VRPLY) | Init[10:0] | PIO_ID (echo from VRD) |
| Vector PIO Write Ack. (VWACK) | Init[10:0] | PIO_ID (echo from VWR) |
| Vector PIO Address Error (VERRA) | Init[10:0] | PIO_ID (echo from VRD/VWR) |
| Vector PIO Command Error (VERRC) | Init[10:0] | PIO_ID (echo from VRD/VWR) |
| Vector PIO Command & Address Errors (VERRCA) | Init[10:0] | PIO_ID (echo from VRD/VWR) |

Internal *Bedrock* Message Source and Supplemental Fields (TABLE 3 CONTINUED)

FIG. 7N

XB *Xsel* Encoding

| Xsel[2:0] | Unit |
|---|---|
| 000 | Processor Interface 0 |
| 001 | Memory/Directory |
| 010 | IO Interface |
| 011 | Local Block |
| 100 | Processor Interface 1 |
| 101-110 | Reserved |
| 111 | Network Interface (internal only) |

(TABLE 4)

FIG. 70

XB BLOCK DIAGRAM OF XB 279

POQ/PI Interface Signals

| Direction | Name | Description | Notes |
|---|---|---|---|
| PI to POQ | RqValid | Write Request to POQ | Valid for a single-cycle flit |
| | RpValid | Write Reply to POQ | RqValid, RpValid mutually exclusive. |
| | RevVal | Revison message Value/indicator. | Asserted with the Header. |
| | Xsel[2:0] | Encoded xbar destination. | |
| | Tail | Message tail bit. | Asserted with the last message cycle. |
| | Data[66:0] | Header or data interface. | |
| POQ to PI | RqWrFree | One request buffer entry is freed | Only for Write. |
| | RpFree | One reply buffer entry is freed | Any Read or Write. |

(TABLE 18)

FIG. 8A

PIQ/PI Interface Signals

| Direction | Name | Description |
|---|---|---|
| PIQ to PI | RqAvail | Valid request data is available (for 1 flit) |
| | RpAvail | Valid reply data is available (for 1 flit) |
| | RqData[66:0] | Request Data. |
| | RpData[66:0] | Reply Data. |
| | RqTail | Request data is a Tail flit. |
| | RpTail | Reply data is a Tail flit. |
| | RpCnt[5:0] | Current number of entries in PIQ |
| PI to PIQ | RqReady | Read top of Request queue, if not empty. |
| | RpReady | Read top of Reply queue, if not empty. |

(TABLE 18)
FIG. 8B

MOQ/MD Interface Signals

| Direction | Name | Description | Notes |
|---|---|---|---|
| MD to MOQH | HdrRq{P0,P1,NI,II,LI} | Request header to arrive *next* cycle, targeting the specified unit. | HdrRq* signals are mutually exclusive. |
| | HdrRp{P0,P1,NI,II,} | Reply header (data transfer if DataInHdr was asserted with previous header) or to arrive *next* cycle, targeting the specified unit. | ditto for HdrRp* |
| | HdrTail | Tail bit for *next* cycle header. | |
| | DataInHdr | Data associated with *next* cycle header will be written into MOQH. | Only used with DW replies (implicit for data-bearing requests). |
| | DwOffset | Identifies which bank of MOQD contains the doubleword response associated with *next* cycle header. | 0: dataEven, 1: dataOdd Must be held at 0 for cacheline data replies. |
| | Abort | Abort message initiated by previous cycle HdrRq/Rp*. Current cycle contents of Hdr interface are ignored. | |
| | AE | Previous cycle header encountered an Access Error and should be dropped. | Only used for NI-bound headers. |
| | Hdr[66:0] | Valid header interface. | |
| MD to MOQD | DataValid[2:0] | One-hot MOQ select, directs MD control outputs to a particular MOQD. Valid flit on data interface *next cycle*. | [0]: PIO, [1]: PII, [2]: MMQ. Reply channel only. |
| | DataTail | Asserted with valid for last flit of data. | |
| | Uce | Uncorrectable error tag, per quadword, valid with the data. | Uce is forwarded unmodified by the MOQ. |
| | Data[127:0] | Valid data interface, {dataEven, dataOdd} | |
| MOQ to MD | HdrRqFree[2:0] | Request header flit forwarded. [2:0] represents one bit per MOQ. | Hdr(Rq,Rp)Free from any MOQ are mutually exclusive. |
| | HdrRpFree[2:0] | Reply header flit forwarded. One bit per MOQ. | |
| | DataFree[2:0] | Data flit forwarded to xbar. One bit per MOQ. | Quadword (QW) or QW aligned doubleword. |
| MOQ to MD | AEValid | Combined with AE to qualify HdrRpFree from MOQ | just as MOQ_NI_AEValid |
| MOQ to NI | AEValid | Combined with AE to qualify DataValid from XB | see table 12 and figure 12 |

(TABLE 20)

FIG. 9A

XB/MD Interface Signals

| Direction | Name | Description |
|---|---|---|
| XB to MD | DataValidP0Rq | Valid single-cycle request flit from PI 0. |
| | DataValidP1Rq | Valid single-cycle request flit from PI 1. |
| | DataValidMiscRq | Valid single-cycle request flit from NI/II/LB. |
| | DataValidRp | Valid single-cycle reply flit from any source. |
| | DataTail | Tail signal asserted with last cycle of a message. |
| | Data[66:0] | Valid header or data interface. |
| MD to XB | P0RqFull | PI 0 request channel full. |
| | P0RqFullIn1 | PI 0 request space available for 1 transfer (single header or 2 clocks of data). |
| | P1RqFull | PI 1 request queue full. |
| | P1Rq1FullIn1 | PI 1 request queue full in 1. |
| | MiscRqFull | Misc (NI/II/LB) request queue full. |
| | MiscRqFullIn1 | Misc (NI/II/LB) request queue full in 1. |
| | RpFull | Reply queue full (any source). |
| | RpFullIn1 | Reply queue full in 1 (any source). |

(TABLE 21)

FIG. 10A

NOQ/NI Interface Signals

| Direction | Name | Description | Notes |
|---|---|---|---|
| NI to NOQ | Valid[3:0] | Valid flit *next cycle* on one-hot encoded virtual channel. | One cycle header or two consecutive data cycles. Virtual channel encoding matches Router Network, 0,1=rq, 2,3=rp. |
| | Xsel[2:0] | Encoded msg destination | Asserted with Valid. |
| | Size[1:0] | Encoded msg size. | Asserted with Valid. Encoding matches Router Network. |
| | Tail | Message tail bit. | Asserted with Valid. |
| | Squash | Current header or data transfer should be dropped. | Indicates CRC error from LLP, active a cycle after Valid[3:0]. |
| | Data[66:0] | Valid header or data interface. | UCE bit only sampled with first data cycle. |
| NOQ to NI | Free[3:0] | Single flit buffer freed on one-hot encoded virtual channel. | Single cycle pulse = header or two clock data. |

(TABLE 22)

FIG. 11A

XB/NI Interface Signals

| Direction | Name | Description |
|---|---|---|
| XB to NI | DataValid | One clock header (+ dead) or two consecutive clocks of data. |
| | DataVch | Encoded virtual channel, 0=Rq, 1=Rp. Active with DataValid |
| | DataTail | Tail bit, arrives with first cycle of 2 cycle transfer. |
| | Data[66:0] | Valid header or data interface. |
| MOQ to NI | AEValid | Combined with AE to gate DataValid. |
| MD/DB to NI | AE | Combined with AEValid to gate DataValid. |
| NI to XB | Full[1:0] | Per virtual channel flow control, no space available. |
| | FullIn1[1:0] | Per virtual channel, space available for at most 1 transfer (single header or 2 clocks of data). |

(TABLE 23)

FIG. 11B

LOQ/LB Interface Signals

| Direction | Name | Description |
|---|---|---|
| LB to LOQ | RqAvail | Valid request header or single cycle data. |
| | RpAvail | Note: Rq/RpAvail are mutually exclusive. |
| | Xsel[2:0] | Encoded destination. |
| | Tail | Asserted with Avail for the last transfer in a message. |
| | Data[66:0] | Header or doubleword data. |
| LOQ to LB | RqReady | Request channel flow control. |
| | RpReady | Reply channel flow control. |

(TABLE 24)

FIG. 12A

LIQ/LB Interface Signals

| Direction | Name | Description |
|---|---|---|
| LIQ to LB | RqAvail | Request available. |
| | RqTail | Tail associated with RqData. |
| | RqData[66:0] | Request header/data interface. |
| | RpValid | Reply available. |
| | RpTail | Tail associated with RpData. |
| | RpData[66:0] | Reply header/data interface. |
| LB to LIQ | RqReady | When asserted with RqAvail, request interface flit is consumed. |

(TABLE 25)

FIG. 12B

IOQ/II Interface Signals

| Direction | Name | Description | Notes |
|---|---|---|---|
| II to IOQ | RqValid | Valid Request to IOQ | Valid for a single-cycle flit |
| | RpValid | Valid Reply to IOQ | RqValid, RpValid mutually exclusive. |
| | Xsel[2:0] | Encoded xbar destination. | |
| | Tail | Message tail bit. | Asserted with the last message cycle. |
| | Data[66:0] | Header or data interface. | |
| IOQ to II | RqFree | One request entry has been freed | |
| | RpFree | One reply entry has been freed | |

(TABLE 26)

FIG. 12C

IIQ/II Interface Signals

| Direction | Name | Description |
|---|---|---|
| IIQ to II | RqAvail | Valid request data is available (for 1 flit) |
| | RpAvail | Valid reply data is available (for 1 flit) |
| | RqData[66:0] | Request Data. |
| | RpData[66:0] | Reply Data. |
| | RqTail | Request data is a Tail flit. |
| | RpTail | Reply data is a Tail flit. |
| II to IIQ | RqReady | Read top of Request queue, if not empty. |
| | RpReady | Read top of Reply queue, if not empty. |

(TABLE 27)

FIG. 12D

Sample Bypass Arbiter Interface Signals

| Direction | Name | Description |
|---|---|---|
| MOQ to BypArb | MObypP0[1:0] | [0],[1]=rq,rp. Request and reply bypass bits are mutually exclusive. |
| | MObypP1[1:0] | |
| | MObypNI[1:0] | |
| | MObypII[1:0] | |
| | MObypLJ | Request channel only |
| | MObypT | Tail bit of bypass flit |
| BypArb to MOQ | MObypGnt | Virtual channel of bypass grant is implied by the requesting virtual channel. |

(TABLE 28)
FIG. 13

Sample Wavefront Arbiter Interface Signals

| Direction | Name | Description |
|---|---|---|
| MOQ to WFArb | MOarbP0[1:0] | [0],[1]=rq,rp. Request and reply bits can be asserted simultaneously. |
| | MOarbP1[1:0] | |
| | MOarbNI[1:0] | |
| | MOarbII[1:0] | |
| | MOarbLI | Request channel only |
| | MOarbT | Tail bit of head-of-queue flit. |
| WFArb to MOQ | MOgnt[1:0] | Grant bits are mutually exclusive. |

(TABLE 29)
FIG. 15A

Channels for Requesting Input Queues

|  |  | Input Queues | | | | | |
|---|---|---|---|---|---|---|---|
|  |  | MI | NI | II | PO | PI | LI |
| PO | [1] rp | y | y | y | y | y |  |
|  | [0] rq | y | y | y | y | y | y |
| PI | [1] rp | y | y | y | y | y |  |
|  | [0] rq | y | y | y | y | y | y |
| MO | [1] rp |  | y | y | y | y |  |
|  | [0] rq |  | y | y | y | y | y |
| NO | [3] rp | y |  | y | y | y | y |
|  | [2] rp | y |  | y | y | y | y |
|  | [1] rq | y |  | y | y | y | y |
|  | [0] rq | y |  | y | y | y | y |
| IO | [1] rp | y | y | y | y | y |  |
|  | [0] rq | y | y | y | y | y | y |
| LO | [1] rp |  | y | y | y | y |  |
|  | [0] rq |  | y |  | y | y |  |

(TABLE 30)

FIG. 16A

SIGNALS FOR REQUESTING INPUT QUERIES

| Signal | Description |
|---|---|
| From P0 (PI_0): | |
| P0arbMI[1:0] | [1] = reply, [0] = req |
| P0arbNI[1:0] | |
| P0arbII[1:0] | |
| P0arbPI[1:0] | |
| P0arbLI | PIO request/invalidate channel |
| From P1 (PI_1): | |
| Signal | Description |
| same as P0 | |
| From MD: | |
| M0arbNI[1:0] | [1] = reply, [0] = req |
| M0arbII[1:0] | |
| M0arbP0[1:0] | |
| M0arbP1[1:0] | |
| M0arbLI | invalidates |
| From NI: | |
| N0arbMI[3:0] | [3] = rep1, [2] = rep0, [1] = req1, [0] = req0 |
| N0arbII[3:0] | |
| N0arbP0[3:0] | |
| N0arbP1[3:0] | |
| N0arbLI[3:0] | |
| From II: | |
| I0arbMI[1:0] | [1] = reply, [0] = req |
| I0arbNI[1:0] | |
| I0arbII[1:0] | |
| I0arbPI[1:0] | |
| I0arbLI | PIO request channel: interrupts, invalidates |
| From LB: | |
| L0arbNI[1:0] | [1] = reply, [0] = req (incl. vectors) |
| L0arbPI[1:0] | |
| L0arbP0[1:0] | |
| L0arbII | reply only (INVCNT) |
| For Input Queues (IQs): | |
| all | [1] = reply; [0] = request |

(TABLE 31)

FIG. 17A

XB Cell Count

| Description | Organization | Bits x Words | Cells |
|---|---|---|---|
| POQ0 | 64 RQ + 64 RP | 128x67 LPRA | 17738 |
| PIQ0 | 64 RQ + 64 RP | 128x67 LPRA | 17738 |
| POQ1 | 64 RQ + 64 RP | 128x67 LPRA | 17738 |
| PIQ1 | 64 RQ + 64 RP | 128x67 LPRA | 17738 |
| POQ0 - control | 64 RQ + 64 RP | 128x5, 3 port LPRA | 3168 |
| POQ1 - control | 64 RQ + 64 RP | 128x5, 3port LPRA | 3168 |
| 3 x MOQ Headers | 4 RQ + 12 RP | 16x67 LPRA | 3x 4428 |
| 3 x MOQD Bank 0 | 48 RP | 24x65 LPRA | 3x 4947 |
| 3 x MOQD Bank 1 | - | 24x64 LPRA | 3x 4947 |
| MD IQ Headers | 12 RQ + 4 RP | 16x67 LPRA | 4018 |
| MD IQ Bank 0 | 96 RQ + 32 RP | 64x65 LPRA | 9696 |
| MD IQ Bank 1 | - | 64x65 LPRA | 9696 |
| NOQ Bank 0 | 64 RQ + 64 RP | 64x65 LPRA | 9696 |
| NOQ Bank 1 | (32 in 0, 32 in 1) | 64x64 LPRA | 9696 |
| NOQ - control | 64 RQ + 64 RP | 64x5 LPRA | 1320 |
| LOQ | 4 RQ + 4 RP | 8x67 LPRA | 3348 |
| LIQ | 32 RQ | 32x68 LPRA | 5978 |
| IOQ | 64 RQ + 64 RP | 128x67 LPRA | 17738 |
| IOQ - control | 64 RQ + 64 RP | 128x5, 3 port LPRA | 3168 |
| IIQ | 64 RQ + 64 RP | 128x67 LPRA | 17738 |
|  |  | Total Cells -> | 212,346 |

(TABLE 32)

FIG. 22

PI Overview

SysAD SPEEDS FOR SOME TRex SPEEDS AND CLOCK DIVISORS

|         | Div = 2 | Div = 2.5 | Div = 3 | Div = 3.5 |
|---------|---------|-----------|---------|-----------|
| TRex @ 300 | 150 | 120 | - | - |
| TRex @ 350 | 175 | 140 | - | - |
| TRex @ 360 | 180 | 144 | - | - |
| TRex @ 390 | 195 | 156 | 130 | - |
| TRex @ 400 | 200 | 160 | 133 | - |
| TRex @ 450 | 225 | 180 | 150 | 129 |

(TABLE 33)

PI Address/Data Path Diagram

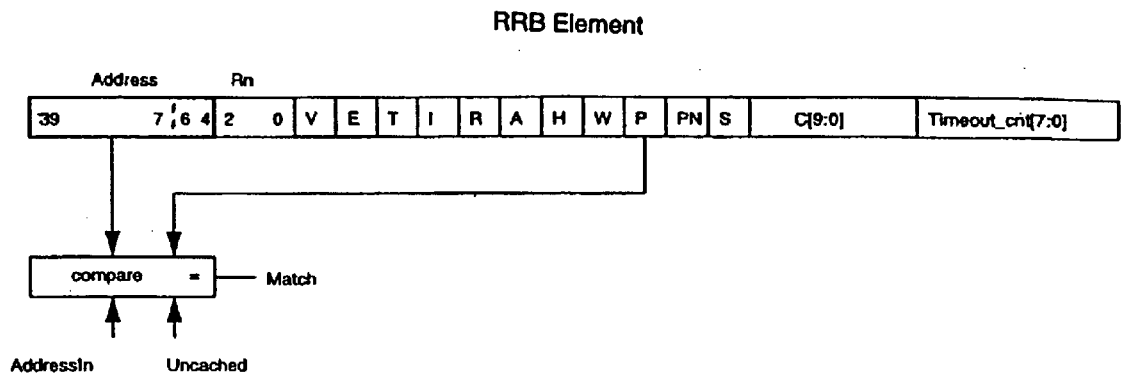

FIG. 25

RRB Status Bits

| RRB Status Bit | Description |
|---|---|
| V | coherent Valid |
| E | 0 - Coherent block read shared<br>1 - Coherent block read exclusive<br>2 - Upgrade<br>3 - Noncoherent block read |
| T | Target of and incoming intervention |
| I | target of an incoming Invalidate |
| R | Response data given to TRex |
| A | data Acknowledge received |
| H | gatHering invalidates |
| W | Waiting for write to complete |
| P | Partial valid (double, single or partial word read) |
| PN | processor Number |
| S | Spool write issued |
| C[9:0] | For UPACK and ERPLY messages the C field is loaded with the Ack-count. For IVACK messages, the C-field is decremented. |

(TABLE 34)

FIG. 25A

WRB Element

WRB Status Bits

| WRB Status Bit | Description |
|---|---|
| V | coherent Valid |
| T | Target of an incoming intervention |
| W | received a WBBAK |
| P | Partial valid (double, single or partial word write) |
| PN | processor Number |
| S | Spool write issued |

(TABLE 35)

IRB Element
IRBA Entry
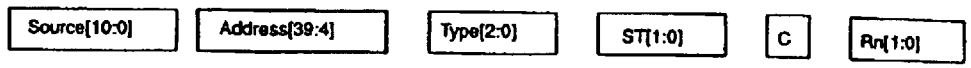
| Type | | State | |
|---|---|---|---|
| IRSHU | 0 | 0 - INV | |
| IREXU | 1 | 1 - SH | IRBB's |
| IRDSH | 2 | 2 - CEX | Request number |
| IRDEX | 3 | 3 - DEX | IRBB Complete |
| IRMVE | 4 | | |
| INVAL | 6 | | |
| * INVALB | 5 | | |
IRBB Entry
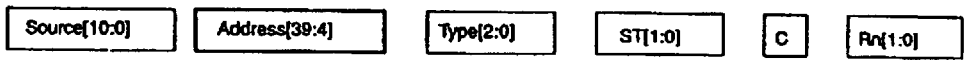
IRBA's
Request number
IRBA Complete
* An invalidate broadcast to both T5s
FIG. 28

*TRex* Generated Requests

| *TRex* Requests | Buffer | Outbound Request Message Type |
|---|---|---|
| Coherent block read shared | RRB (E=0) | RDSH or READ |
| Coherent block read exclusive | RRB (E=1) | RDEX |
| Noncoherent block read | RRB (E=3) | RSHU |
| Double, single, or partial word read | RRB (P=1) | PRDH, PRDI, PRDM, PRDU, PRDB |
| Cached block write | WRB | WB |
| Uncached accelerated block write | none | GFXWL |
| Double, single, or partial word write | WRB (P=1) (WRB is not allocated if command is GFXWS) | PWRH, PWRI, PWRM, PWRU, PWRB, GFXWS |
| Upgrade | RRB (E=2) | UPGRD |

(TABLE 36)

FIG. 29A

RRB requests for WRB conflicts

| TRex Command | SysCmd[4:3] | E and P | Request if no conflict | re-issued Request |
|---|---|---|---|---|
| coherent block read exclusive data typical or data LL/LLD or data prefetch access | 1, 2 or 3 | E=1 | RDEX | RDEX |
| coherent block read shared instruction or prefetch access | 0 or 3 | E=0 | RDSH | RDSH |
| coherent block read shared data typical or data LL/LLD access | 1 or 2 | E=0 | READ | RDSH |
| noncoherent block read | any | E=3 | RSHU | RSHU |
| upgrade | 1, 2 or 3 | E=2 | UPGRD | can't happen |
| double, single or partial word read | any | P=1 | PRD | can't happen |

(TABLE 37)
FIG. 29B

Outbound Request Format

| Source[10:0] | Supplemental [10:0] | Command [7:0] | Address[39:3] | Xsel[2:0] | Data |
|---|---|---|---|---|---|
| {NodeID[7:0], PI_Num, 1'b0, Proc_Num} | {Unused[10:3], Priority[2:0]} | READ, RDSH, RSHU, RDEX, UPGRD | Target Cacheline + quad-word index | MD or NI | None |
| {NodeID[7:0], PI_Num, 1'b0, Proc_Num} | {Byte Select[10:3], Unused[2:0]} | PRDB, PRDI, PRDH, PRDM, PRDU | Address[39:3] | MD, NI, PI, LI or II | None |
| {NodeID[7:0], PI_Num, 1'b0, Proc_Num} | Unused[10:0] | RQLSH | Target Cacheline A[6:3] = 0000 | MD or NI | None |
| {NodeID[7:0], PI_Num, 1'b0, Proc_Num} | Unused[10:0] | WB | Target Cacheline A[6:3] = 0000 | MD or NI | 128Bytes |
| {NodeID[7:0], PI_Num, 1'b0, Proc_Num} | {Unused[10:3], WRB[2:0]} | GFXWL | Address[39:3] | NI or II | 128Bytes |
| {NodeID[7:0], PI_Num, 1'b0, Proc_Num} | {Byte Select[10:3], WRB[2:0]} | PWRB, PWRI, PWRH, PWRM, PWRU, GFXWS | Address[39:3] | MD, NI, PI, LI or II | 8Bytes |
| {NodeID[7:0], PI_Num, 1'b0, Proc_Num} | Ivn_Target[10:0] | IRDSH, IRSHU, IRDEX | Target Cacheline + quad-word index | NI, PI or II | None |
| {NodeID[7:0], PI_Num, 1'b0, Proc_Num} | {Unused[10:4], Coarse,Oct[2:0]} | INVAL (multi-cast) | Target Cacheline | LI | 8Bytes (Vector) |

(TABLE 38)

FIG. 29C

Incoming Reply Action Template

| Comments | SysAD (1, 2 and 3) | SysResp (4) | Outgoing Request FIFO (5) |
|---|---|---|---|
| Single Event | Data$_L$ | | |
| | | {Ack, Nack, Err} | MsgValid |
| Multiple Events | Data | {Ack, Err} | |
| | Data$_N$ | Nack | |
| | IssueHeld | {Ack, Nack} | |
| | Data$_N$ [IssueHeld] | Ack | [MsgValid] |
| | Data$_L$ [IssueHeld] | Ack | MsgValid |
| | Data$_L$ | | |
| Error Status Store | INT | | PWR |
| Notes: select one item in { } an repeat row for each item, item in [ ] is optional | | | |

(TABLE 39)

FIG. 29D

SysAD Arbitration for a TRex External Block Data Response

DIMM CONFIGURATIONS

| DIMM CONFIG | PHYSICAL BANKS | CHIP WIDTH | # OF CHIPS PER DIMM | DIMM CAPACITY | TOTAL MEMORY CAPACITY | SDRAM GEN |
|---|---|---|---|---|---|---|
| | | MEMORY DirStd (DirPrem) | | | | |
| BEDROCK-32 | 1<br>1(1) | 16<br>16(16) | 5<br>1(1) | 32MB | 64MB – 256MB | 64 Mbit |
| BEDROCK-64 | 2<br>1(2) | 16<br>16(16) | 10<br>1(2) | 64MB | 128MB – 512MB | 64 Mbit |
| BEDROCK-128 | 2<br>1(2) | 8<br>16(16) | 18<br>1(2) | 128MB | 256MB – 1GB | 64 Mbit |
| BEDROCK-256a | 2<br>1(2) | 4<br>8(8) | 36<br>2(4) | 256MB | 512MB – 2GB | 64 Mbit |
| BEDROCK-256b | 2<br>1(2) | 8<br>16(16) | 18<br>1(2) | 256MB | 512MB – 2GB | 128 Mbit |
| BEDROCK-256c | 2<br>1(2) | 16<br>16(16) | 10<br>1(2) | 256MB | 512MB – 2GB | 256 Mbit |
| BEDROCK-512a | 2<br>1(2) | 4<br>8(8) | 36<br>2(4) | 512MB | 1GB – 4GB | 128 Mbit |
| BEDROCK-512b | 2<br>1(2) | 8<br>16(16) | 18<br>1(2) | 512MB | 1GB – 4GB | 256 Mbit |
| BEDROCK-1024 | 2<br>1(2) | 4<br>8(8) | 36<br>2(4) | 1GB | 2GB – 8GB | 256 Mbit |

(TABLE 58)

FIG. 32A

Bedrock Standard Memory DIMM

Bedrock Premium Memory DIMM

Address Translation

| Use | Address Bits |
| --- | --- |
| DIMM | 32,31 (31 in N mode) |
| Physical | 30 |
| Logical | 8,7 |
| RAS | 26-14 |
| CASMem | 29^28,28^27,27^26,13-9,6-4 |
| CASDir | x,29^28,28^27,27^26,D,13-9,x |
| CASProt | x,29^28,28^27,27^26,P,P,Rgn |
| CASCount | x,29^28,28^27,27^26,P,C,xxxxx |

(TABLE 59)

FIG. 34A

MD Incoming Messages

| Messages | Class |
|---|---|
| READ, RDSH, RDEX, RSHU, REXU | Full Cacheline Read Request |
| WINV, WB | Full Cacheline Write Request |
| UPGRD | Coherency Request |
| PRDH, PRDM, PRDU | Partial Read Request |
| PWRH, PWRM, PWRU | Partial Write Request |
| SXWB, PGWB, SHWB | Full Cacheline Write Replies |
| XFER, SXFER, PURGE, DNGRD | Revision Replies |

(TABLE 60)

FIG. 34B

| Message | Class |
|---|---|
| SRPLY, SSPEC, ERPC, ERPLY, ESPEC, URPC, URPLY, URESP, SRESP, ERESP | Full Cacheline Reply |
| PRPLY | Doubleword Reply |
| WIC, WACK, WSPEC, UPACK, WBEAK, WBBAK, PACK | Positive Acknowledgement Reply |
| DNACK | Negative Acknowledgement Reply |
| AERR, PERR, WERR, PRERR, PWERR, DERR | Error Acknowledgement Reply |
| BRDSH, BRDEX, BINV, BRMVE, BRSHU, BREXU | Backoff Reply |
| IRDSH, IRDEX, INVAL, IRMVE, IRSHU, IREXU | Request |

(TABLE 61)

FIG. 34C

Network Interface Data Path Diagram

Sideband Bits

| Error? | Tail? | SB[7] | SB[6] | SB[5] | SB[4] | SB[3] | SB[2] | SB[1] | SB[0] |
|---|---|---|---|---|---|---|---|---|---|
| No | No | 0 | 0 | Vcr1 | Vcr0 | Cr1 | Cr0 | Vch1 | Vch0 |
| No | Yes | 0 | 1 | Vcr1 | Vcr0 | Cr1 | Cr0 | Vch1 | Vch0 |
| Yes | No | 1 | 0 | 0 | 0 | Vcr0 | Cr0 | Vch1 | Vch0 |
| Yes | Yes | 1 | 1 | 0 | 0 | Vcr0 | Cr0 | Vch1 | Vch0 |
| No | No | 1 | 0 | 0 | 0 | 0 | R | Vch1 | Vch0 |
| No | Yes | 1 | 0 | 0 | 0 | 1 | R | Vch1 | Vch0 |
| Yes | No | 1 | 1 | 0 | 1 | 0 | R | Vch1 | Vch0 |
| Yes | Yes | 1 | 1 | 0 | 1 | 1 | R | Vch1 | Vch0 |
|  |  | 1 | 1 | 1 | 1 | Vcr1 | Vcr0 | Cr2 | Cr1 | Cr0 |

Credit / No Credit / Credit Only

Legend

| | |
|---|---|
| Vcr 1 | Virtual Channel # to credit, MSB |
| Vcr 0 | Virtual Channel # to credit, LSB |
| Cr 1 | Credit value, MSB |
| Vch 1 | Virtual Channel # of this micropacket, MSB |
| R | Reserved |

Message Sideband Encoding (accompanies each micropacket)

FIG. 40

Bedrock to SN1 Router Connections

MULTIPROCESSOR NODE CONTROLLER CIRCUIT AND METHOD

CROSS-REFERENCES TO RELATED INVENTIONS

This invention is related to application Ser. No. 09/408,874, filed Sep. 29, 1999, entitled "MODULAR COMPUTING ARCHITECTURE HAVING COMMON COMMUNICATION INTERFACE", application Ser. No. 09/408,084, filed Sep. 29, 1999, entitled "TRANSLATION OF PCI LEVEL INTERRUPTS INTO PACKET BASED MESSAGES FOR EDGE EVENT DRIVE MICROPROCESSORS", application Ser. No. 09/522,695, filed Mar. 10, 2000, entitled "SYSTEM AND METHOD FOR A HIERARCHICAL SYSTEM MANAGEMENT ARCHITECTURE OF A HIGHLY SCALABLE COMPUTING SYSTEM", which is a continuation of application Ser. No. 09/407,429, filed Sep. 29, 1999, entitled "HIERARCHICAL SYSTEM MANAGEMENT ARCHITECTURE FOR A HIGHLY SCALABLE COMPUTING SYSTEM", U.S. Pat. No. 6,516,372, issued Feb. 4, 2003, entitled "PARTITIONING A DISTRIBUTED SHARED MEMORY MULTIPROCESSOR COMPUTER TO FACILITATE SELECTIVE HARDWARE MAINTENANCE", application Ser. No. 09/408,972, filed Sep. 29, 1999, entitled "NETWORK TOPOLOGY FOR A SCALABLE MULTIPROCESSOR SYSTEM", application Ser. No. 09/407,421, filed Sep. 29, 1999, entitled "TRANSFER ATTRIBUTE ENCODING WITHIN AN ADDRESS ON A BUS", application Ser. No. 09/408,778, filed Sep. 29, 1999, entitled "AGE-BASED NETWORK ARBITRATION SYSTEM AND METHOD", U.S. Pat. No. 6,085,303, issued Jul. 4, 2000, entitled "SERIALIZED, RACE-FREE VIRTUAL BARRIER NETWORK", U.S. Pat. No. 6,230,252, issued May 8, 2001, entitled "HYBRID HYPERCUBE/TORUS ARCHITECTURE", U.S. Pat. No. 5,970,232, issued Oct. 19, 1999, entitled "ROUTER TABLE LOOKUP MECHANISM", application Ser. No. 08/971,184 filed Nov. 17, 1997 entitled "MULTI-DIMENSIONAL CACHE COHERENCE DIRECTORY STRUCTURE", and U.S. Pat. No. 6,101,181, issued Aug. 8, 2000, entitled "VIRTUAL CHANNEL ASSIGNMENT IN LARGE TORUS SYSTEMS" all of the above of which are hereby incorporated by reference.

FIELD OF THE INVENTION

The present invention relates to methods and apparatus for parallel multiprocessor computer systems and more specifically to a multiprocessor node-controller circuit and method.

BACKGROUND OF THE INVENTION

Multiprocessor (MP) systems are computing systems comprised of a few or up to hundreds or thousands of processing elements (PEs). While the power of a multiple-instruction multiple-data (MIMD) MP computer system lies in its ability to execute independent threads of code simultaneously, the inherently asynchronous states of the PEs (with respect to each other) makes it difficult in such a system to enforce a deterministic order of events when necessary. Program sequences involving interaction between multiple PEs such as coordinated communication, sequential access to shared resources, controlled transitions between parallel regions, etc., may require synchronization (such as barrier and/or eureka synchronization) of the PEs in order to assure proper execution. One such invention having routers, networks, and synchronization apparatus and methods is described further in copending U.S. Pat. No. 6,085,303, issued Jul. 4, 2000, entitled "SERIALIZED, RACE-FREE VIRTUAL BARRIER NETWORK".

Some MP systems having symmetric distributed multiprocessors use a coherent model of cache. One such system is described in application Ser. No. 08/971,184 filed Nov. 17, 1997 entitled "MULTI-DIMENSIONAL CACHE COHERENCE DIRECTORY STRUCTURE".

There is a need in the art for an improved node controller apparatus and method to improve communications between various portions of an MP system. Further, there is a need for a node controller that will "scale well" providing excellent performance-cost benefits for both small and large systems. Further, there is a need for a node controller that has very high flexibility, performance and speed.

SUMMARY OF THE INVENTION

The present invention provides a method and apparatus that facilitates highly parallel processing. The present invention includes a node controller usable in both small and large multiprocessor systems, and that provides superior performance-cost benefits across a large range of system prices and capabilities. In some embodiments, this node controller is implemented on a single chip that provides two or more processor ports, each supporting single-processor and/or multiprocessor subsystems (each optionally including local cache memories), as well as one or more of the following port types: input/output (I/O), memory, directory, and network interface.

Traditionally, distributed multiprocessors are built using a separate directory controller along with a memory controller, connected to the network controller, the input/output interface, and processors. In various embodiments of the present invention, the memory controller (that optionally includes a directory controller that provides cache coherence functions) and the I/O controller and the network controller and put them all on one chip that includes a plurality of processor ports. This provides a couple of advantages. First, transmissions between any of the nodes are direct, on chip, and are implemented using a single protocol, so that transmissions do not have to traverse as many chip boundaries. Second, by imbedding all of this onto a single chip, a full crossbar design is utilized inside the chip. This provides non-blocking communication whereby a remote node can talk directly to the local node's memory while the local node is talking to its I/O system with no queuing between those communications. In contrast, on a bus-type system, one of the communications would have to wait for the other to complete. These can go on simultaneously in embodiments of the present invention that use a crossbar. Further, by building all of the stuff into a single chip, it is more cost effective to build a smaller system out of this same architecture because there is not the overhead of having a lot of extra chips to support a large system configuration when one is not building a large system.

A first aspect of the present invention provides a multiprocessor computer system (for example, a small multiprocessor system having only two node controllers connected to one another, or a multiprocessor system having up to hundreds or thousands of node controllers connected together through a router network). One such embodiment of the system includes a first node controller, a second node controller, a first plurality of processors operatively coupled to the first node controller, a second plurality of processors operatively coupled to the second node controller, a first memory operatively coupled to the first node controller, a first input/output system operatively coupled to the first node controller, and an interprocessor communications network operatively coupled between the first node controller and the second node controller. In this embodiment, the first node controller includes: a crossbar unit, a memory port operatively coupled between the crossbar unit and the first memory, an input/output port operatively coupled between the crossbar unit and the first input/output system, a network port operatively coupled between the crossbar unit and the interprocessor communications network, and a plurality of independent processor ports, including a first processor port operatively coupled between the crossbar unit and a first subset of the first plurality of processors, and a second processor port operatively coupled between the crossbar unit and a second subset of the first plurality of processors. In some embodiments of the system, the first node controller is fabricated onto a single integrated-circuit chip.

In some embodiments of the system, the memory is packaged on a plurality of plugable memory/directory cards wherein each card includes a plurality of memory chips including a first subset of memory chips dedicated to holding memory data and a second subset of memory chips dedicated to holding directory data. Further, the memory port includes a memory data port including a memory data bus and a memory address bus coupled to the first subset of memory chips, and a directory data port including a directory data bus and a directory address bus coupled to the second subset of memory chips. In some such embodiments, the ratio of (data space in the first subset of memory chips) to (data space in the second subset of memory chips) on each of the memory/directory cards is set to a value based on a size of the multiprocessor computer system.

In some embodiments of the system, the crossbar unit selectively combines two serially received doublewords of data into a single quadword micropacket for transmission through the crossbar unit, and wherein each doubleword contains at least 64 bits of data and the single quadword contains at least 128 bits of data.

Another aspect of the present invention provides a method usable with one or more of the above described systems. The method includes transmitting data between the memory port and the first processor port, between the memory port and the second processor port, between the memory port and the input/output port, and between the memory port and the network port.

Some embodiments of the method further include transmitting data directly between the first node controller and the second node controller that are directly connected to one another by the interprocessor communications network.

Some embodiments of the method further include transmitting data indirectly between the first node controller and the second node controller through a router chip that is also connected to one or more other node controllers.

BRIEF DESCRIPTION OF THE DRAWINGS

FIG. 7B also shows node controller 75 implemented within a single chip 475.

FIG. 7F shows a table of control signal usages for control field 741 or control field 747.

FIG. 7G shows a device ID encoding for field 743.

FIG. 7H shows terminology used for describing content of the source field in the header of messages for XB 279.

FIGS. 7I, 7J, 7K, 7L, 7M, and 7N show a multi-part table (Table 3) describing internal bedrock message source and supplemental fields.

FIG. 7O is a table (Table 4) of the Xsel select-encodings for XB 279.

FIG. 8A shows a table of POQ/PI interface signals.

FIG. 8B shows a table of PIQ/PI interface signals.

FIG. 9A shows a table of MOQ/MD interface signals.

FIG. 10A shows a table of XB/MD interface signals.

FIG. 11A shows a table of NOQ/NI interface signals.

FIG. 11B shows a table of XB/NI interface signals.

FIG. 12A shows a table of LOQ/LB interface signals.

FIG. 12B shows a table of LIQ/LB interface signals.

FIG. 12C shows a table of IOQ/II interface signals.

FIG. 12D shows a table of IIQ/II interface signals.

FIG. 13 shows a table of sample bypass arbiter interface signals.

FIG. 15A shows a table of sample wavefront arbiter interface signals.

FIG. 16A shows a table of channels for requesting input queues.

FIG. 16B shows a table of signals for requesting input queues.

FIG. 21A shows cell counts for one embodiment of XB 279 showing organization and sizes of various registers and structures in XB 279.

FIG. 25 shows a data structure diagram of a RRB element.

FIG. 25A shows various RRB status bits.

FIG. 28 shows a data structure of one embodiment of an IRB element.

FIG. 29A is a table (Table 36) of T-Rex generated requests.

FIG. 29B is a table (Table 37) of RRB requests for WRB conflicts.

FIG. 29C is a table (Table 38) showing the data format for outbound requests.

FIG. 29D is a table (Table 39) showing the data format for incoming reply actions.

FIG. 32A is a table (Table 58) of DIMM configurations.

FIG. 34A is a table (Table 59) of address translation used.

FIG. 34B is a table (Table 60) of incoming messages for MD 275.

FIG. 34C is a table (Table 61) of outgoing messages for MD 275.

FIG. 40 shows message sideband encoding.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Some embodiments of the present invention include routers, networks, and synchronization apparatus and methods as described further in copending U.S. patent application Ser. No. 08/972,010 filed Nov. 17, 1997, which is hereby incorporated by reference.

Some embodiments implement multiprocessor systems, that generally do not use a coherent cache model. Other embodiments include cache coherence mechanisms and methods such as described in application Ser. No. 08/971, 184 filed Nov. 17, 1997 entitled "MULTI-DIMENSIONAL CACHE COHERENCE DIRECTORY STRUCTURE", which is hereby incorporated by reference. In particular, the present invention provides a node controller that is economic and provides excellent performance when scaled sown as well as when scaled up (i.e., to a large number of processors).

Figure 1:
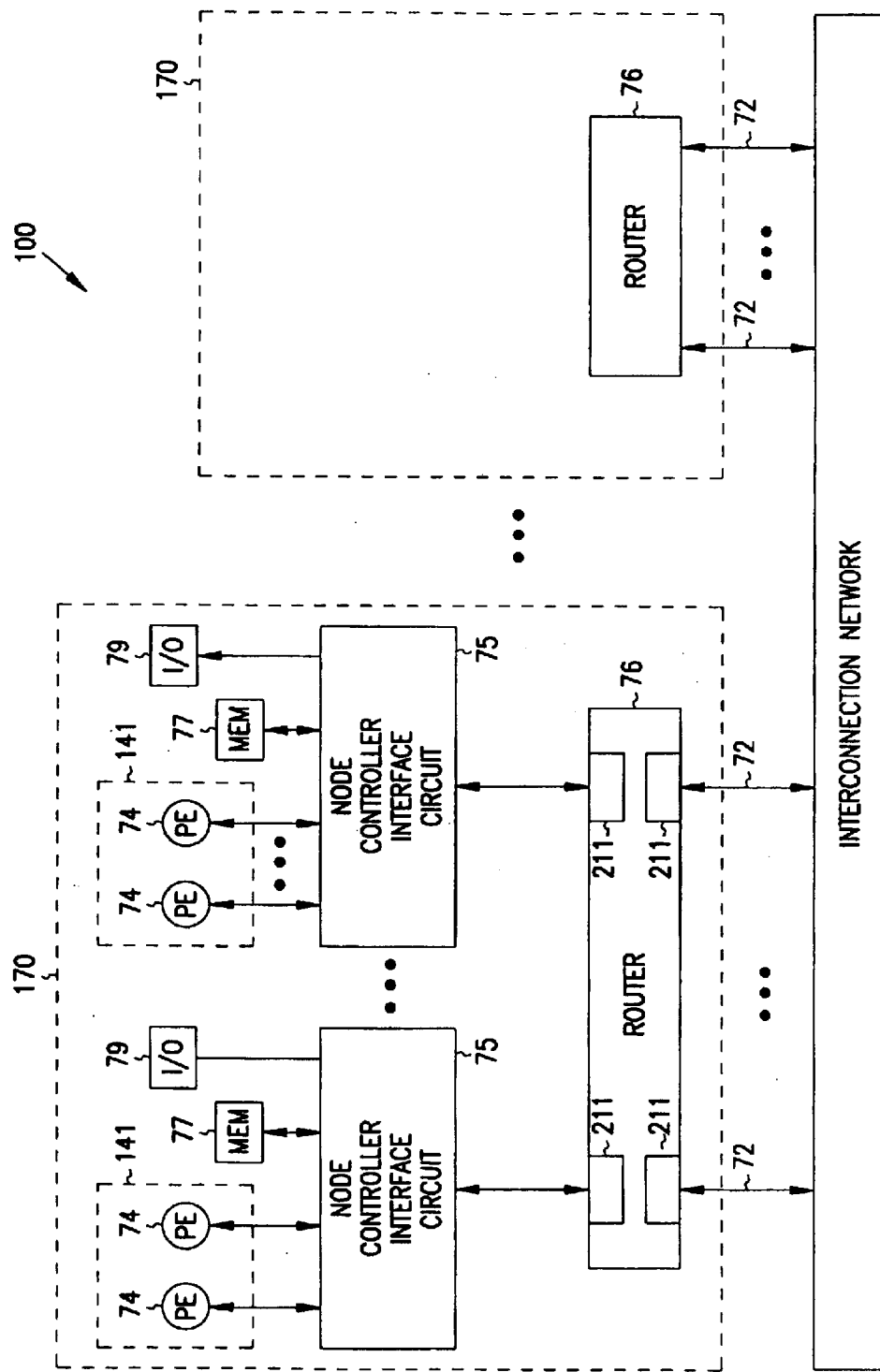
FIG. 1 shows one embodiment of multiprocessor system 100 of the present invention.

FIG. 1 shows one embodiment of multiprocessor computer system 100 of the present invention having one or more node clusters 170, each node cluster 170 having zero to N processors 74, zero to M memories 77, and zero to I input/output (I/O) subsystems 79. Depending on the needs of a user, interconnection network 175 can be set up as a three-dimensional torus, an N-dimensional hypercube, or any other suitable interconnection network between routers 76. In one embodiment, each router 76 includes eight ports 211, wherein each port 211 can be used to either connect to other routers 76, or to one to N node controllers 75 each having zero or more processor elements (PEs) 74. Thus, in some embodiments, a router 76 can be used as just an interconnection node in the network 175 (i.e., a circuit within block 175 rather than within node cluster 170), having no PEs 74 or memory 77 or I/O subsystems 79, and all of its ports are used to connect to other routers 76.

In other embodiments, such as shown in FIG. 1, some of the ports 211 are used to connect to other routers 76 through network 175, and other ports 211 are used to connect, via node controller 75, to a plurality 141 of PEs 74, to memories 77, and to I/O subsystems 79.

Figure 2:
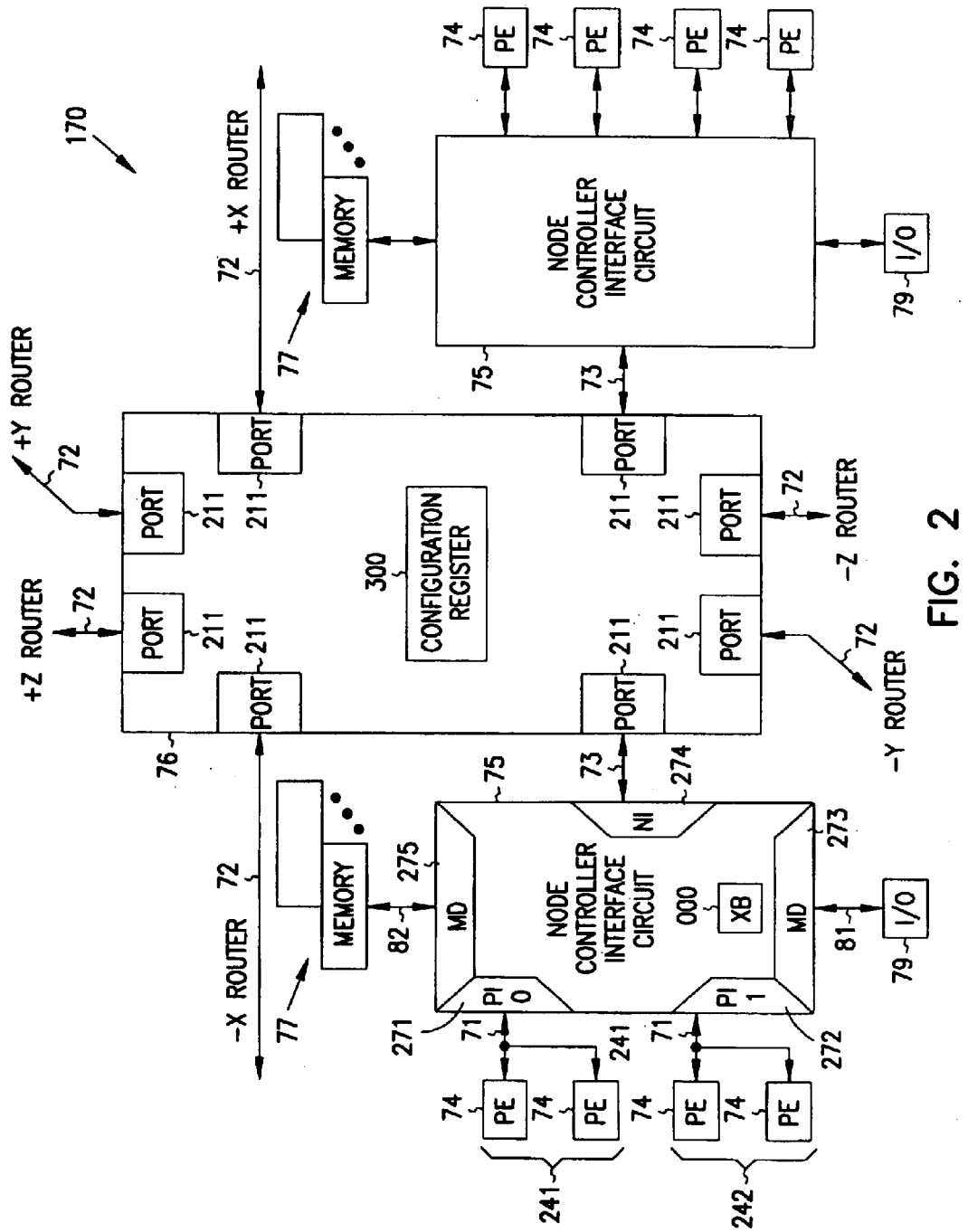
FIG. 2 shows one embodiment of a node cluster 170 having a router 76 with six router connections 72 and eight processors 74, wherein four processors 74 are connected to each of two node controllers 75.

FIG. 2 shows details of one such embodiment of a node cluster 170 having a router 76 with six router connections 72 (i.e., connections to other routers 76), and two node-controller connections 73 (also called channel 73) (i.e., connections to the two node controllers 75 that together connect in turn to eight processor elements 74). One to four PEs 74 connect to each node controller 75, and share a single memory 77 having one or more banks of memory. In some embodiments, each bank includes two or more memory cards accessed in parallel. In some embodiments, each memory card includes separate subsets of memory chips, one subset dedicated to memory data, and another dedicated to directory data (such cards are sometimes called memory/ directory cards). Each node controller 75 optionally connects to an I/O subsystem 79 that provides connections to conventional high-speed I/O ports and devices such as workstations, disk systems, and tape systems, etc.

Figure 4:
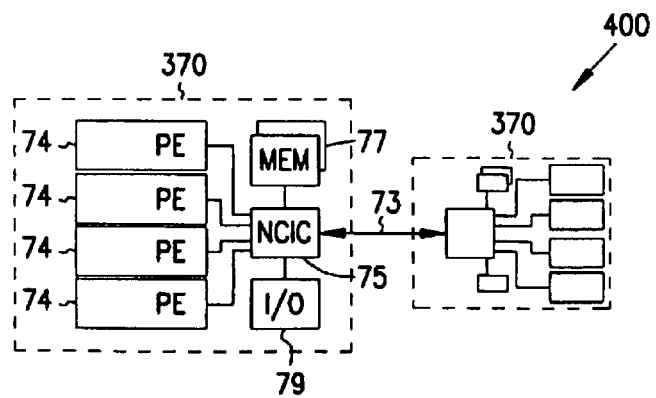
FIG. 4 shows an embodiment of a multiprocessor system 400 having no router chips, but having two node controllers connected to one another.

In one embodiment, each node controller 75 includes up to five interface ports, i.e., PI0 271, PI1 272, II 273, NI 274, and MI 275. Processor port interface 0 (PI0) 271 connects to a first subset 241 of processors 74, processor port interface 1 (PI1) 272 connects to a second subset 242 of processors 74, input/output port interface (II) 273 connects to an input/output system 79, network port interface (NI) 274 connects to either a router 76 as shown in FIG. 2, or to another node controller 75 as shown in FIG. 4 below. Memory interface (MI) 275 connects to memory 77.

Figure 3:
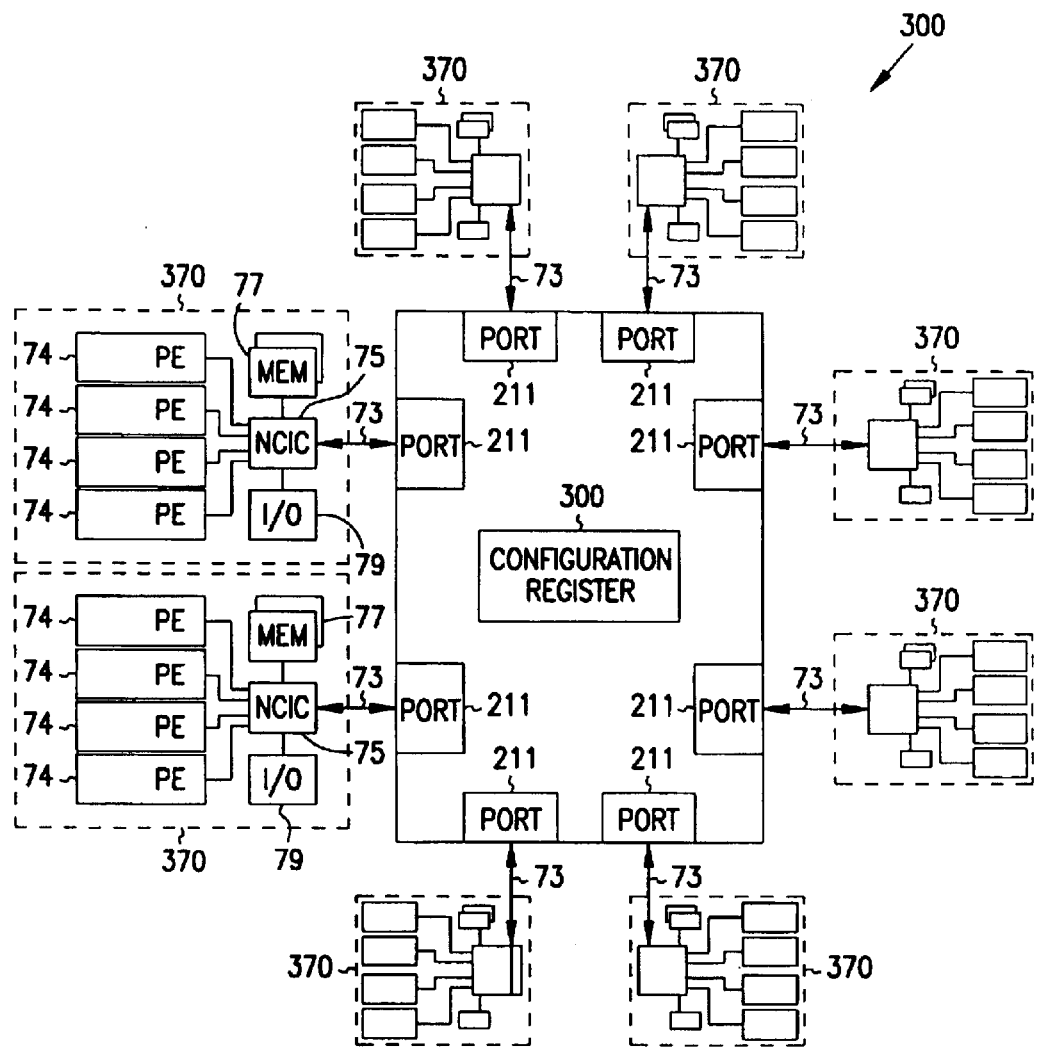
FIG. 3 shows an embodiment of a multiprocessor system 300 having a single router 76.

FIG. 3 shows another embodiment, showing a multiprocessor system 300 having a single node cluster 170 having a single router 76 with no router connections 72, eight node-controller connections (channels) 73 (i.e., connections to the eight node controllers 75 that together connect in turn to thirty-two processors 74). This is the maximum number of PEs 74 for this embodiment of router 76 (which has eight ports 211) and node controller 75 (which can connect to up to four PEs 74). Each port 211 connects to up to one processor cluster 370, and each processor cluster 370 has up to four PEs 74, a shared memory 77 for the PEs 74, and a shared I/O subsystem 79, all connected through one node controller 75. In this embodiment, router 76 is not connected to any other router 76. Of course in other configurations, not all ports 211 need be used, and not all processor clusters 370 need be fully populated with four PEs 74.

FIG. 4 shows an embodiment of a multiprocessor system 400 having no router chips, but having two node controllers 75 connected to one another using a single interprocessor communications channel 73. This embodiment accommodates up to eight processors 74. This is the maximum number of PEs 74 for this embodiment of node controller 75 (each of which can connect to up to four PEs 74). Each node controller 75 connects to up to one other processor cluster 370, and each processor cluster 370 has up to four PEs 74, a shared memory 77 for the PEs 74, and a shared I/O subsystem 79, all connected through one node controller 75. Of course in other configurations, not all processor clusters 370 need be fully populated with four PEs 74, and in still other embodiments, more than eight processors are supported.

System Architecture

Figure 5:
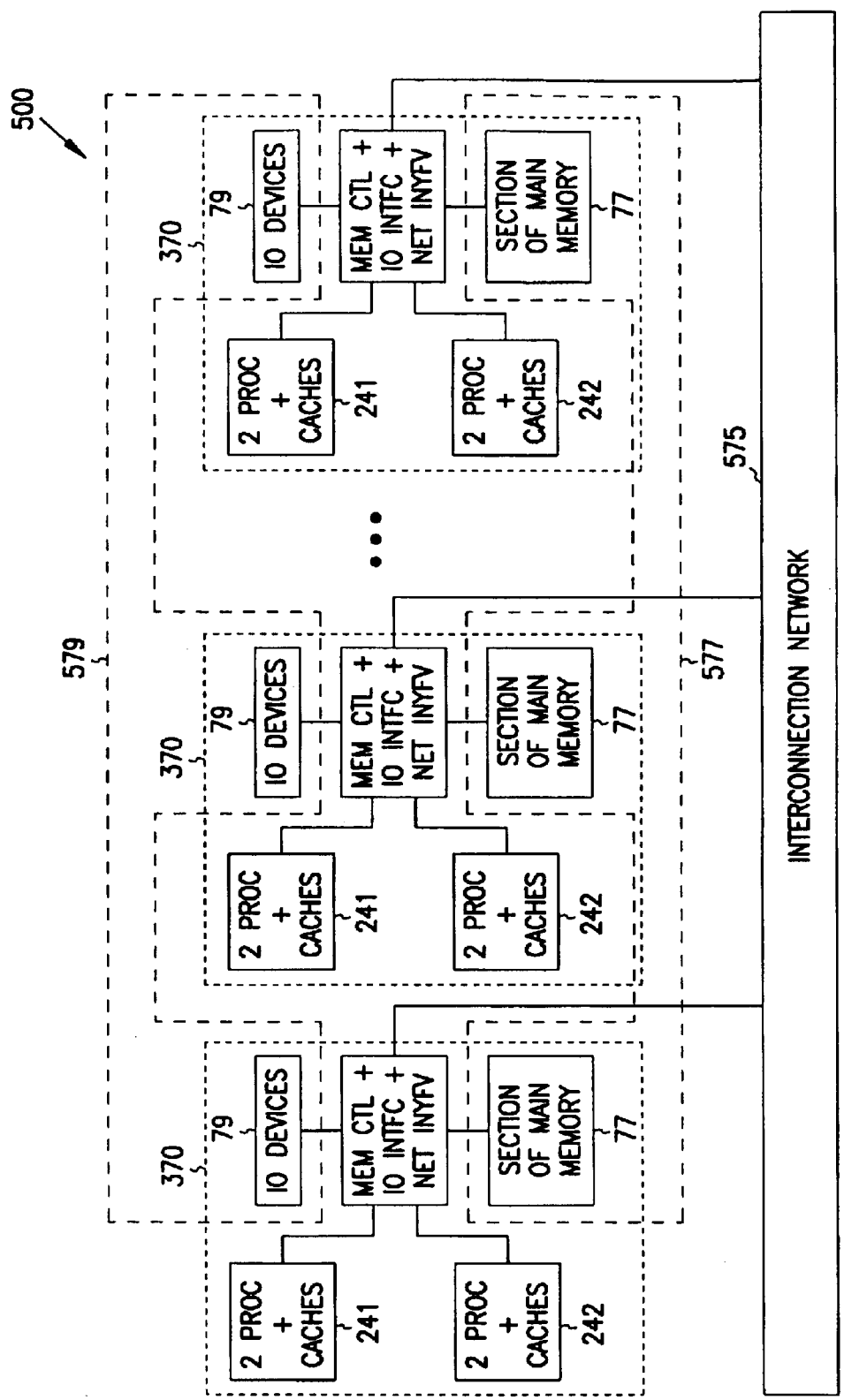
FIG. 5 shows one embodiment of a multiprocessor system 500 of the present invention.

The system architecture of the present invention (sometimes denoted "SN1"), shown in FIG. 5, includes of one or more processor/memory nodes 370 connected with a general interconnect network (also called an interprocessor communications fabric) 575 whose bandwidth scales with the number of processors. In various embodiments, interprocessor communications fabric 575 can be as simple as a single interprocessor communications channel 73 that directly couples two node controllers 75 as shown in FIG. 4, or can include an extensive network connecting many node controllers 75. One such extensive network includes a network of interconnected routers 76 such as shown in FIG. 1, but other embodiments include other interconnection networks such as are well known in the art.

High-level Organization of the SN1 System

The global shared-memory 577 in SN1 is partitioned with a section of memory 77 distributed (i.e., locally connected) to each group of four processors 74. This partitioning provides very low latency for memory allocated close to the processor 74, while the general interconnect provides for global access to all of memory 577 from any processor 74. A directory-based protocol is used to maintain cache coherence over all of global memory 577. Input/output (I/O) 579 within the SN1 system is also partitioned with an I/O interface connection point (II port) 273 on each CPU/Memory node 370. As with the distributed memory 577, every I/O port 273 is addressable from every processor 74.

In one embodiment, each CPU/Memory node 370 is packaged in a "brick" module. Large CPU configurations can be constructed using multiple Node modules. These nodes 370 are connected with links through routers 76, each of which is also packaged in brick. In various embodiments, each node 370 contains up to four T-Rex-type or Merced-type processors 74, memory-directory bank(s) 77 each having some amount of main memory and an associated amount of directory memory, an attachment port 274 for multinode interconnection through the interconnection network (sometimes called CrayLink2), and an II attachment port 273 to the I/O subsystem 79. The interconnection network attachment port is full duplex, 1600 MB/sec in each direction. The I/O attachment port (sometimes called "XTOWN2") is full duplex at 1200 MB/sec but can be slowed down to 800 MB/sec to interface with older I/O devices or graphics components from older SN0 systems.

The attachment port to the CrayLink2 connects to the routing network 175. The routing network 175 is built up from 8-ported router chips 76 that connect to nodes and to each other using cables. The interconnection topology used in the SN1 family is described in the next section.

DIMM Module 600

Figure 6A:
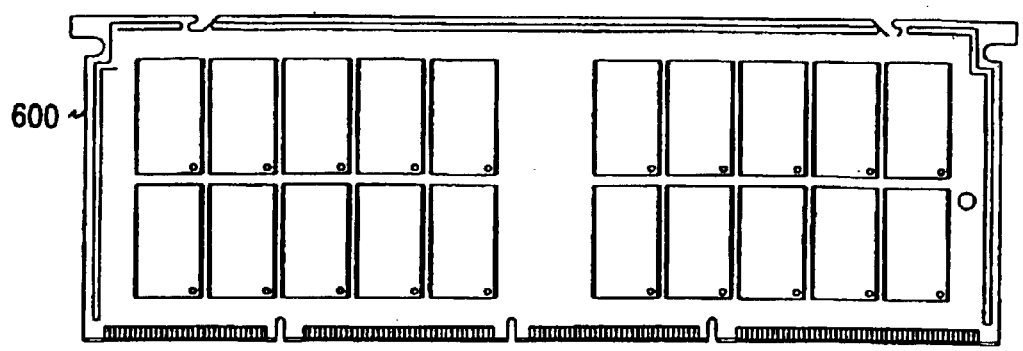
FIG. 6A shows DIMM module 600.

The DIMM module 600 (see FIG. 6A) is a 294-pin-position vertically-plugged PCB (printed circuit board), containing parts for main memory and directory memory.

DIMM Guide Base 671 and Levers 672

Figure 6B:
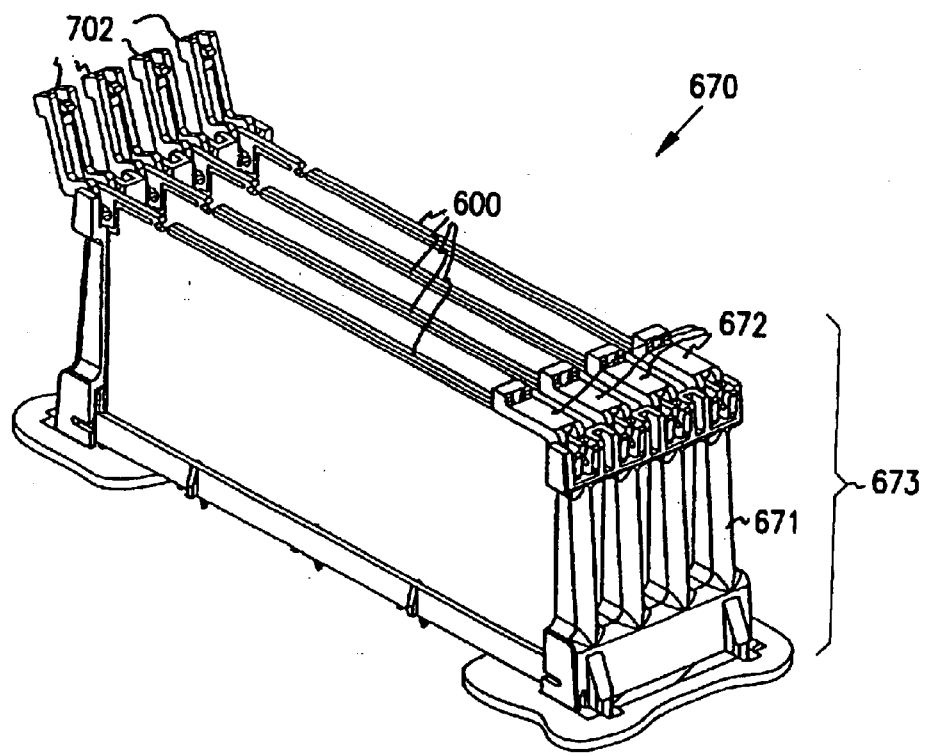
FIG. 6B shows DIMM guide 673 having four DIMM modules 600.

FIG. 6B shows DIMM guide 673 having four DIMM modules 600. Because the DIMM module 600 is extra tall, an external guide/support part 673 is required. The guide 673 supports four modules 600, allows airflow, and provides features for an insertion/extraction mechanism. In one embodiment, one guide design is used at both ends of the DIMM's, as shown in FIG. 6B.

Levers 672 reside on the top of the guide 671. These levers 672 will provide a mechanical advantage in the insertion, ejection, and retention of the DIMM modules 600.

Near-end DIMM latches shown closed in FIG. 6B. Far end latches shown in open state.

In some embodiments, node controller 75 is implemented on a single integrated circuit chip 475 (see FIG. 7B), and in one particular embodiment, on a single chip called "Bedrock." References to Bedrock shall mean this particular embodiment of node controller 75, but other embodiments of the invention are contemplated. In particular, some embodiments contemplated omit certain features described below, and other embodiments replicate features described, or add and delete certain combinations of features.

Overview of the system

Figure 7A:
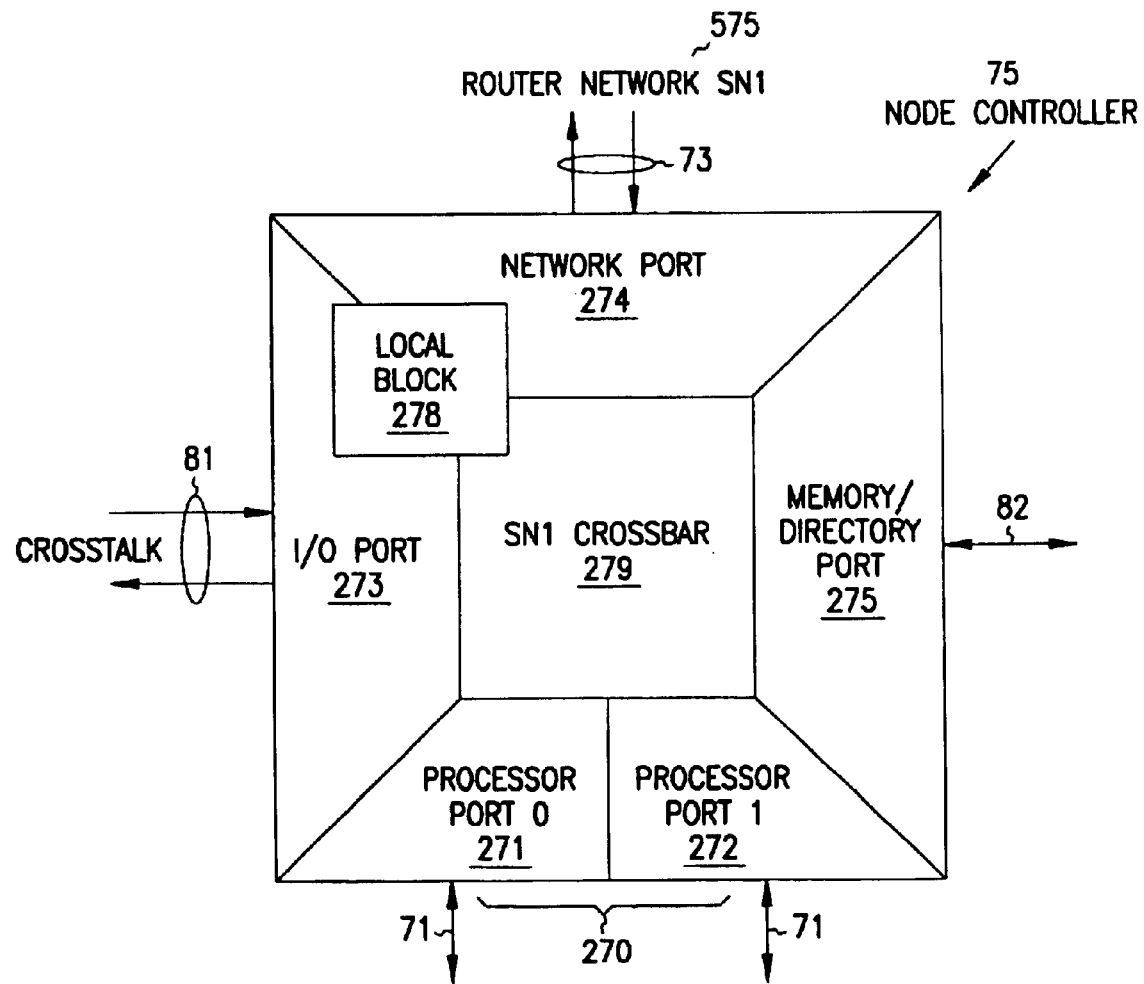
FIG. 7A shows node controller 75 of one embodiment of the present invention.

In one embodiment, the present invention specifies a distributed, shared-memory multiprocessor employing 1 to 4096 processors (although the Bedrock SN1 node implementation of one embodiment supports a maximum of 1024 processors). SN1 fully supports a single address space and provides cache coherence across the entire machine. SN1 is organized into a number of nodes; each node connects the local memory to the processors, provides a port to the Router Network, and a port to the IO subsystem. Bedrock is the first implementation of an SN1 node. Each Bedrock supports up to four T-Rex+ processors, a portion of the global memory, a directory to maintain cache coherence, an interface to the Crosstalk IO subsystem, and an interface to SN1 (SN1Net) Router Network, as shown in FIG. 7A.

Node Controller 275 (Bedrock) Overview

Figure 7B:
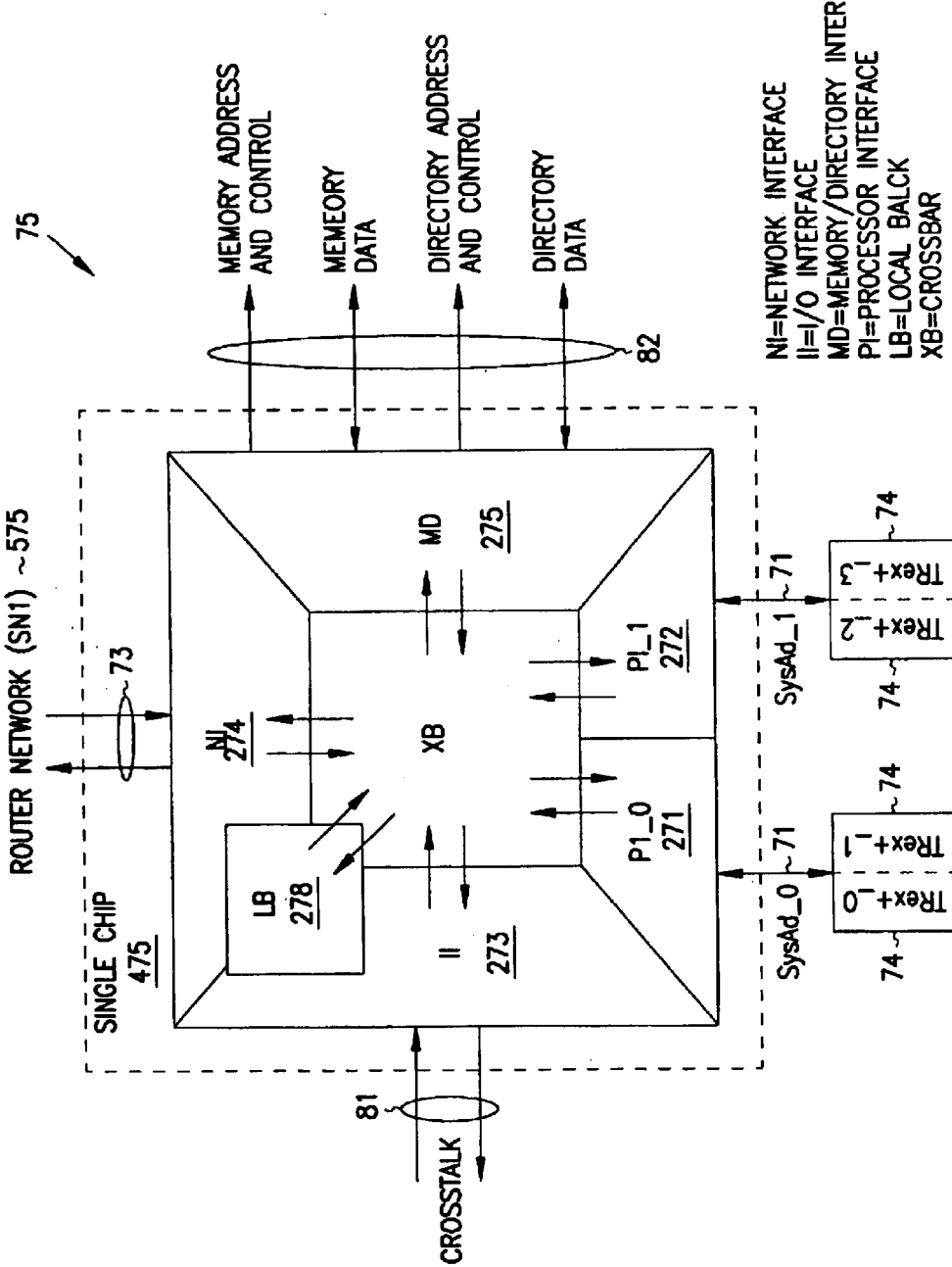
FIG. 7B shows one embodiment node controller 75 further including indications of the flow of data into and within node controller 75.

The Bedrock chip provides connectivity between four types of external interfaces and an interface to local chip resources. Each of the interfaces is managed by a subdivision of the Bedrock known as a unit. The units' names derive from the interfaces they manage: the IO interface unit (II), the network interface unit (NI), the memory/directory interface unit (MD), the two processor interface units (PI_0 and PI_1), and the local block (LB). The units are connected by a central crossbar (XB), as shown in FIG. 7B. Bedrock supports shared memory systems of up to 256 SN1Net nodes (1024 processors).

The different internal Bedrock interfaces communicate by sending messages through the XB unit. As explained in the SN1 Cache Coherence Protocol Specification, to avoid system deadlock, messages are separated into two groups: requests and replies. When a message arrives through the I/O port (Crosstalk protocol) or Network port (SN1Net protocol), the message is converted to the Bedrock's internal format. The reverse occurs when a message exits one of these ports.

Figure 7C:
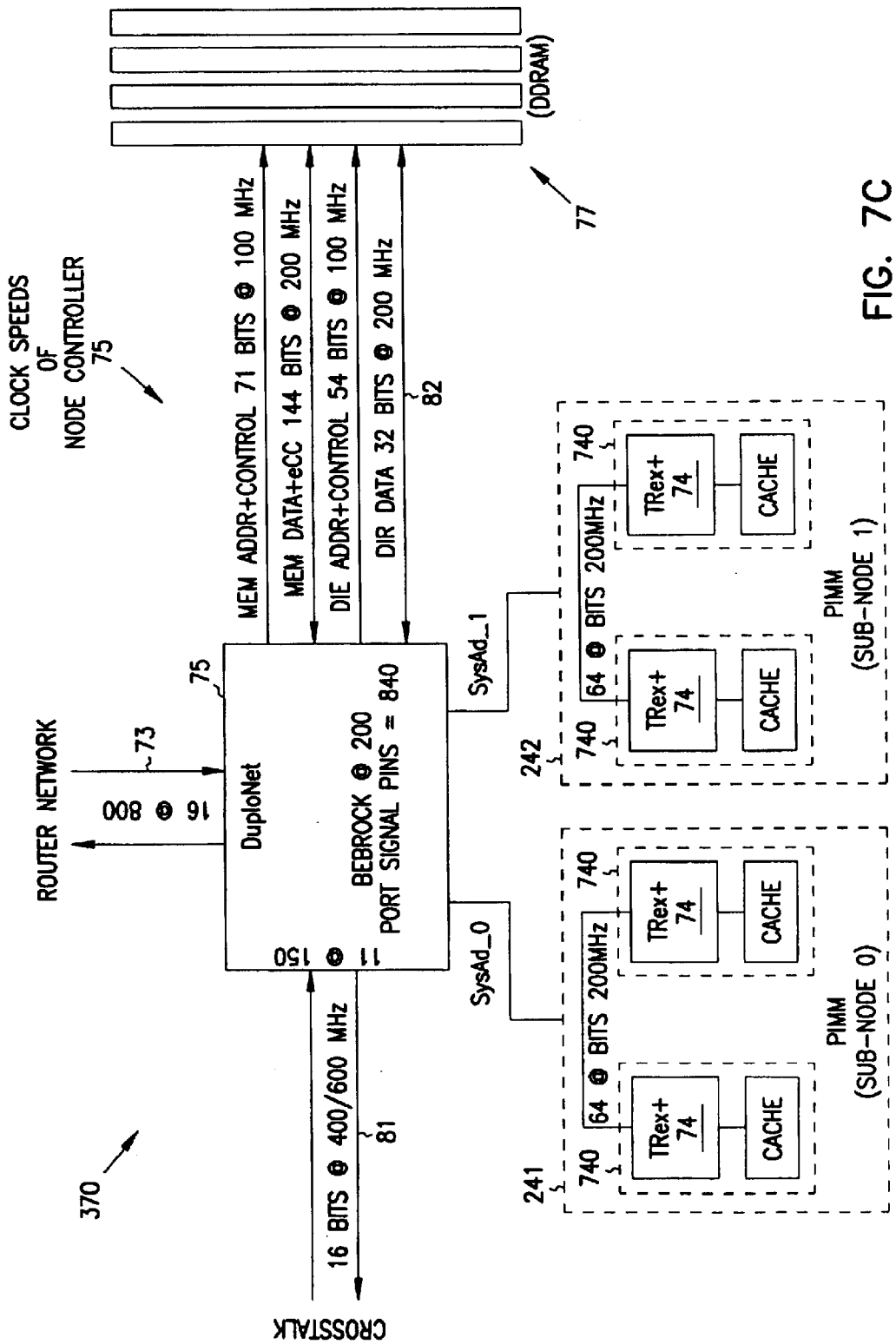
FIG. 7C shows a diagram of node controller 75 within a node 370 and describing the various interface widths and clock speeds for one embodiment of the present invention.
Figure 7D:
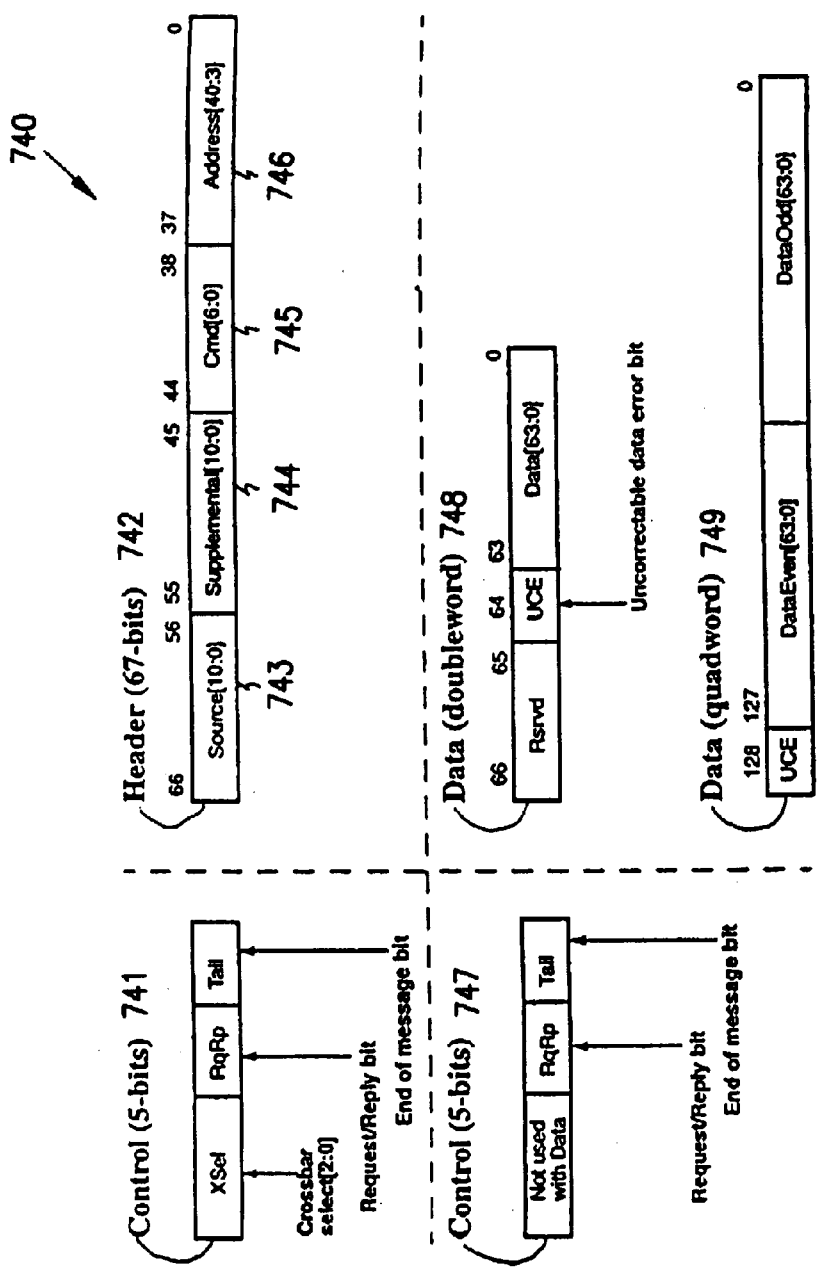
FIG. 7D shows header and data formats for messages of one embodiment of node controller 75.

FIG. 7A shows node controller 75 of one embodiment of the present invention. FIG. 7B shows one embodiment node controller 75 further including indications of the flow of data into and within node controller 75. FIG. 7B also shows node controller 75 implemented within a single chip 475. FIG. 7C shows a diagram of node controller 75 within a node 370 and describing the various interface widths and clock speeds for one embodiment of the present invention. FIG. 7D shows header and data formats for messages of one embodiment of node controller 75.

Bedrock Internal Message Format

The internal message of Bedrock (one embodiment of node controller 75) (see FIG. 7D) includes a header frame (a frame is a group of bits that is conceptually or logically a single unit. The term does not infer the number of clock cycles required to process the information, nor the unit-size of the bits that are placed simultaneously "on the wire" (either through the Bedrock's XB or over the Router Network or Crosstalk interfaces)), followed (optionally) by one or more data frames carrying a total of 64 to 1024 bits of data for the message. The format for each of the Bedrock frames (the header, the doubleword data, and the quadword data) is shown in FIG. 4. A header frame can be followed by 0, 1, 2, or 16 doubleword data frames, or, on the MD interface, by 0, 1, or 8 quadword data frames (any particular Bedrock MD interface uses only one of these data formats). Most interfaces on the Bedrock's Crossbar unit accept/transmit one 160-bit micropacket flit (carrying either a header, a doubleword of data, or a quadword of data) in a single clock cycle. Bedrock's Crossbar unit processes each micropacket (from input port to output port) in two clock cycles. Whenever possible, the Crossbar unit combines 2 received doublewords into a single quadword micropacket.

As each frame crosses into or out of the Bedrock's XB unit, the control signals (defined in FIG. 4 and described in detail in Table 1) indicate all or some of the following information:

to which local Bedrock unit (that is, XB port) the frame is destined (Xsel)

whether the frame is a request or a reply (that is, the Class which defines the virtual channel used)

whether this frame concludes the current message (Tail). Note that the Xsel field is only valid for headers, and that data frames always follow the header to the destination unit.

Figure 7E:
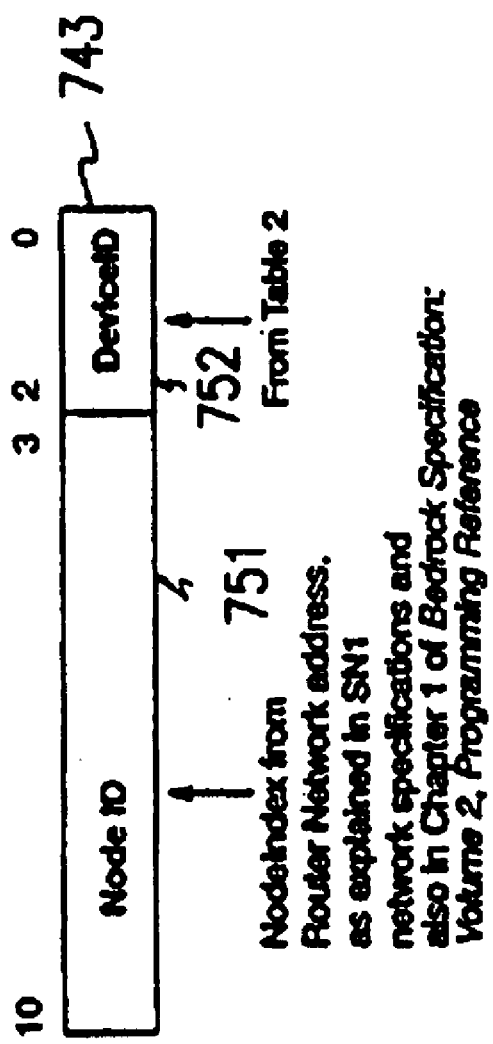
FIG. 7E shows the field format for source and supplemental fields.

FIG. 7E shows the field format for source and supplemental fields. Figure shows a table of control signal usages for control field 741 or control field 747. FIG. 7G shows a device ID encoding for field 743. FIG. 7H shows terminology used for describing content of the source field in the header of messages for XB 279. FIGS. 7I, 7J, 7K, 7L, 7M, and 7N show a multi-part table (Table 3) describing internal bedrock message source and supplemental fields. FIG. 7O is a table (Table 4) of the Xsel select-encodings for XB 279.

The header frame contains the source and supplemental fields, the message type (command) field, and 37 bits (39:3) of valid address. Subsequent data frames contain 64 or 128 bits of data, plus a bit to indicate an uncorrectable data error (UCE). The UCE bit is set if an uncorrectable error was encountered for that data word, such as a double bit error in memory. Note that the quadword data format is explicitly divided into DataEven and DataOdd doublewords. Whenever quadwords must be broken up into doublewords for transmission along a narrower interface, DataEven is transmitted first. If a doubleword of valid data is sent across the quadword interface, it is assumed to reside in DataEven.

FIG. 7G (Table 2) specifies the values that are contained in the Source and Supplemental fields of the header frame. The general format of the identifiers used in the these fields is shown in FIG. 5. The Node ID corresponds to the Router Network Address [39:32] (when the system is operating in its default M-mode). The node address space (total memory addressable in a node) is therefore Address[31:0], allowing up to 8 Gigabytes of addressable memory per node. FIG. 7H Terminology for Describing Content of Source Field in Header The Source field (illustrated in FIG. 7E) identifies one of the following:

For directory revision messages (such as XFER or SHWB) headed out the network interface, it identifies a coherency request initiator (that is, a source).

For other messages going to the network interface, the Source field on the forwarded request identifies the destination address of the third party (illustrated in FIG. 6) in the coherency transaction.

For all other messages, it identifies a coherency request initiator (that is, a source).

There are two types of invalidates inside the Bedrock:

an invalidate plus bit vector, which is only sent to the LB, is referred to as a local invalidate (LINVAL), the normal invalidate, which is sent to a PI (local or remote), is referred to as an invalidate (INVAL).

The table shown in FIGS. 7I–7N details Source and Supplemental field contents for all Bedrock transactions. Some of the abbreviations used in this table are described as follows:

Init—initiator of the original transaction. 3 bit field points to a DeviceID encoding, as detailed in Table 2.

Send—sender, 8 bit node ID of the node sending the current message. 1 Owner—the owner of the cache line referend to by the address in this header. Used to generate revision messages. Owner will be either the initiator or the sender.

Priority—priority level of the coherence request.

AckCnt—acknowledge count expected as the result of invalidates sent. This number is the total number of invalidates sent minus 1. 1 WRB—write request buffer resource tag number of current write transaction.

Target—identifier of the intervention target.

T-Rex/BCast—two bit field which specifies which TRex to send an invalidate to. Can also specify a broadcast to both TRexs.

Overview of XB 279

Figure 8:
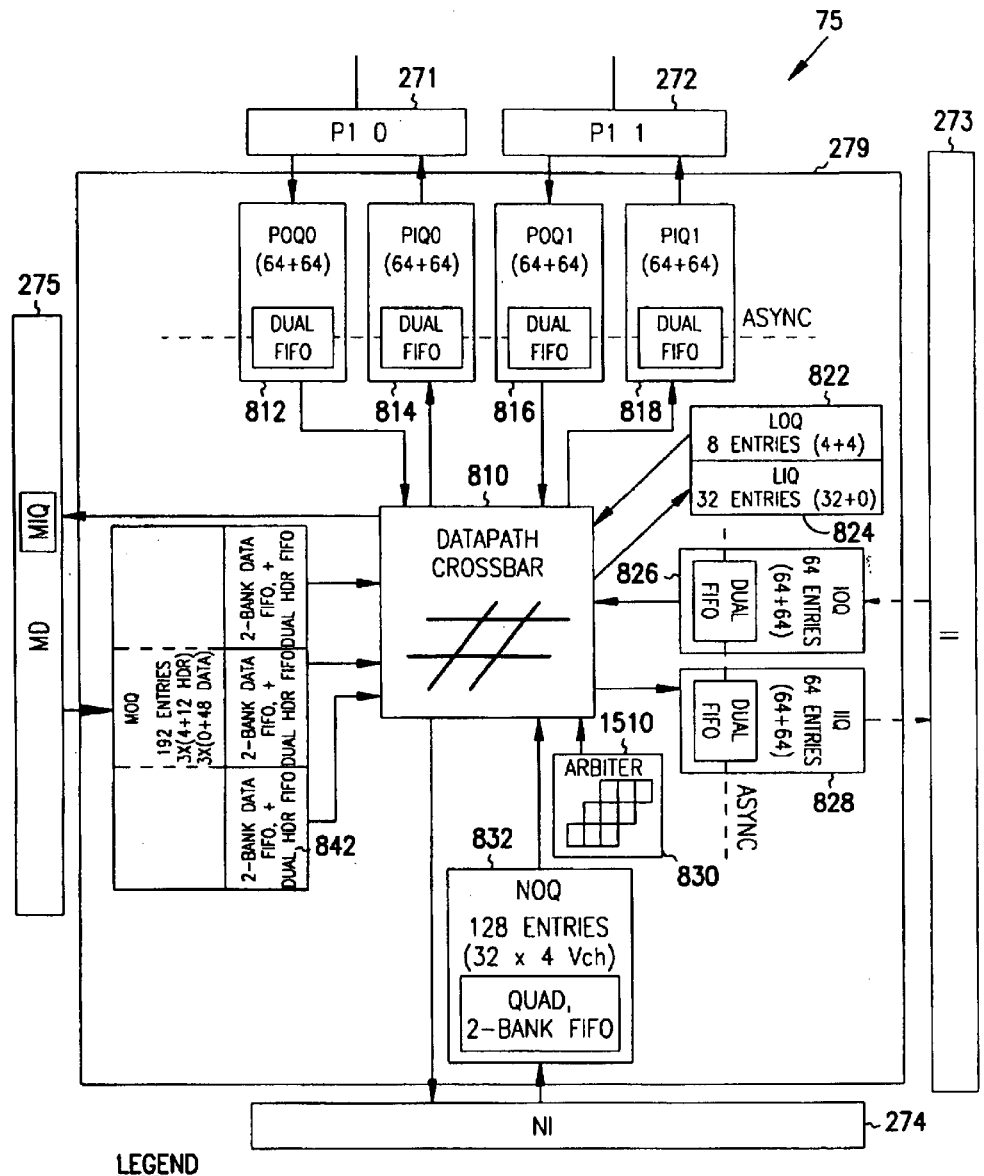
FIG. 8 is a block diagram of one embodiment of XB 279.

FIG. 8 is a block diagram of one embodiment of XB 279.

The crossbar unit (XB) 279 of node controller 75 provides connectivity between the two PI 270s, the MD 275, II 273, LB, and NI 274 units in a fair and efficient manner. The XB 279 supports the flow of messages in Bedrock internal format along two virtual channels, multiplexed across the physical channel(s) connecting each unit to the XB 279. The XB 279 is designed for minimal latency under light loads by means of buffer/queue bypass paths and arbitration hints, and maximum throughput under heavy loads by means of per virtual channel arbitration requests and a wavefront arbiter. Message ordering between each pair of units is maintained within each virtual channel. Messages targeting different destination units from a single source virtual channel may be transmitted in any order. Messages along different virtual channels may be interleaved across an interface or along a physical channel at the flit[1] level.

[1] A flit is the smallest atomic, flow-controlled transfer unit supported by an interface to the crossbar.

This section uses the following unit-centric (not XB-centric) acronyms:

xIQ=x unit's input queue that receives messages from the XB 279 (for example, PIQ=a processor interface's input queue)

xOQ=x unit's output queue that holds messages awaiting transmission to the XB 279 (for example, NOQ= network interface's output queue)

In one embodiment, the XB 279 resides physically in the approximate center of the node controller 75, as it must communicate directly with each of the functional units (MD 275, II 273, LB 278, NI 274, and two PIs 271 and 272). The XB 279 is divided into a set of modules that each interface directly with a functional unit, and a set providing central connectivity and arbitration.

FIG. 7O is a block diagram of the XB architecture. In the notation shown in the figure, a dual-FIFO refers to two virtual channel FIFOs within a single buffer memory structure, a quad-FIFO referring to four virtual channels in an analogous structure. Dual bank refers to the width of the FIFO write port. The memory output queue (MOQ) requires dual banked FIFOs to sustain 3.2 GB/sec. of bandwidth.

Datapath Crossbar

This centrally located module contains an 8-input by 6-output crossbar. The crossbar datapath is 67 bits wide for all inputs and outputs, providing 1.6 GB/s of data bandwidth per port at a 5 ns clock. A single cycle is spent traversing the crossbar datapath: data is registered before being presented to the crossbar datapath, and flows into a register after the output multiplexer.

Data transfers are orchestrated by the unit output queues and the arbiter working in tandem. Data, valid and flit tag information are provided by the source output queue. Crossbar select lines are controlled by the arbiter and registered as one-hot busses to minimize fall-through latency.

Unit Output Queues

The unit output queues (the "OQs") provide buffering for outgoing unit messages (destined for the XB 279) while they arbitrate for datapath resources. (Note: XB nomenclature is unit-centric, not XB-centric.) In certain cases they are also used to provide rate matching between disparate XB and unit bandwidths (MOQ, NOQ[2], IOQ, as well as a point of synchronization for units asynchronous to the core (POQ, IOQ).

[2] Only when SN0Net is being used.

The OQs have two major interfaces: a unit interface and an arbiter/datapath interface. The unit interfaces are customized to the unique requirements of each unit, and detailed in the sections that follow. The arbiter/datapath interface is uniform across the OQs.

Across all OQ interfaces, message destinations are specified using the Xsel associated with the destination unit. This encoding, described in Table 4 (shown in FIG. 8), is consistent with the router network header format (in one embodiment, the present invention uses a router network such as described in U.S. Pat. No. 6,085,303, issued Jul. 4, 2000, entitled "SERIALIZED, RACE-FREE VIRTUAL BARRIER NETWORK", U.S. Pat. No. 6,230,252, issued May 8, 2001, entitled "HYBRID HYPERCUBE/TORUS ARCHITECTURE", U.S. Pat. No. 5,970,232, issued Oct. 19, 1999, entitled "ROUTER TABLE LOOKUP MECHANISM", application Ser. No. 08/971,184 filed Nov. 17, 1997 entitled "MULTI-DIMENSIONAL CACHE COHERENCE DIRECTORY STRUCTURE", and U.S. Pat. No. 6,101,181, issued Aug. 8, 2000, entitled "VIRTUAL CHANNEL ASSIGNMENT IN LARGE TORUS SYSTEMS" all of which are incorporated by reference), minimizing the amount of format translation required at the network interface. Note that the XB 279 supports a superset of the router network encodings to address Bedrock-internal only message destinations.

Note that the Valid (from the unit to the output queue) corresponds to a single cycle flit, except for NI 274 where it corresponds to either 1 header or two consecutive data flits. The Tail comes with last flit of the message, except for NI 274 where it comes with the Valid. See FIG. 7O showing Table 4. Note that setting Xsel[2] to 0 results in four SN0-compatible encodings (with the Local Block replacing the NI 274 as the destination for vectors and NI register PIOs). Xsel[2] can also be thought of as a "sub-node" select bit.

To reduce latency through an empty OQ, the message buffers may be bypassed entirely, or the data may be written and read from the buffers in the same cycle. The details of the crossbar arbitration are hidden from the unit, which need only be concerned with proper data transfer and flow control on the OQ interface.

Unit Input Queues

The unit input queues (the "IQs") provide buffering for data that has traversed the XB 279, but has not yet been processed by its destination unit. Their primary role is to provide rate matching and synchronization between the XB 279 and the receiving unit. If sized properly, they isolate XB message flow from the effects of lower bandwidth units, and allow higher bandwidth units to accumulate incoming packets until a transfer at the higher rate is possible.

Since the NI 274 is synchronous and bandwidth-matched to the XB 279, the NI 274 does not have an IQ. Fill level information from the IQs is used by the arbiter to flow control messages from the OQs. In the case of the NI 274, SN1Net flow control information is used to provide back pressure across the XB 279.

The MD 275 requires input buffers to provide rate matching between the XB 279 and the higher bandwidth memory interface. To allow a tighter coupling between the MD 275 and the input buffers, the buffers are placed in the MD unit 279 rather than in an XB IQ. The MD 275 also provides flow control signals to the arbiter.

Note that the Valid (from XB 279 to the IQ or unit) is consistent throughout all the queues in that it corresponds to a single-cycle flit. The Tail correspond to the last flit of the message, except for NI 274 where it is asserted in the first cycle of the two cycle transfer.

Arbiter

The arbiter provides low latency arbitration for uncontested ports via bypass arbitration, and efficient, high utilization via wavefront arbitration as resources become saturated. The arbiter must also ensure fairness for all units and correctness by disallowing message fragmentation within a virtual channel.

The basic unit of data transfer supported by the arbiter is a two clock entity, composed of either a single clock header followed by an unused cycle, a single clock of data followed by an unused cycle, or two data clocks. Note that single clock data transfers are only used for the last transfer of an odd-length data payload. The arbiter receives requests for two cycles of XB bandwidth from the units every other cycle, and grants bandwidth to a particular destination in the same cycle.

Error Handling

The XB 279 will, in some embodiments, encounter errors with some of the following root causes:
 design flaws in the Bedrock (in the units or in the XB 279 itself).
 external component failures whose effects are not filtered by the units before reaching the XB 279.
 system configuration errors.
While these errors may manifest themselves in many ways, the crossbar will only detect errors of the following types:
 Invalid Xsel destination encodings from unit to OQ (BAD_XSEL).
 Queue overflow, from unit to OQ or OQ to IQ.
 Queue underflow, due to OQ grant or IQ read of empty queue.
 Lack of forward progress from an IQ to unit (DEADLOCK_TIMEOUT).
 Missing tail from a unit to an OQ (TAIL_TIMEOUT).

Spew Mode

The crossbar provides a debug mode in which all data leaving a particular OQ or all data entering a particular IQ can be echoed ("spewed") to the NI 274. Once reaching the NI 274, the data will be converted to network format and sent out the SN1Net port (as normal) for capture via a suitable test chip (one that allows examination of the signals on the link) that is embedded in the link. Note that this mode is only useful for single node system debugging, as the NI 274 port cannot be shared by spew traffic and normal traffic.

In one embodiment, there are two instantiations, POQ0 812 and POQ1 816, of the processor interface's output queue, one for each PI 270. In other embodiments, even more instantiations of the PI port, or a plurality of instantiations of one or more of the other ports, are used.

Each POQ accepts request and reply messages for a PI 271 or 272 at the PI clock frequency. Internally, the POQ has a synchronizer to bring the PI data into the core clock domain. In the core clock domain, the POQ presents PI requests and replies to the XB arbiter and datapath. There is a Synchronous mode (pin) which can be set when the PI 270 and the core runs synchronously. This causes the POQ to bypass the synchronizer and save 1.5 cycles.

The PI 271 or 272 is flow-controlled by the POQ 812 or 816, respectively. The POQ indicates the number of free entries available for new data in the request and reply queues. When the number of free entries reaches 0, the PI 270 is no longer permitted to send data to the POQ.

The PI 270 needs to know the number of entries so it can properly flow control the T-Rex+ processor (a simple Full flag is not sufficient for this).

Since there are two processors connected to each PI 270, the naming convention used is, for example, PI_POQ_RqValid_P0, PI_POQ_RqValid_P1.

The core-side clock domain of the POQ has special logic for creating revision messages in the reply channel. Some intervention responses from T-Rex+ require revision messages, with or without data, to be sent to the home node's memory, depending on the command type and the supplemental fields. The following equation details revision message types:
 With Revision Bit (bit 55) set, RevisionMessage command is one of ('BR_CMD_UACK|'BR_CMD_SACK|'BR_CMD_EACK|'BR_CMD_RACK|'BR_CMD_URESP|'BR_CMD_SRESP|'BR_CMD_ERESP)
 Revision is LongLong type if (RevCmd=='BR_CMD_SXWB)|(RevCmd='BR_CMD_SHWB);
 Revision id is LongShort type if (MsgCmd=='BR_CMD_ERESP) & (RevCmd=='BR_CMD_XFER).
 RpFree is asserted whenever an entry is freed from the Reply buffer, but RqWrFree is only asserted when the packets are longer than two flits are freed.
 No RqWrFree is asserted for Read since Read Request is not longer than two flits, while 15 RqWrFree pulses are asserted for block write (flits 3–17), since PI 270 needs to reserve the two entries to be able to do a partial write in case of any error. For graphics Request (with no error expected), RqWrFree is asserted whenever an entry is freed.

PIQ

The processor interface input queue (PIQ) is a FIFO pair with separate request and reply channels. The XB side of the PIQ runs at the core clock speed, while the PI side of the PIQ runs at the PI clock speed. Thus, the PIQ implements an asynchronous boundary. When valid data appears at the PI side of the PIQ, valid lines are asserted until the PI 270 reads data from the PIQ.

MOQ

To sustain full memory bandwidth, the memory unit's output queue (MOQ) block provides three replicated queueing structures (MP0, MP1, MMQ), attached to three separate XB 279 ports. The MD 275 sends messages into each queue based on their destination. There is a single queue dedicated to each PI 270 (MP0 and MP1), and a third queue within which LB, NI, and II messages are held (MMQ).

Each MOQ structure is made up of separate header (MOQH) and data (MOQD) FIFOs. MOQH and MOQD have separate interfaces to streamline connecting to the MD 275 datapath. The MOQH is divided unequally into request and reply channels (mostly reply), since most outgoing traffic is on the reply channel. The MOQH and MOQD also have bypass paths. The limited set of data bearing requests from the MD 275 travel entirely through MOQH, eliminating the need for a request channel on MOQD. To accept the 3.2 GB/s data rate from the MD 275, the MOQD has dual buffers which are written simultaneously by the MD 275, and read alternately by the XB 279.

When transferring a doubleword of data, the MD 275 may present the data on either side of the quadword interface. The DwOffset signal indicates whether DataEven or DataOdd is used.

To reduce remote read latency, the MD 275 will at times present a header to the MOQ before all checking is complete. There are two scenarios under which this takes place:

1. Hdr {Rq,Rp} dst is asserted and on the following cycle, during which the header itself is transferred, the MD 275 encounters an ECC error and must cancel the message. The MD 275 asserts the Abort signal in this second cycle, indicating that the header should be dropped and all state associated with this message cleared. In the same (second) cycle, another Hdr {Rq, Rp} Valid (on the same channel) may be asserted, and that message must also be cancelled.

2. For messages heading towards the NI 274 (on their way to a remote node), an access error may be detected in the cycle after the header has been transferred to the MOQ. In these cases, the MD 275 asserts the AE signal on the third cycle of the transfer, and the MOQ and NI 274 cooperate to ensure that the header is dropped. There may be residual message-in-progress state left in the XB 279 as a result of this cancelled transfer. The MD 275 guarantees that it will resend a message to the NI 274 along the same channel, clearing up any outstanding XB state. Note that the original Hdr {Rq,Rp} Valid may have not been aborted on the second cycle, and encountered an access error on the third. Also note that any header immediately following (on the same channel) a header that ultimately encounters an Access Error must be aborted. A single cycle of delay after the AE header is sufficient to again allow a valid transfer. If AE is asserted in the third cycle, MD 275 guarantees that there is no Hdr {Rq,Rp} Valid on the second and third cycles.

Flow control between the MD 275 and each of the MOQs is credit based. On reset, the MD 275 assumes that the following space is available in each MOQ:

4 request headers/DW data entries in MOQH
12 reply/DW data entries in MOQH
24 QW data reply entries in MOQD The MD 275 must maintain a count of available buffer space for each MOQ. On transferring a header or data cycle to a particular MOQ, the MD 275 must decrement the corresponding credit count. The HdrRq/RpFree outputs from each MOQ indicate that a single cycle header/doubleword data entry has become available in MOQH. DataFree indicates that a quadword or quadword-aligned doubleword entry has become available in MOQD.

Figure 9:
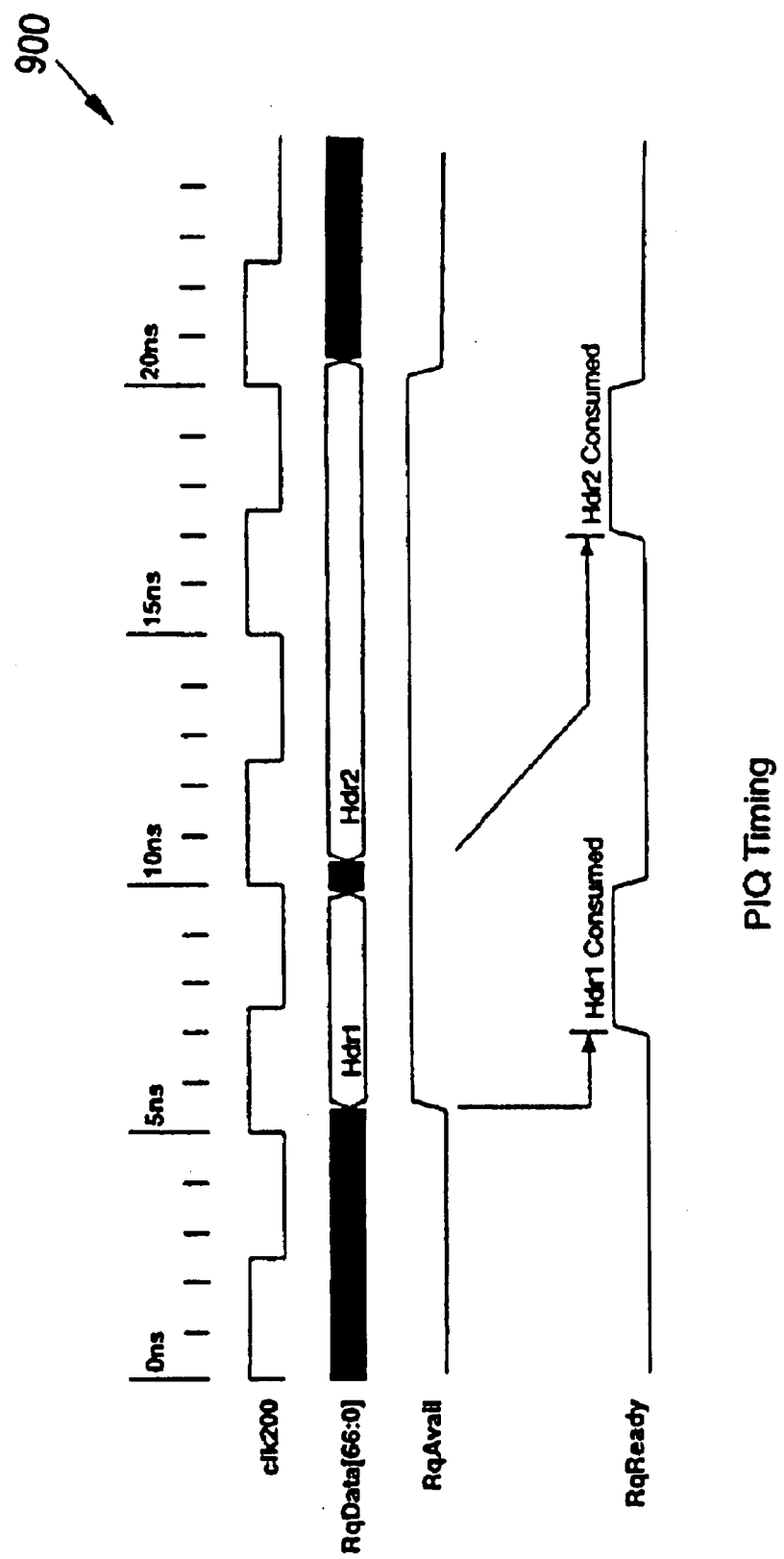
FIG. 9 shows a timing diagram 900 for PIQ.
Figure 10:
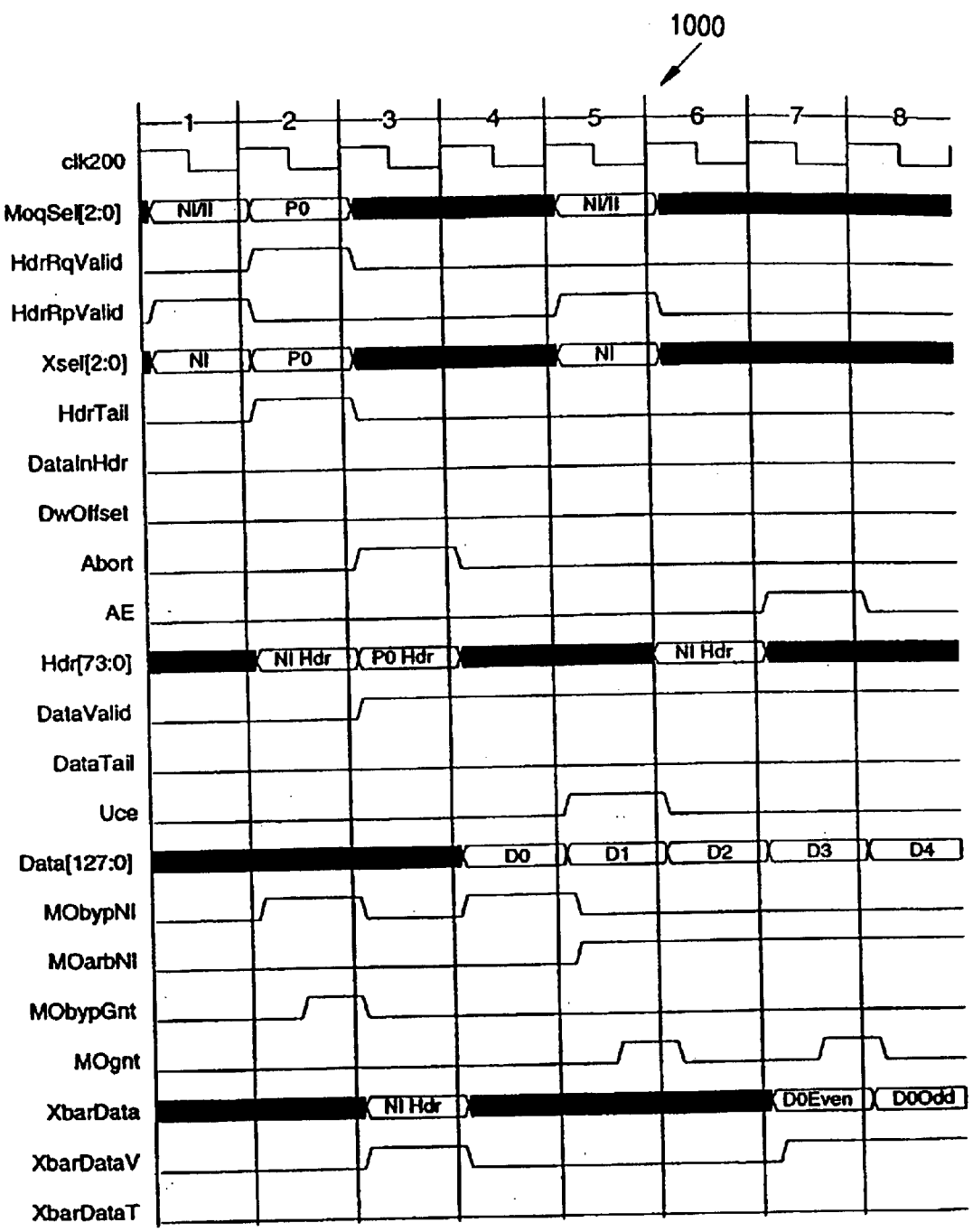
FIG. 10 shows a timing diagram 1000 of MD/MOQ interface signals.

FIG. 10 and Table 20 (shown in FIG. 9A) provide a detailed list of the MD/MOQ interface signals.

There is no MIQ in XB 279. The XB 279 attaches directly to the MD 275 input datapath, allowing the MD 275 to better manage queued messages. The XB's 1.6 GB/s port can only provide half of the memory's peak bandwidth.

The MD 275 provides separate flow control for several XB sources, allowing requests from certain sources to make progress while others are stalled until their buffers are freed.

To improve the latency of remote reads, the NI 274 forwards remote read requests to the MIQ as soon as they are received, bypassing the XB 279 entirely. Reads that are received from the NI fast path are speculative in nature, and are only forwarded across the MD 275 interface when the MIQ cannot make use of the interface otherwise. The speculative headers are presented for a single cycle only, and are identified by the HdrSpec signal associated with HdrAvail.

Note that speculative hints sent from the NI 274 to the MD 275 do not affect the operation of the NI→NOQ interface in any way. Table 21 (shown in FIG. 10A) lists in detail the interface signals between the XB 279 and MD 275.

The network unit's output queue (NOQ) includes four channels that correspond directly to the router network (175)'s four virtual channels. Each individual channel is treated as a FIFO, and each presents requests to the arbiter. By controlling the grants returned to the NOQ, the arbiter ensures that the four virtual channels are properly merged into the two virtual channels supported by the rest of the Bedrock.

Data is transferred across the NI-NOQ interface in 2-cycle flits, in a manner analogous to that used between OQs and IQs within the XB 279. Valid cannot be asserted to the NOQ on consecutive cycles. Each assertion of Valid represents either a single-cycle Bedrock header followed by an unused cycle, a single cycle or data followed by an unused cycle, or two cycles of data. Even-length payloads are sent as a series of two-cycle data flits, with the last transfer of an odd-length payload being a valid single-cycle of data followed by a dead cycle.

There is no explicit differentiation between a single-cycle and a dual-cycle data flit on the NI-NOQ interface. The NOQ uses the Size field provided with the header's Valid pulse to distinguish the two. The NOQ decodes the header command size bits and samples only the first doubleword of data in the last flit of the message. Also note that although the UCE bit is defined for each doubleword of data in crossbar format, it is only valid on the first cycle of a data flit from the NI 274 to the NOQ.

The NI 274 forwards flits to the NOQ before link-level checking is complete. In cases where a flit must be dropped due to a link-level error, the NI 274 will assert Squash a cycle after asserting Valid.

NOQ-NI interface flow control requires the NI 274 to know the NOQ buffer depth. The NI 274 must keep track of all buffers consumed (by means of Valid transfers), and all buffers freed (as indicated by Free pulsed from the NOQ). The buffer depth is measured as the number of 2-cycle flits that can be stored, and a Free pulse indicates the release of a 2-cycle flit buffer. A Valid followed by Squash is dropped by the NOQ and thus will not result in a Free pulse.

Figure 11:
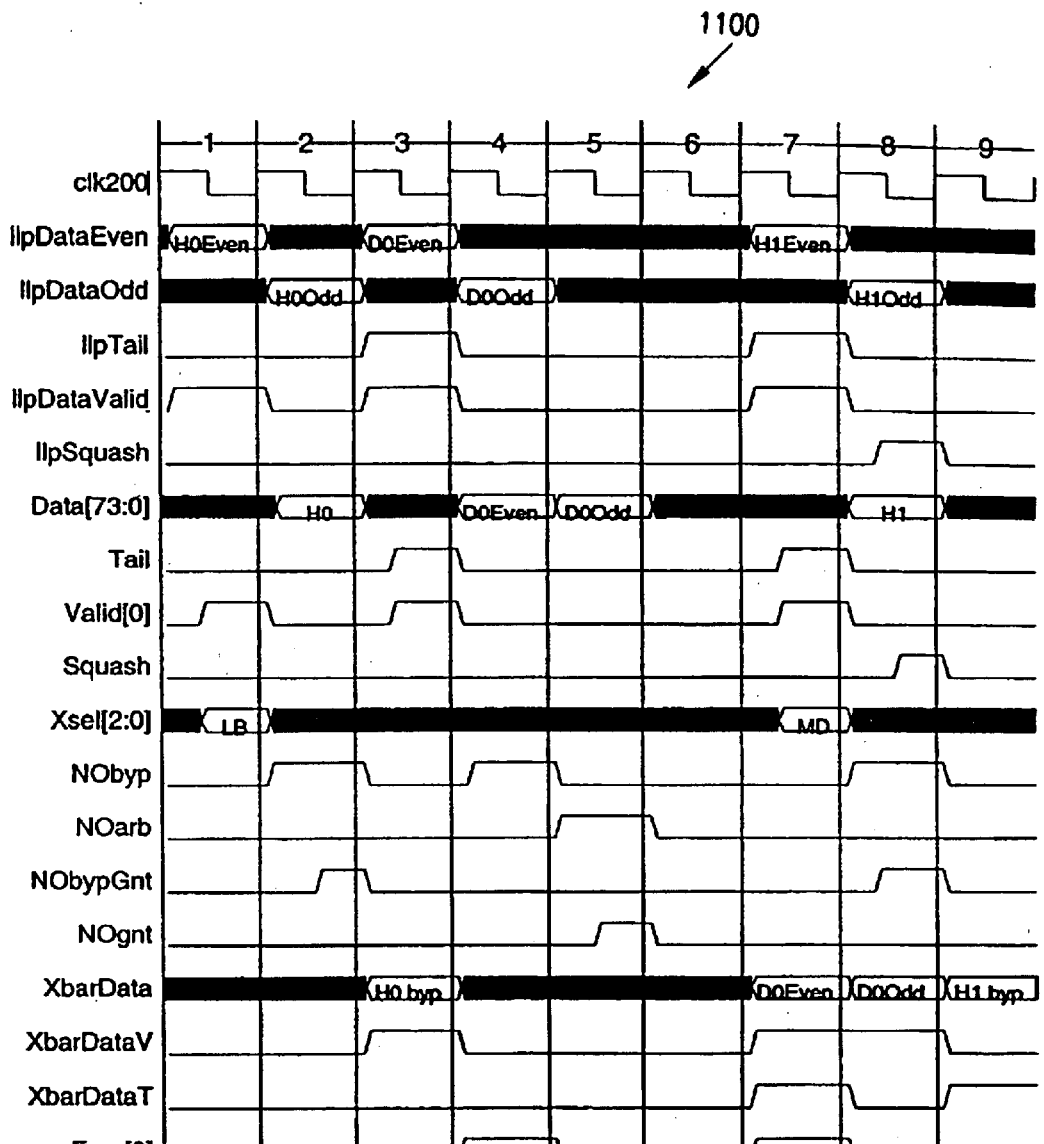
FIG. 11 shows a timing diagram 1100 for the NOQ interface.

See FIG. 11 for an NOQ timing diagram. Note that the figure includes SN1Net LLP and internal crossbar signals. These help illustrate the expected fall-through latency from SN1Net onto the crossbar, but do not directly affect the NI-NOQ interface. The interface signals are listed in Table 22 (shown in FIG. 11A).

NIQ Functionality

The NI 274 does not have an input queue for incoming XB traffic. The direct connection of the NI 274 and the XB 279 dictates that messages be transmitted across the interface in the 2-cycle flit format supported by the XB 279. Each assertion of DataValid signals the first cycle of a flit being transmitted. The unused cycle after each header allows the NI 274 to expand Bedrock headers into 2-cycle Router Network headers at full rate. To allow the NI 274 to format outgoing messages with minimal latency, the DataTail tag is provided on the first cycle of the 2-cycle flit. There is no distinction between single and dual data cycle flits on the interface.

The two channels of traffic supported by the XB (request/reply) are demultiplexed onto the four router network channels by the NI 274, in a manner which is invisible to the crossbar. The NI 274 combines flow-control information from the four network virtual channels to apply backpressure to the two channels seen by the crossbar.

The XB→NI protocol is complicated by a latency-reducing optimization from the memory system. To support minimum latency responses to remote memory requests, the MD 275 sends response headers to the XB (headed for the NI 274) before access rights checking is complete. When access checking results in an error, the MD 275 asserts the Access Error (AE) signal to the MOQ and the NI 274. If the response header passes through the MOQ and the crossbar with minimum latency, the header DataValid will arrive simultaneously with the AE signal. The AEValid signal from the MOQ to the NI 274 is asserted whenever this minimal latency path is taken. At the NI 274, the Access Error (AE) bit from the MD 275 is combined with the AEValid bit from the MOQ to gate XB DataValid, as illustrated in FIG. 12. See Table 23 (shown in FIG. 11B) for a description of the full set of XB/NI interface signals.

LOQ

The local block's output queue (LOQ) is a FIFO pair. It need only be sized large enough to ensure that outgoing invalidates can be sent at full network bandwidth. The LOQ has no bypass path.

The LOQ interface signals are detailed in Table 24 (shown in FIG. 12A). A header or single cycle of data is considered transferred if:

(RqAvail && RqReady)||(RpAvail && RpReady)

Rq and RpReady may be asserted together. Rq, RpAvail are mutually exclusive.

LIQ

The local block's input queue (LIQ) presents independent request and reply interfaces to the Local Block. The request FIFO will buffer invalidate requests (as well as other requests to the local block), and should be large enough to hold all of the coarse invalidates that can be issued from the four processors on the local node[3].

[3] 4 invalidates per processor=16 invalidates per node.

When the LIQ has request flits to deliver to the LB, it asserts the RqAvail signal. The LB independently asserts RqReady when it can accept a request flit. When both RqAvail and RqReady are asserted in the same cycle, a data transfer is defined to have occurred. The LB may consume multiple flits in the same cycle by asserting multiple Ready signals in the presence of multiple Avail signals.

The only reply messages flowing through the LIQ are vector replies. The LB guarantees that vector responses can always be consumed at full rate. The LB also guarantees that any reply messages erroneously arriving at the LB will be consumed at full rate. As a result, a Valid signal from the LIQ is used to indicate a reply transfer rather than a Ready/Avail protocol, and no reply storage is allocated in the LIQ.

The LIQ/LB interface signals are detailed in Table 25 (shown in FIG. 12B).

The IO interface's output queue (IOQ) is a FIFO pair with separate request and reply channels. Data from the II 273 is written into the IOQ at the speed of the II 273, which is asynchronous with respect to the Bedrock core clock. Data is read by the XB 279 at the Bedrock core speed.

To simply implementation, the IOQ and POQ are instantiated from the same source logic. That is, they are identical logically. In various embodiments, special features are enabled or disabled depending on whether the logic is serving the II 273 or PI 270.

The exception is Arbitration Trigger in IOQ. Arbitration Trigger in IOQ enables the IOQ to wait a programmable number of cycles after seeing a Header, before it starts to arbitrate. This gives the IOQ a chance to have enough entries such that it can use the arbiter and the bus optimally without any unused cycle. The Arbitration Trigger register can be set to: II frequency/Core frequency*number of cycles to transfer a cache line.

IIQ

The IO interface's input queue (IIQ) is a FIFO pair with separate request and reply channels. Data from the XB 279 is written into the IOQ at the speed of the Bedrock core, which is asynchronous with respect to the II clock. It is presented to the II 273 through separate request and reply registers.

To simply implementation, the IIQ and PIQ are instantiated from the same source logic. That is, they are identical logically, with the exception of Arbitration Trigger in IOQ. Arbitration Trigger in IOQ enables the IOQ to wait a programmable number of cycles after seeing a Header, before it starts to arbitrate. This gives the IOQ a chance to have enough entries such that it can use the XB bandwidth (arbiter and the bus) optimally without any unused cycle. The Arbitration Trigger register can be set to: II frequency/Core frequency*number of cycles to transfer a cache line. If the Tail of a message is seen, it can immediately arbitrate without waiting for the programmed number of cycles.

Arbiter and Datapath Interface

The arbiter combines per virtual channel requests and message framing information from the OQs with flow control information from the destination IQs/units to grant crossbar bandwidth fairly and efficiently. To provide low latency under light loads and high-utilization under heavy loads, the arbiter supports two bandwidth request interfaces: the bypass arbiter interface and the wavefront arbiter interface, named respectively for the arbiter implementation that handles each.

The switch carries the data along with virtual channel tag, tail bit from the OQ source to the IQ or unit destination.

Bypass Arbitration

The arbiter supports bypass arbitration as a means of low latency, fixed priority arbitration. When a OQ is empty and idle, it can use bypass arbitration for new requests to minimize latency. To initiate bypass arbitration, the OQ asserts its appropriate request line at the beginning of a clock cycle (for a summary of all request lines, see the XB interface section, below.) If the requested IQ is free, and if there are no conflicting virtual messages in progress ("MIPs"), the bypass arbiter will grant the IQ to the requesting OQ. On the next clock, the OQ must provide data on the XB datapath, starting at the beginning of the cycle. Since this process does not give the OQ sufficient time to complete an FIFO read, the OQ must bypass the FIFO read stage and have the data staged for immediate transmission to the XB 279.

To simply the implementation, there are restrictions on when an OQ can request bandwidth from the bypass arbiter. Bypass requests can be made from an empty queue as long as no MIPs are outstanding on other channels.

To be able to request n cycles early, the units may need to speculate that they will need the XB bandwidth, but ultimately be unable to use it. To solve this problem, the arbiter supports speculative bypass requests. Once a bypass grant is received, data is presented to the XB datapath with the virtual channel and Xsel of the data. If these match the registered granted values, the data is considered valid at the destination IQ, otherwise the request is considered speculative and the request is ignored.

The bypass arbiter can be disabled via a XB_BYPASS_EN register. When disabled, bypGnt will never be asserted, and all message transfers will be controlled by the wavefront arbiter 1500.

Wavefront Arbitration

The arbiter also supports wavefront arbitration, which uses the XB bandwidth more effectively by maximizing the number of grants per arbitration, and provides fairness to OQ requesters through the age mechanism. An OQ may always request wavefront arbitration, and should assert wavefront arbitration requests to all destinations for which it has a valid packet at the head of a FIFO. The wavefront arbiter can assign grants more efficiently if it is presented with more requests.

The OQ must assert its wavefront arbitration request(s) at the beginning of a cycle. Towards the end of that same cycle, the arbiter will provide the OQ with a grant. The OQ then has one full cycle to complete its FIFO read, then it must provide data for the XB 279 on the next cycle.

Figure 14:
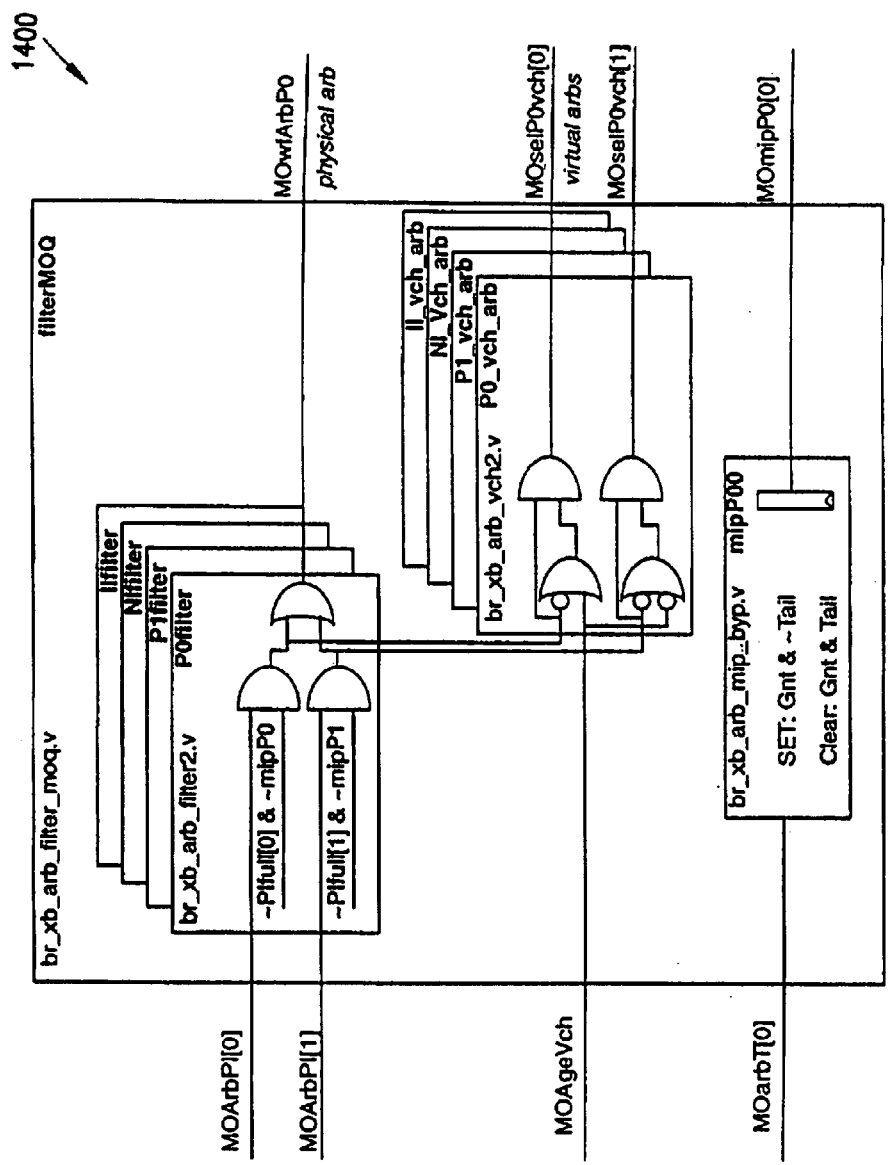
FIG. 14 shows a diagram of XB arbiter filter 1400 for XB 279, with MOQ filter shown as an example.

FIG. 14 is a block diagram of one embodiment of an XB arbiter filter 1400 (the MOQ filter is shown). Before arbitration requests reach the wavefront arbiter, they are sent through the filter block 1400. The filter block prevents the mixing of two message streams on one virtual channel. If there are no other virtual channel MIPs targeting the same destination as an OQ request, that request is sent on from the filter block to the wavefront arbiter 1500 (see FIG. 15).

The wavefront arbiter is set up in a matrix form, although it is tilted to the side to minimize worst case timing paths. Rows in the wavefront matrix represent OQ sources, while columns represent IQ destinations. Each tile in the wavefront arbiter is the terminus of a filtered arbitration request line, and represents a particular OQ requesting a particular IQ. OQs may request several IQs in one arbitration round. OQs will be granted a maximum of 1 IQ per round. Note that the wavefront arbiter treats the MOQ as 3 OQs, as the MOQ can provide 3 data streams simultaneously. Thus, the MOQ can receive up to 3 grants in an arbitration round.

Figure 15:
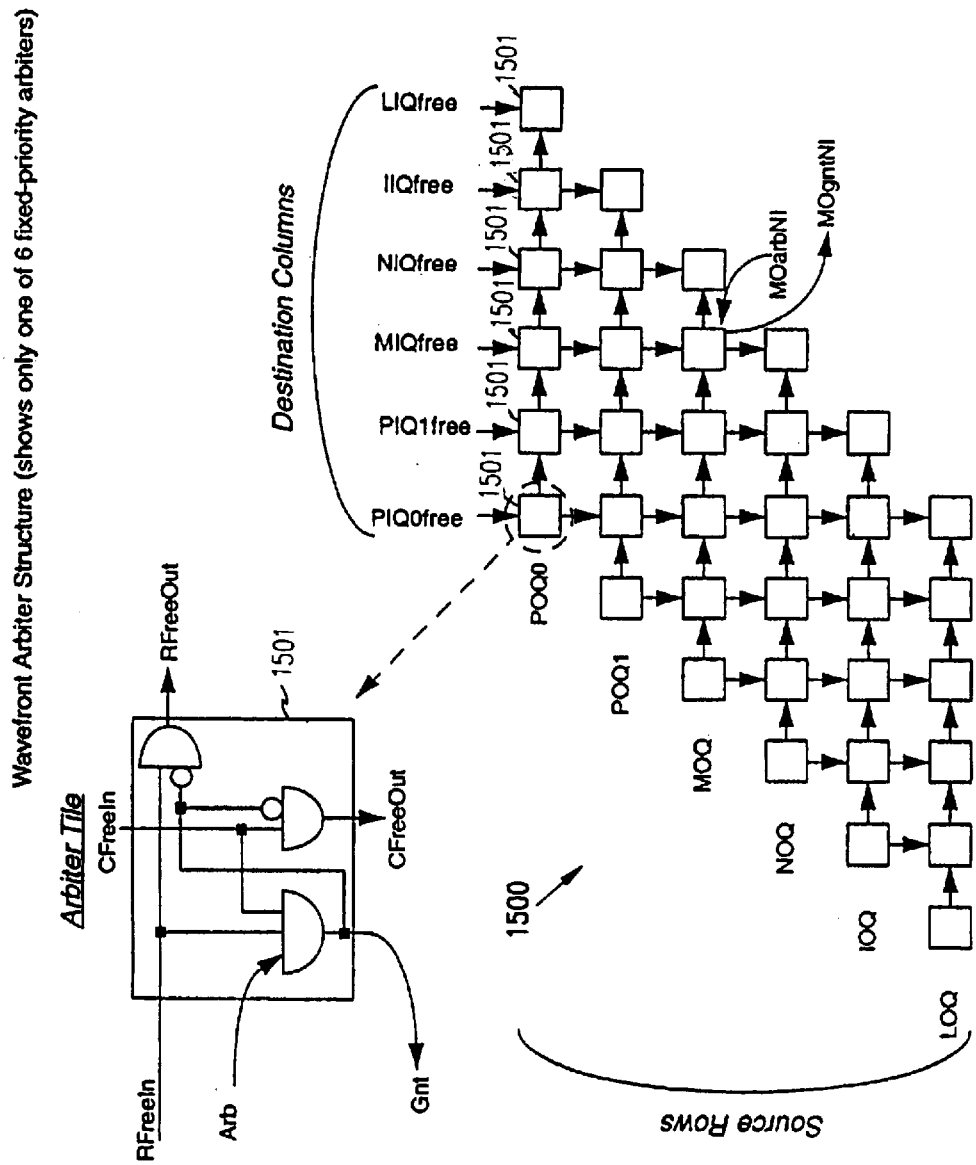
FIG. 15 shows a diagram of a wavefront arbiter structure 1500 (this diagram shows only one of six fixed-priority arbiters).

Wavefront arbitration tiles closest to the upper left corner in FIG. 15 are evaluated first, and therefore have the highest priority. If a request is granted at a particular tile, that information is propagated down and to the right as the granting tile de-asserts its Row Free (RFree) and Column Free (CFree) lines. Within an individual tile, a request can only be granted if the RFree and CFree lines are both asserted.

There are a total of 6 wavefront arbiters in the XB 279, each with a different priority set. Notice that the wavefront arbiter structure shown in FIG. 15 has a fixed priority, with POQ0 having top priority for PIQO0 POQ1 having top priority for LIQ, etc. Each of the 6 wavefront arbiters in the XB 279 represents a different priority ordering, and depending on which OQ has the oldest age packet bound for a particular IQ, the arbiter selects one of the wavefront arbiters to use.

The arb/gnt Interface Between the Arbiter and the OQs

XB requests and grants are pipelined two clocks ahead of the data to allow a full cycle for the OQ buffer memory to be read before the data is presented to the datapath. FIG. 51A shows a table (Table 29) of wavefront arbiter signals as an example.

Crossbar Arbitration Fairness

To ensure fairness and forward progress, the arbiter attempts to grant the "oldest" arb on the chip whenever possible. Oldest is defined by an aging protocol implemented at the OQs and forwarded to the arbiter. A new header arriving at the head of a virtual channel queue receives an age of 0. Until the message is complete, the age will be incremented at a rate determined by the arbiter. The aging rate enforced by the arbiter is programmable via the XB_AGE_WRAP register. Note that bypass arbitration is not fair, but any message that does not receive a bypass grant will immediately go into wavefront arbitration, which is fair. Wavefront requests have higher priority than bypass requests.

The arbiter priority module is constantly comparing the ages from each OQ. The oldest age is always selected and given priority according to its preferred ageXsel field. In the case of a tie, the priority block will select the winner according to a round-robin pointer. The pointer advances every grant cycle, regardless of the grant results. To prevent virtual messages from being cut off before ages have advanced to high levels, the robin pointer will not advance until at least one of the OQs has an and age of eight or more (half of its maximum value.)

The priority module requires a full clock cycle to complete the age comparison between all the OQs. Because of this delay, priority information always lags grant decisions by 1 cycle. Because of this delay, priority information always lags grant decisions by 1 cycle. To prevent new messages from inheriting the age of the previous message due to this lag, if the tail flit of a message receives a grant, the next requester from that OQ is treated as if it has a 0 age for one request cycle.

In the case of age ties, the arbiter uses a pseudo-random resolution function to choose a winner. This is important when ages saturate at the maximum value of 0xf, or when the arbiter age function is disabled. When a tie occurs, a winner is chosen at random from the pool or arbitrating OQs. The pseudo-random number is generated using a 15 bit Linear Feedback Shift Register (LFSR). The LFSR is driven by the polynomial $X^{15}+X+1$, which provides an equal balance of 0's in 1's in a non-repeating fashion every $2^{15}$ clocks.

Crossbar Flow Control

Several flow control signals are provided by each IQ (or the unit where no IQ is present) to handle the pipeline depth of the arbiter. The Full and FullIn1 signals must be asserted based on the queue fill-level. The queue fill-level must be updated on the cycle following a valid transfer from the crossbar.

FullIn1 must be asserted whenever there is space available for one or fewer crossbar flits composed of a header or up to two data cycles. Full must be asserted whenever there is not enough space available to handle a single crossbar flit. In queues where headers and data are stored separately, the lack of space for either must cause Full/FullIn1 to be asserted.

Figure 16:
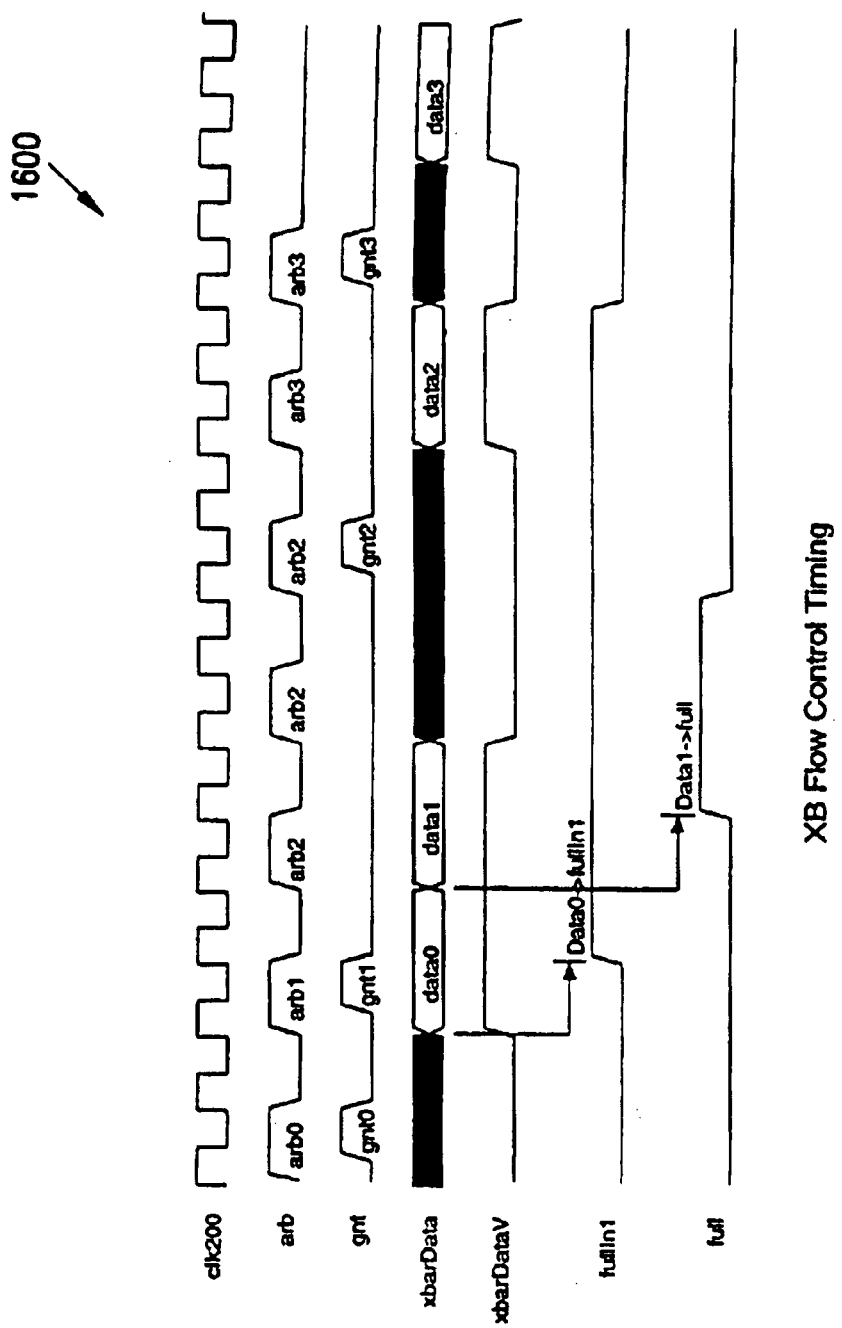
FIG. 16 shows a timing diagram of flow control in XB 279.

See FIG. 16 for a timing diagram illustrating the relationship between crossbar DataV(alid) and the Full, FullIn1 signals.

Arbiter Connectivity

Signals within the arbiter are named with two capital letters specifying the source unit (P0, P1, M0, M1, NO, IO, or LO) followed by an action (arb, gnt, mip), followed by two capital letters specifying the destination input unit (PI, MI, NI, II, LI) Table 30 (see FIG. 16A) summarizes the virtual channels that each queue can use to request input queues. Table 31 (see FIG. 17) summarizes the virtual channels that each queue can use to request input queues.

Datapath Crossbar Interface

Data transfers along the crossbar datapath are qualified with a data valid (DataV) control signal, and tagged with virtual channel (DataVch) and message tail (DataT) information. A single cycle is spent traversing it: data is registered before being presented to the crossbar datapath, and flows into a register after the output multiplexer. Crossbar select lines are controlled by the arbiter and registered as one-hot busses to minimize fall-through latency.

XB Structures

The following sections describe each XB queue structure separately.

POQ Structure

The POQ structure is similar to IOQ structure described below.

MOQ Structure

The MOQ is split into separate header (MOQH) and data (MOQD) queues. The MOQH contains two independent FIFOs (first-in-first-out registers), one for each virtual channel. The data MOQD is a reply-only data FIFO. A FIFO design was chosen over a DAMQ (dynamically allocated multi-queue memory) design for the MOQ because performance sensitive traffic from the MD 275 is of a predictable nature which would not significantly benefit from a DAMQ control structure. The FIFO reduces control logic overhead, and separate independent FIFOs allow request and reply traffic to interleave arbitrarily.

MOQ Data Buffers

Figure 17:
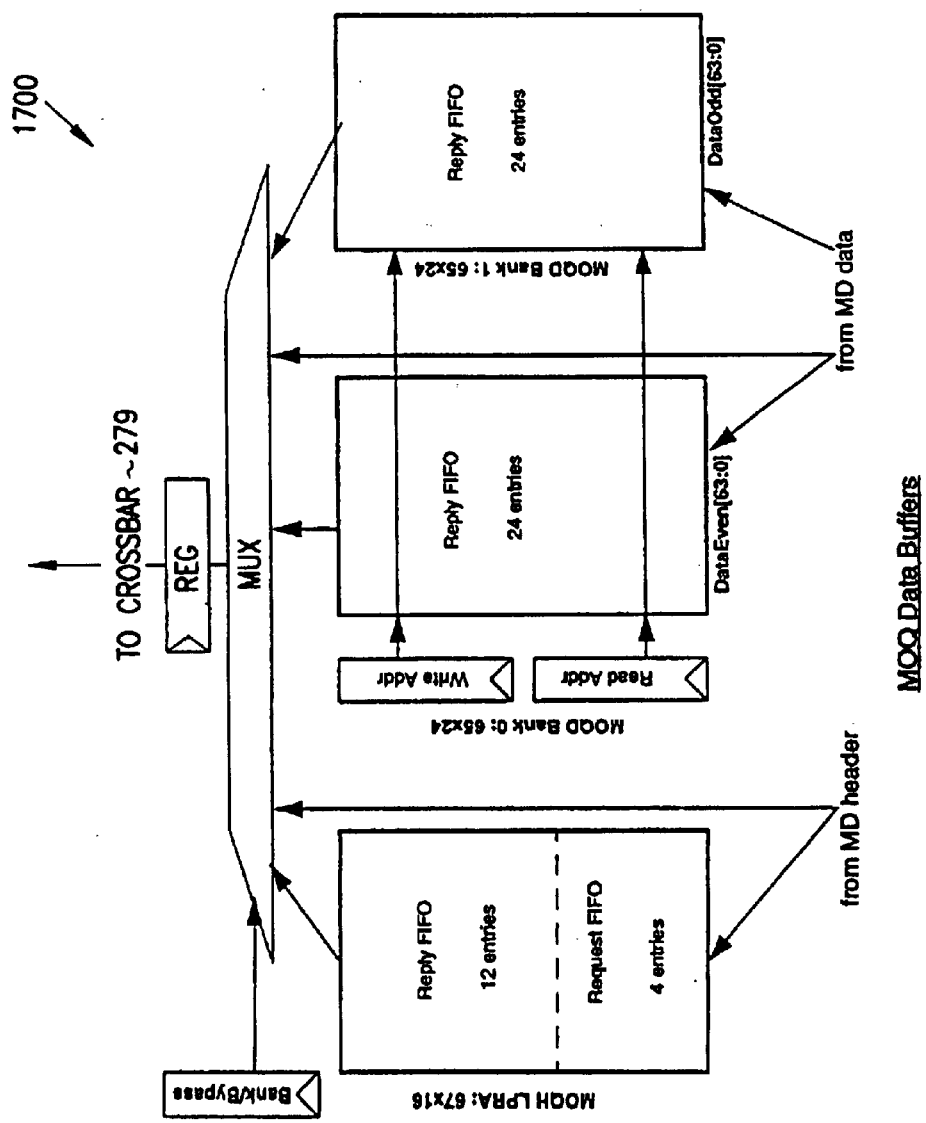
FIG. 17 shows a block diagram of MOQ data buffers.
Figure 18:
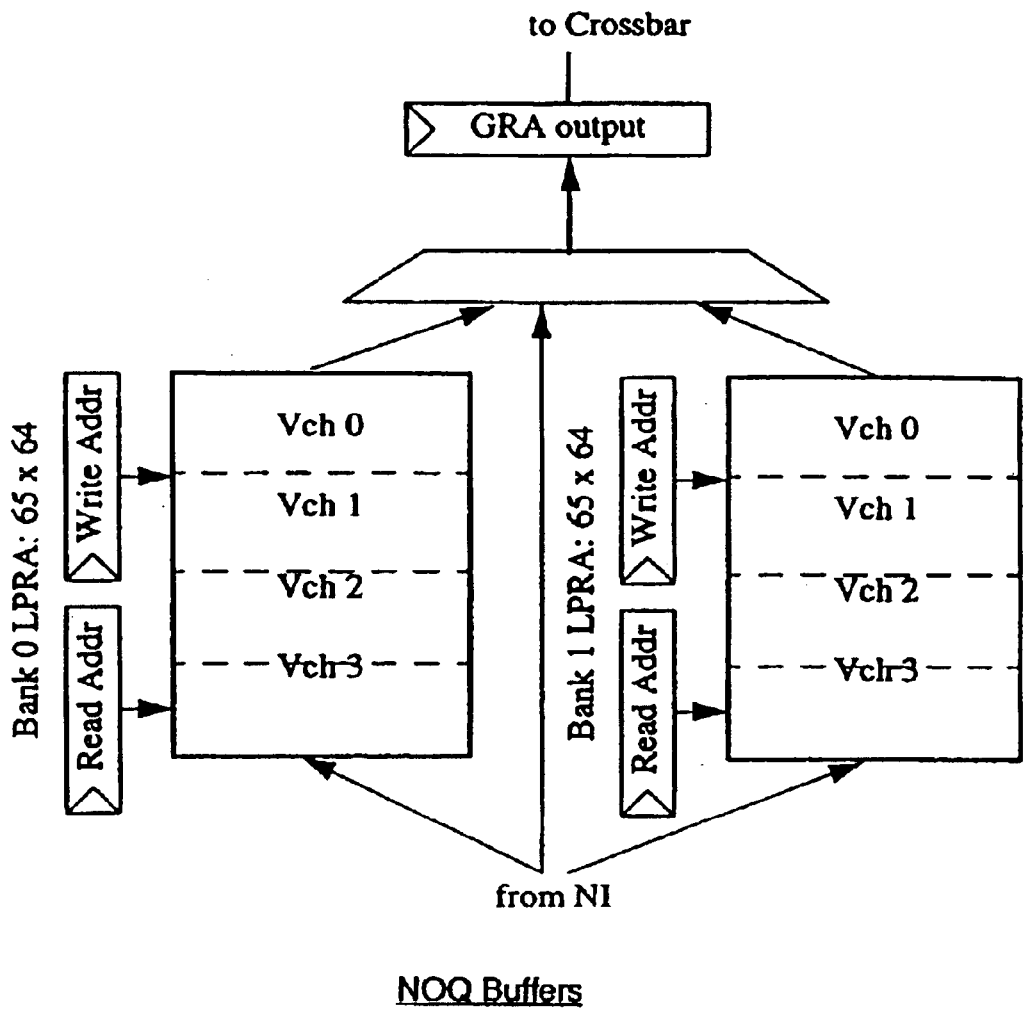
FIG. 18 shows a block diagram of NOQ buffers.
Figure 19:
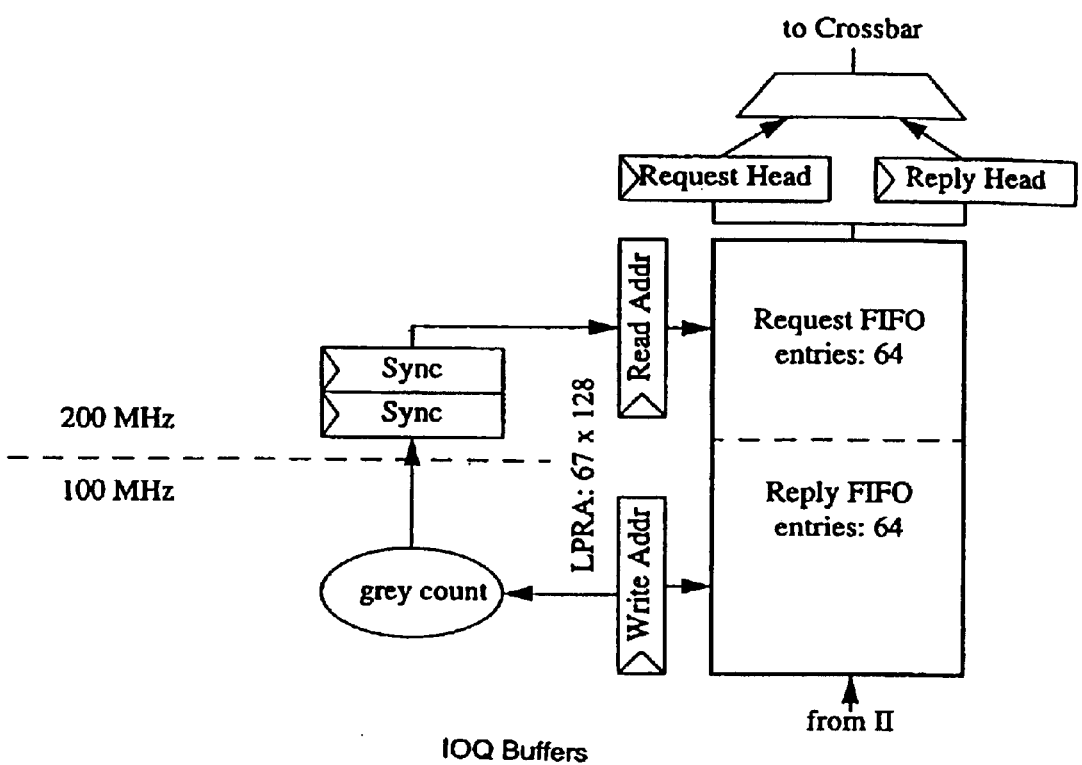
FIG. 19 shows a block diagram of IOQ buffers.
Figure 20:
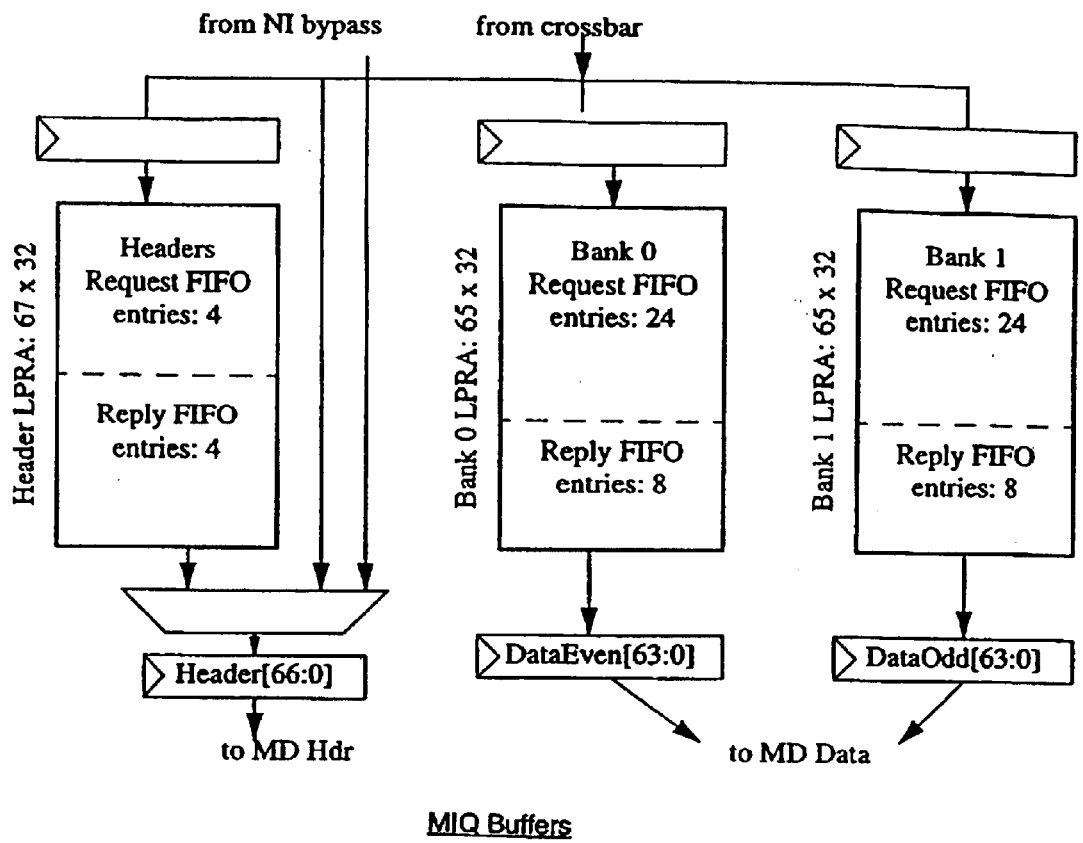
FIG. 20 shows a block diagram of MIQ buffers.

FIG. 17 shows a block diagram of MOQ data buffers 1700.

Request message data travels entirely through MOQH. Short data responses may travel through either queue, based on which section of the MD 275 (header/directory vs. data/memory) generated them. Long (cacheline) data responses always travel through MOQD.

The MOQ request and reply FIFOs are built with suitable FIFO memories. The MOQD uses double-banked FIFOs to accept full bandwidth traffic from the MD 275, while the banks are read alternately to match the bandwidth of the XB 279. The MOQH FIFO is shared among request and reply FIFOs to reduce multiplex levels in the datapath and save on FIFO overhead.

The dual-banked MOQD is managed as a set of quarter cacheline (QCL) response buffers (one QCL=two clocks in each bank). Cacheline responses from the MD 275 consist of four QCL writes, and all partial responses (including F&OP) take up a full QCL. The MOQH contains single clock headers as well as header+single data packets. MOQH reply headers are decoded as they leave the MOQ to determine how many MOQD entries are associated with the header.

Since the MD 275 must reserve MOQ space before issuing a request to the memory, the MD 275 keeps a shadow copy of the fill levels of MOQD and MOQH. Flow control is achieved by a signal per queue that indicates that an entry (single header or QCL of data) has been drained.

NOQ Structure

The NOQ contains the SN1Net network virtual channel receive buffers. Each of the four virtual channel buffers is 16 entries deep, where each entry corresponds to a router network flit—a header or 128 bits of data. Each channel may contain any mix of headers and data. The NOQ buffers are structured as four independent FIFOs.

NOQ Buffers

FIFOs were chosen over DAMQs for the NOQ to reduce control structure overhead. Performance critical messages tend to be read requests to the MD 275 and read responses to the PI 270, and since these message types will travel on separate virtual channels they will not interfere with each other. Writeback messages to the MD 275 will share the request channel with read messages to the MD 275, but this effect will be countered somewhat MD 275 request processing favoring reads and by virtual channel adaption in the network encouraging reads to take the emptier channels. Since each of the four virtual channels has an independent FIFO cable of XB arbitration, the effects of network virtual channel adaption are carried forward to the Bedrock XB 279.

The four logical FIFOs in the NOQ are implemented across a dual banked FIFO structure. This structure allows each FIFO to be 65 bits wide, and requires that headers be written and read out across both banks.

IOQ Structure

The IOQ must synchronize traffic coming from the II 273 to the hub core clock domain. This is done with a standard double synchronizer applied to a gray code counter. When the POQ receives a message on the hub core side, it will arbitrate for the XB 279 once the entire message is received. This is done for block length messages to prevent the higher bandwidth XB 279 from underrunning the IOQ FIFO. The IOQ is divided into independent request and reply FIFOs, although they do share the same buffer memory FIFO.

PIQ Structure

The PIQ receives data from the XB 279 and writes it into an FIFO to be read by the PI 270. There are 64 entries for each of the Request and Reply channels. In Synchronous mode, the data can be bypassed from the XB 279 to PI 270.

MIQ Structure

The MIQ is divided into four logical FIFOs, implemented in 3 FIFOs. Headers are buffered in a single bank, request/reply MIQH, and a dual banked request/reply MIQD holds associated data. The MIQD buffers are divided into 3 block request entries and 1 block reply entry, as request data to the MD 275 is more common than reply data.

MIQ always presents a single header to the MD 275. If only one virtual channel contains a valid header, the MIQ will present the valid header and indicate request or reply. If the MIQ has a valid header in both channels, it will always present the reply channel to the MD 275, as long as the MD 275 is not asserting its reply channel full signal. When the MD 275 is ready to consume a header, it asserts the HeaderRead signal, which frees that entry off the queue.

IIQ Structure

The IIQ receives data from the XB 279 at the core data rate of 1.6 GB/s and writes it into the GRA in either the request or reply FIFO. After the write pointer is synchronized to the IO clock domain, it can be read by the II 273 at 0.8 GB/s. There is no bypass datapath in the II queues.

LIQ Structure

The LIQ provides a dedicated queue for PIO request from NI 274. PIO request is rare, but higher priority, to avoid the Request-Request PIO deadlock. While servicing LINVAL, LB needs to be able to service an incoming remote PIO request from NI 274. The only request NI 274 can make to LB is PIO request. Requests can bypass the FIFO, and Replies are written to the output register, and never enter the FIFO. The Reply register is free running since LB can process Reply every cycle with no delay.

Queue Sizes & Types

Figure 21:
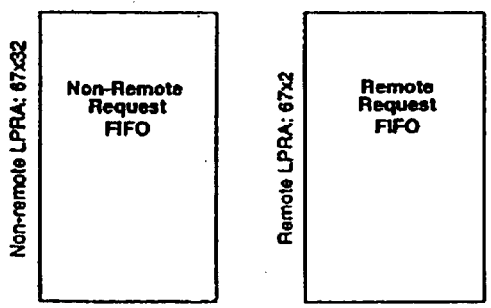
FIG. 21 shows a block diagram of LIQ buffers.
Figures 23, 23A:
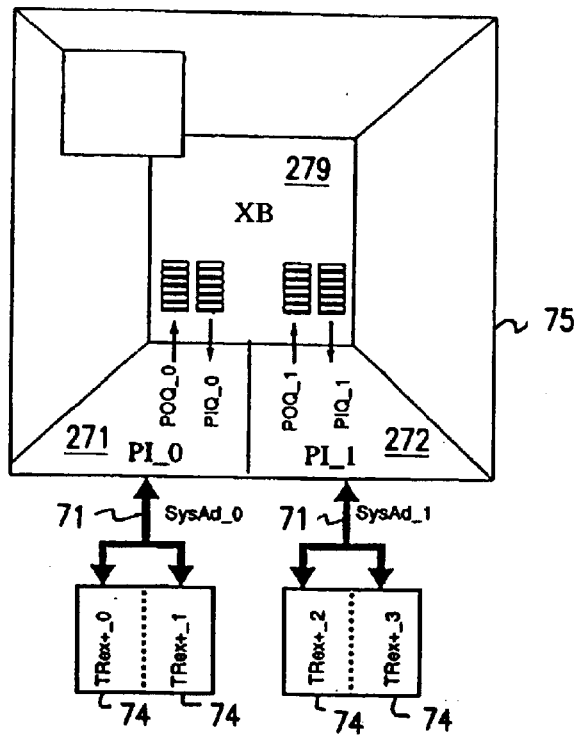
FIG. 23 shows a block diagram of PI 270.
FIG. 23A shows speeds for SYSAD interfaces for some T-Rex speeds and clock divisors.
Figure 24:
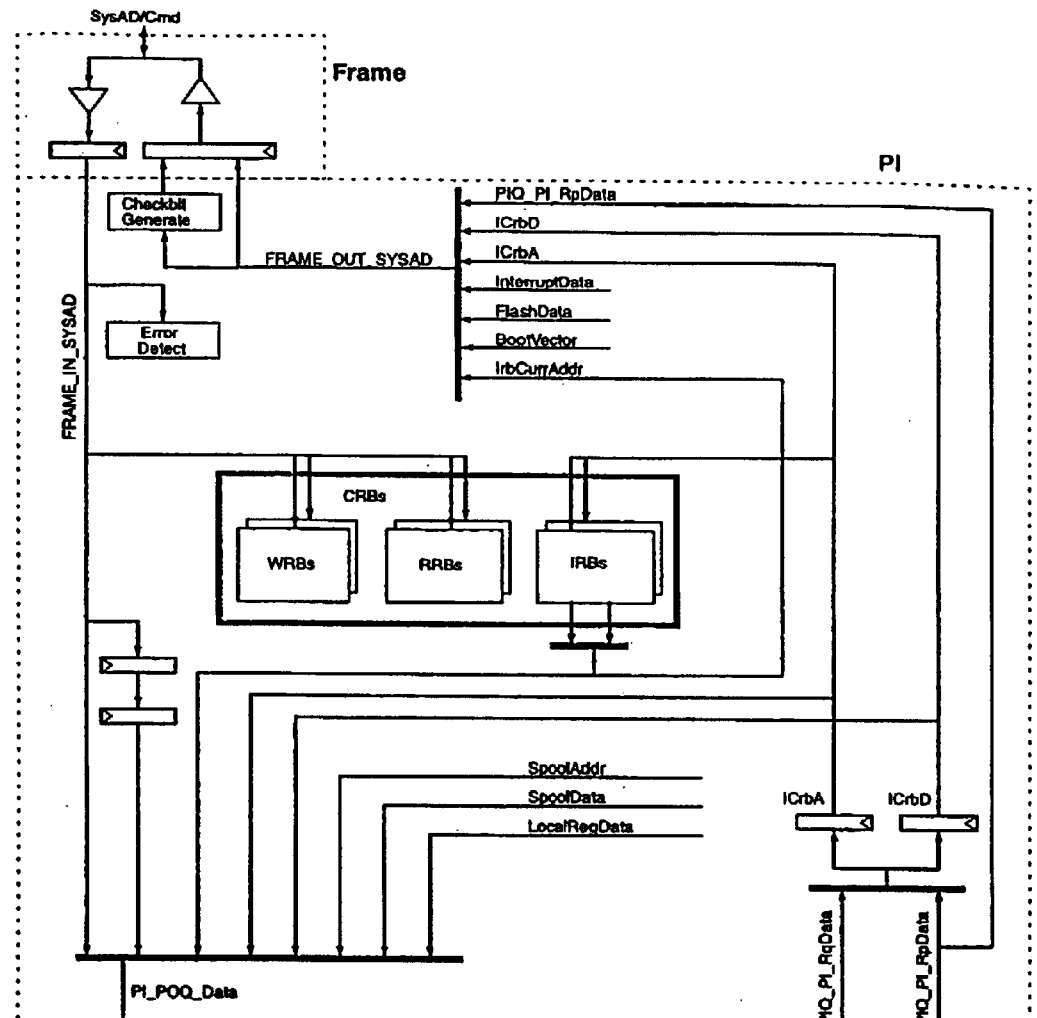
FIG. 24 shows a block diagram for the address and datapath for PI 270.
Figure 26:
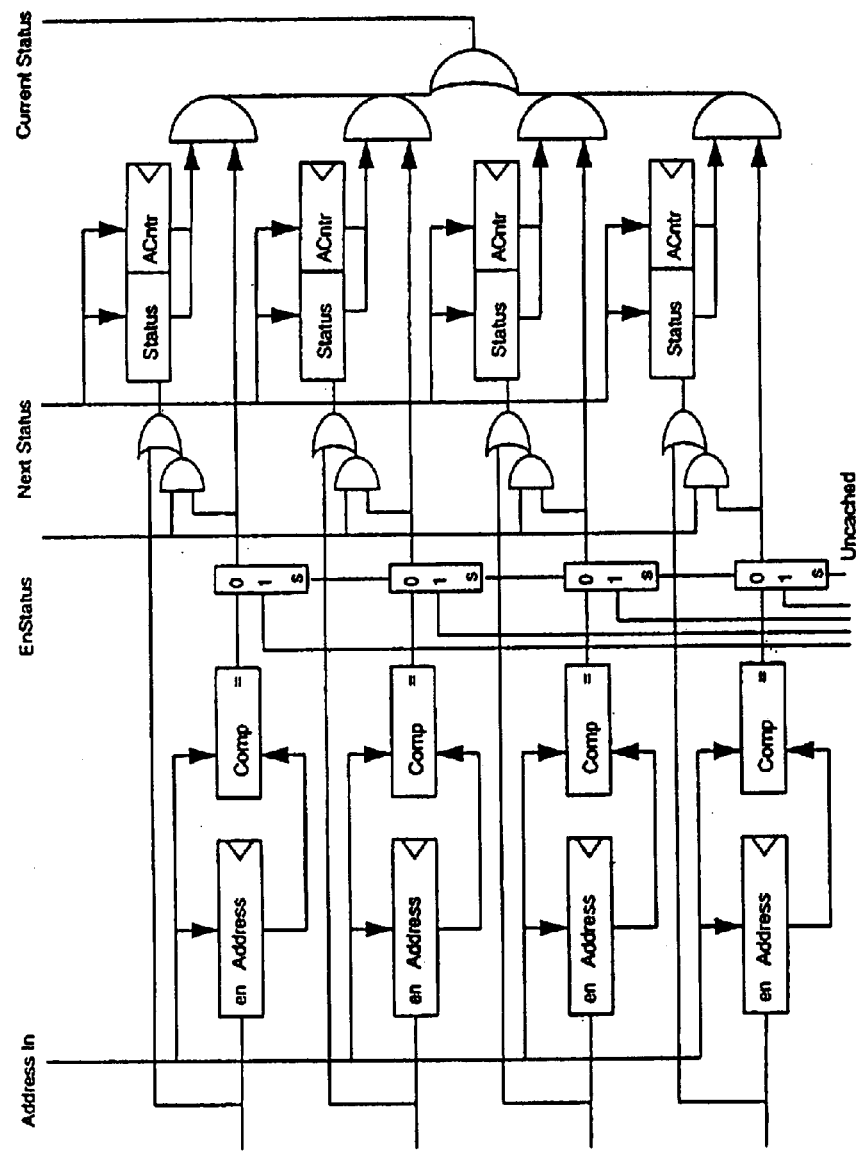
FIG. 26 shows a block diagram of an RRB.
Figures 27, 27A:
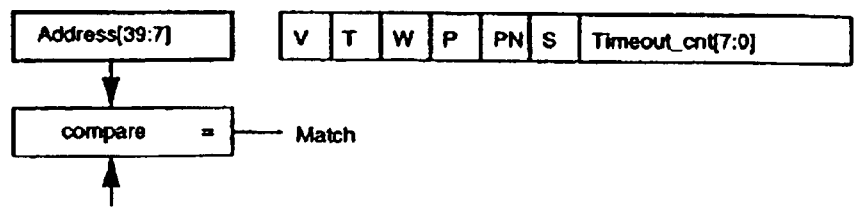
FIG. 27 shows a data structure diagram of a WRB element.
FIG. 27A is a table (Table 35) of WRB status bits.
Figure 29:
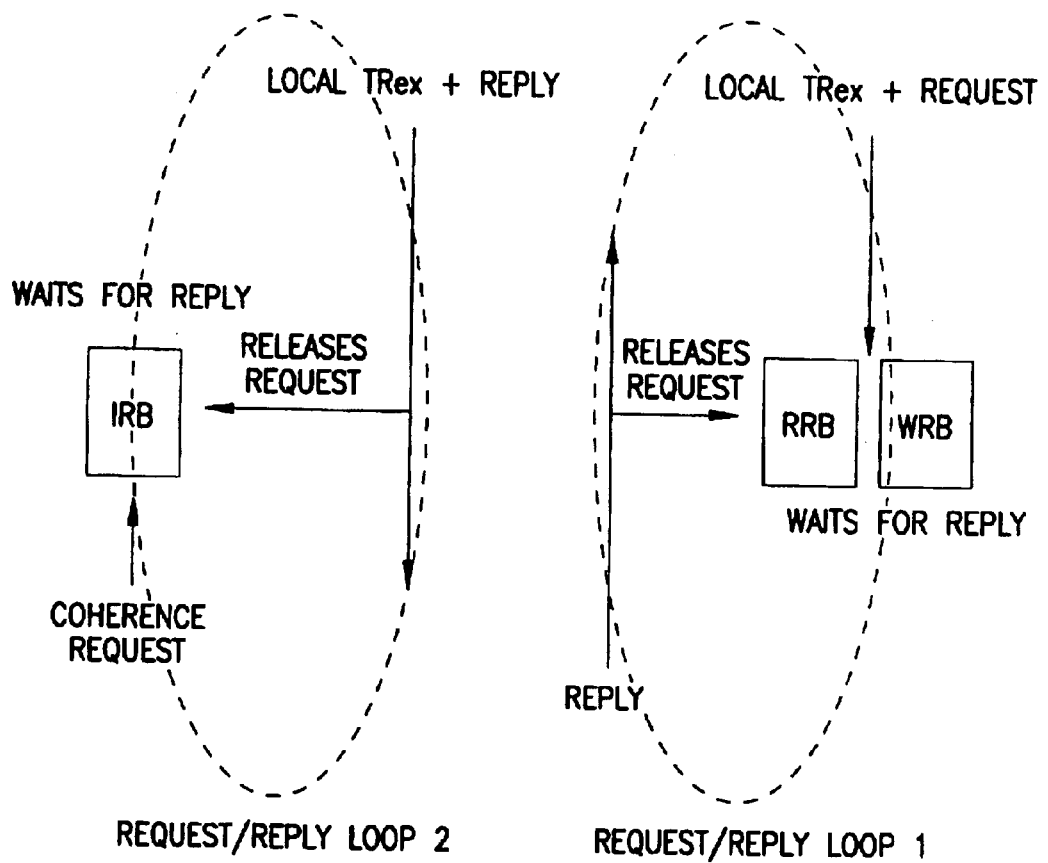
FIG. 29 shows a diagram of functions provided by a PI 270 of one embodiment of the present invention.
Figure 30:
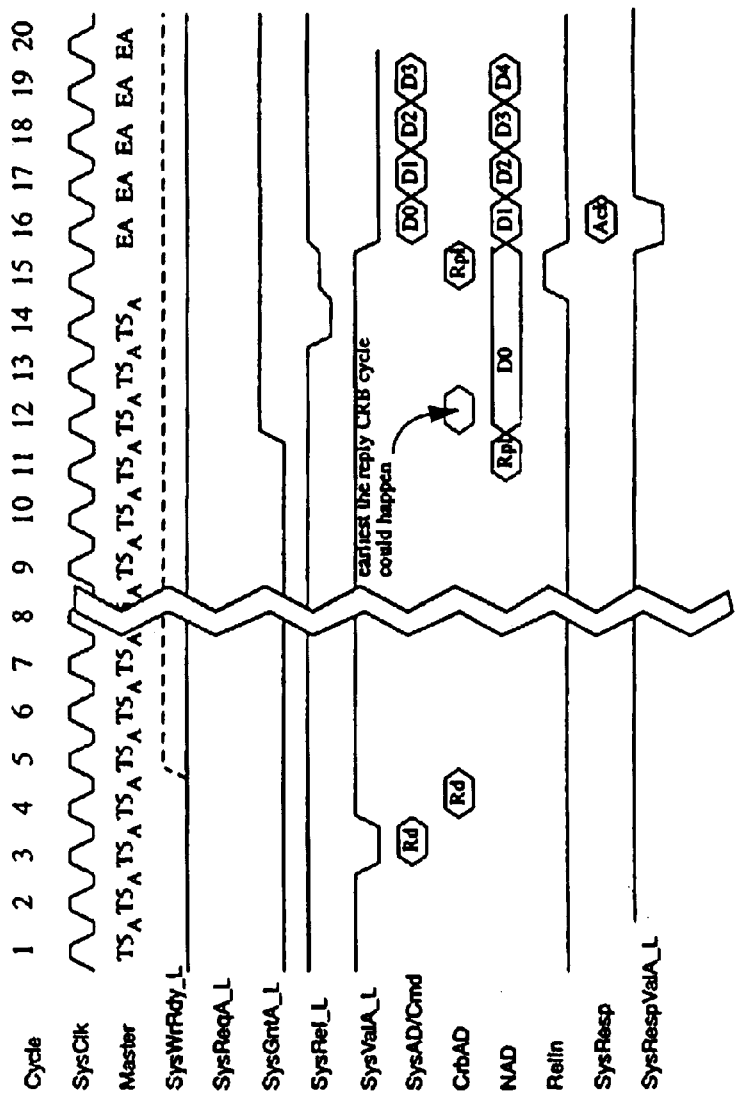
FIG. 30 is a timing diagram for SYSAD arbitration for a T-Rex external block data response.

In one embodiment, the XB queue structures are implemented with IBM CMOS 6s Low Power Register Arrays (FIFOs) (available from IBM Corp of Burlington Vt.), or with standard registers where the queue size does not justify the FIFO's gate overhead. Table 32 (shown in FIG. 21A) summarizes the size and type of each queue in the XB 279.

RLMs

FIG. 22 details the breakdown of the XB functional units into RLMs for physical design.

Memory/Directory Interface

The Bedrock (one embodiment of node controller 75) Memory/Directory Interface (MD) 275 controls access to all the memory in a Bedrock system. In addition to performing the standard memory controller operations, such as reading and writing memory, the Bedrock MD 275 keeps track of exactly which processors and which IO interfaces are currently using every cache line in the system. On every access, the Bedrock MD 275 checks this table (called the Directory) and generates the necessary messages in order to maintain cache coherence.

Figure 31:
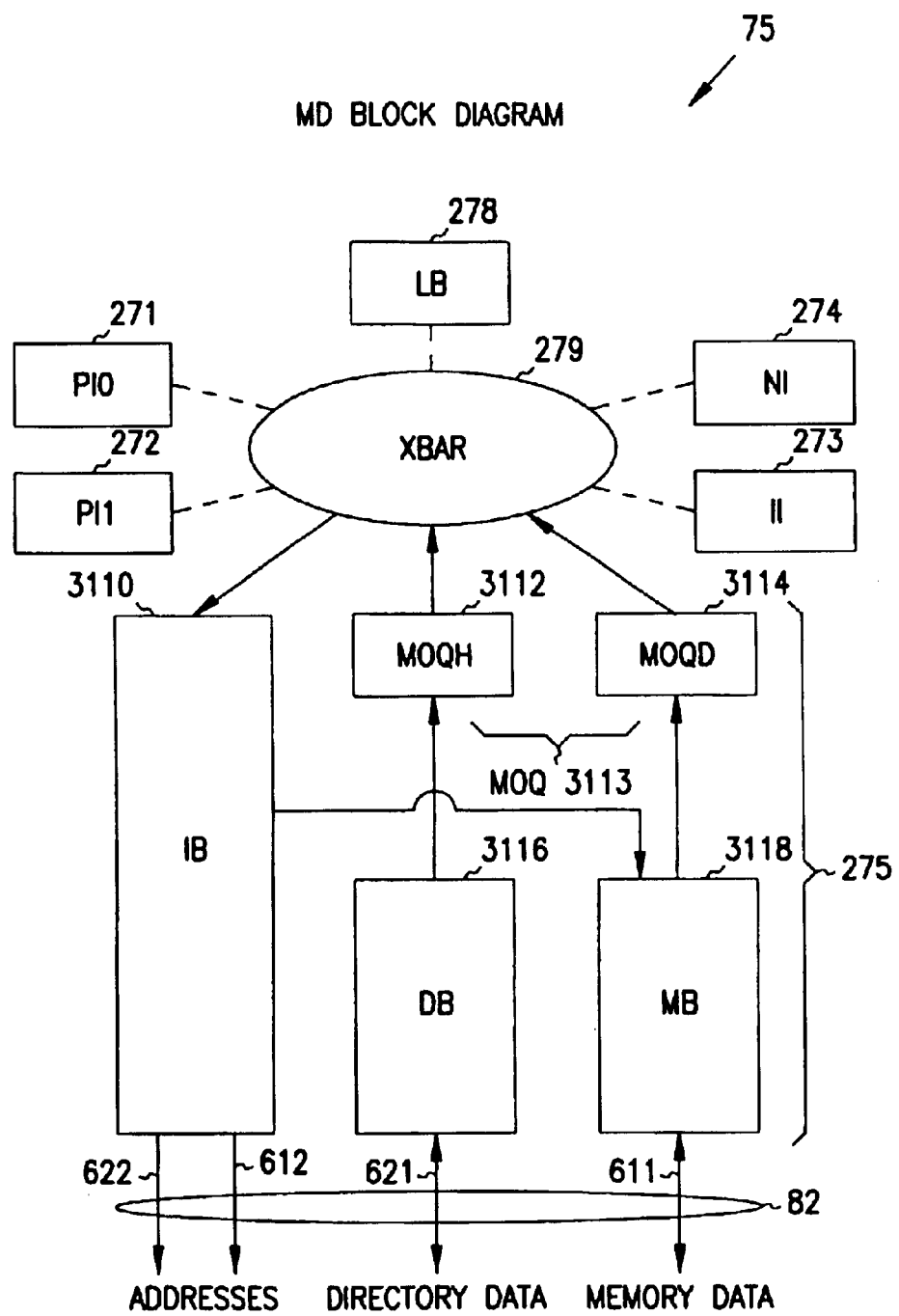
FIG. 31 is a block diagram of one embodiment of MD 275.

The Bedrock MD 275 provides enough bandwidth to fully satisfy any single class of requestors. In other words, all four processors or both directions of the SN1 net or both directions of the IO interface can access memory at full bandwidth. The Bedrock MD 275 also provides the arbitration structures necessary to fairly and efficiently allocate bandwidth when multiple requesters are accessing memory. The "Architecture" section contains an architectural level overview of the MD 275, covering the following topics:

Memory Addressing
Page Handling
Interfaces
Message Types
Protection Model
Page Counters
Fetch-And-Op
Backdoor ECC
Backdoor Directory
Junk Bus
SDRAM Initialization
DDR-SDRAM Initialization
Refresh
Built-In-Self-Test
SN0 Compatibility Subsequently, the major architectural blocks are described, of which there are three (illustrated in FIG. 31):

Issue Block (IB) 3110: Takes in all new messages and issues them in an efficient and fair order to the rest of the memory system. Issues address and control signals to the DRAM.

Memory Block (MB) 3118: Transfers data from the DRAM to the XBAR or from the XBAR to the DRAM.

Directory Block (DB) 3116: Reads the directory data, creates any necessary message headers, computes the new directory data, and writes it back.

Then implementation information that crosses multiple architectural blocks is discussed:

DDR Synchronization
Timing Diagrams

Architecture

This section first gives a detailed description of the overall memory system design. The following sub-sections then explain the higher level architectural features built on top of the memory system.

Memory System

The Bedrock memory system includes a Bedrock chip, some clock buffers, a flash prom, a UART, four banks of LEDs, and two, four, six, or eight DIMMs (Dual Inline Memory Modules).

Figure 42:
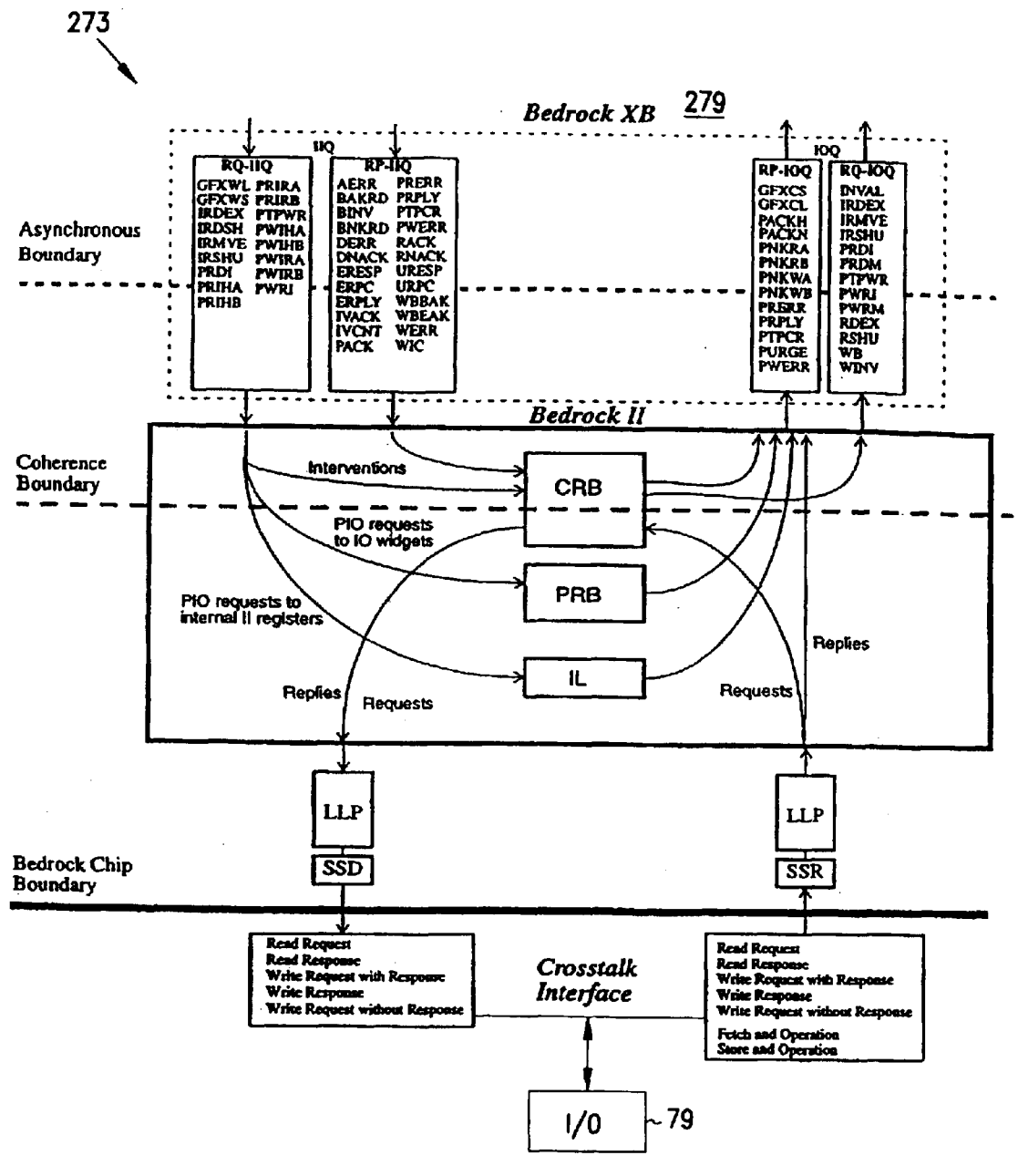
FIG. 42 shows a high level diagram of the IO unit and its position relative to the rest of node controller 75 and input/output port 79.

Each Bedrock DIMM consists of one or two 72-bit sub-banks of memory DRAM and one or two 16-bit sub-banks of directory DRAM. FIG. 42 shows a diagram of the front of a Bedrock DIMM. In a two bank DIMM, the back of the DIMM would be the same as the front.

DIMMs can be populated (or not populated) in groups of two, resulting in a 128-bit wide memory system (plus 16 bits of ECC and 32-bits of directory). In order to accommodate different system uses, the Bedrock MD 275 supports many different sizes of DIMMs. Each set of two DIMMs must be of the same size.

Figure 32:
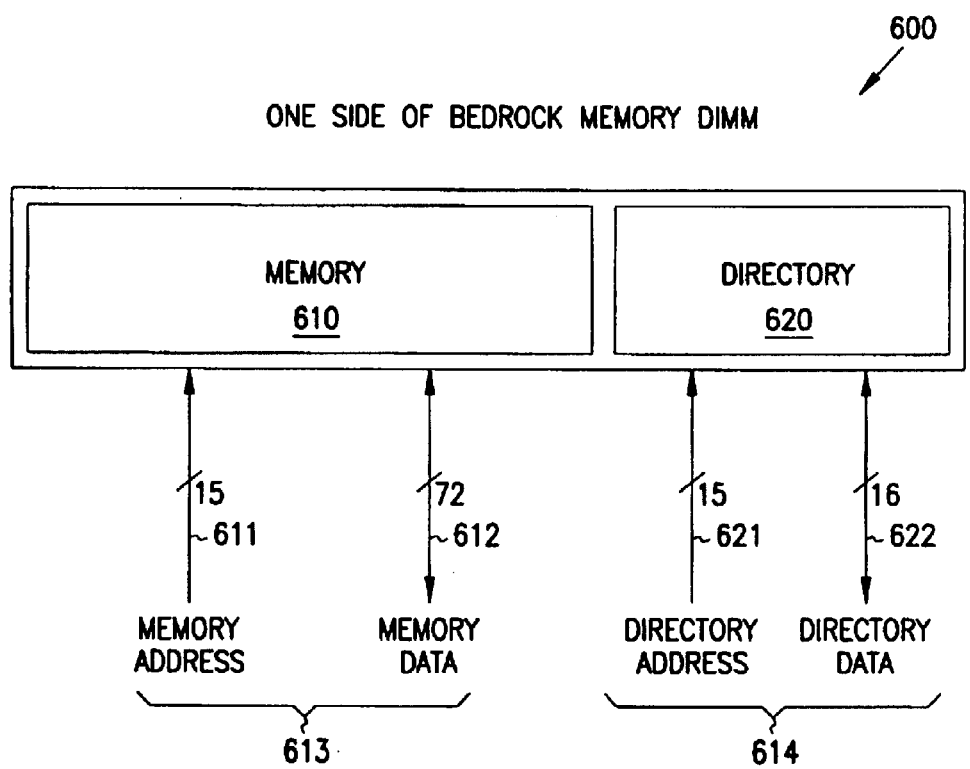
FIG. 32 is a block diagram of one embodiment of a memory DIMM 600.
Figure 33:
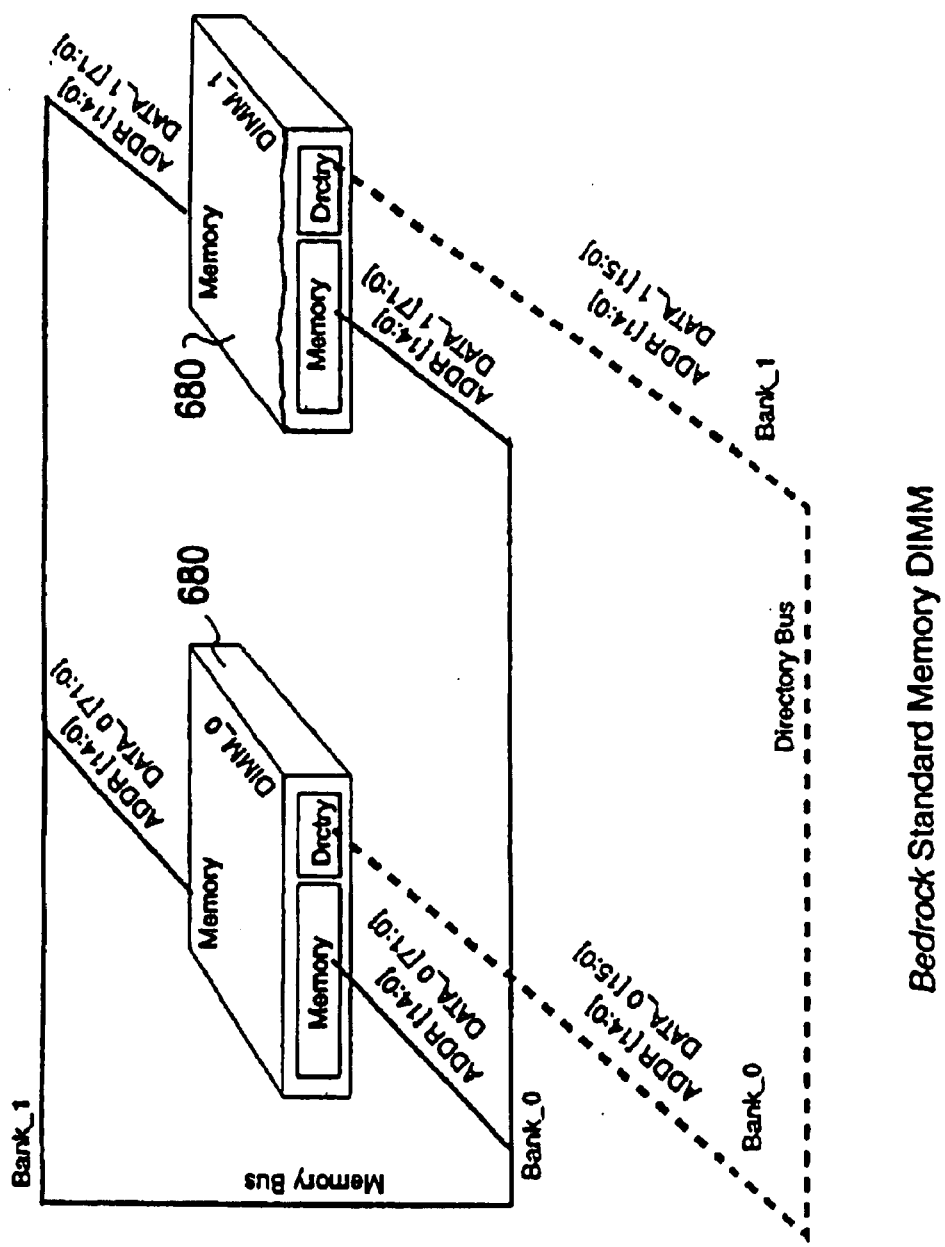
FIG. 33 is a block diagram of one embodiment of a pair of "standard" memory DIMMs 680.

The Bedrock MD 275 supports the following DIMM sizes: 32 MB, 64 MB, 128 MB, 256 MB, 512 MB, and 1 GB. Table 58 (see FIG. 32A) shows information on each potential DIMM configuration (shaded rows are the most likely DIMMs the SN1 system will actually use).

The Bedrock MD 275 supports two different types of DIMMs: DDR-SDRAM-std, and DDR-SDRAM-prm. DDR-SDRAM are special versions of SDRAM that output data at twice the rate that they receive addresses. All production Bedrock systems will use DDR-SDRAM.

Standard (std) DIMMs contain one bank of directory DRAM for every two banks of memory DRAM. Premium (prm) DIMMs contain a bank of directory DRAM for every bank of memory DRAM. Systems containing up to 128 processors can use Standard DIMMs. Premium DIMMs will work in any system (up to the max of 1024 processors).

The address bus from the Bedrock chip to the DIMMs always runs at 100 MHz. The data bus between the Bedrock chip and the DIMMs runs at 200 MHz. The maximum bandwidths is therefore 3.2 GB/s.

Directory Organization

The Bedrock MD 275 maintains system cache coherence by checking a directory memory on every coherent access of the memory system. Since each access changes the state, the Bedrock MD 275 must perform a read-modify-write of the directory memory in parallel with every read or write of the data memory.

Figure 41:
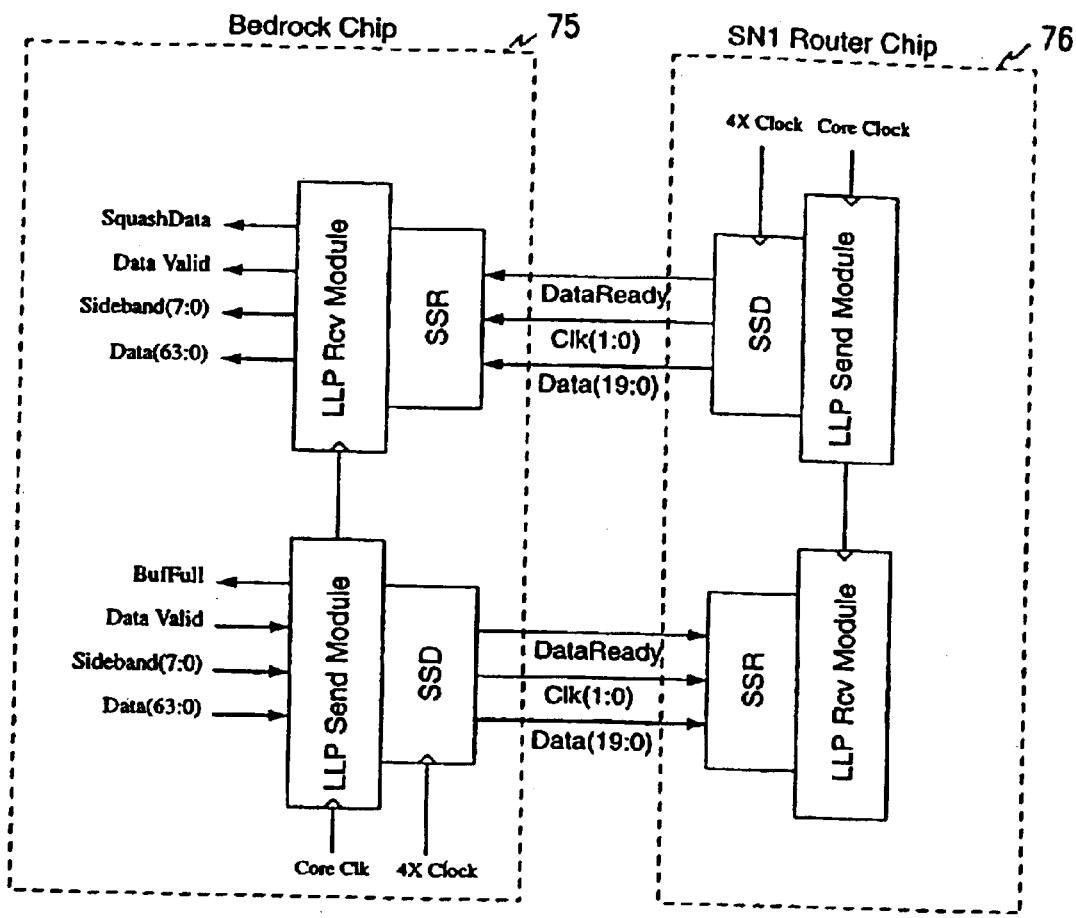
FIG. 41 shows a block diagram of the connections between node controller 75 and router 76 of one embodiment.

In a system populated with DDR-SDRAM-std DIMMs, there is one bank of directory DRAM for every two banks of memory DRAM. As DIMMs are populated in groups of two, the Bedrock MD 275 can share the two banks of directory DRAM (one on each DIMM) between the two banks of memory DRAM (spread across the two DIMMs). This results in an effectively 16-bit wide datapath that could enter the Bedrock MD 275 on either side of the 32-bit directory datapath. As the standard directory entry is 32-bits, it is read and written over two cycles. FIG. 41 shows a schematic illustration of a standard directory system (with two banks of memory DRAM and one bank of directory DRAM per DIMM).

In a system populated with DDR-SDRAM-prm DIMMs, there is one bank of directory DRAM for every bank of memory DRAM. In this case, the directory banks are spread across the two DIMMs in the same manner as the data, allowing the full 32-bit directory datapath to be utilized. As the premium directory entry is 64-bits, it is also read and written over two cycles. FIG. 42 shows a schematic illustration of a single premium DIMM in a premium directory system (with two banks of memory DRAM and two banks of directory DRAM).

Memory Addressing

A maximum memory configuration in M-Mode of eight 1 GB DIMMs results in an address space of 8 GB. A maximum configuration in N-mode of four 1 GB DIMMs results in an address space of 4 GB. The Bedrock MD 275 allocates two blocks of 1 GB for each set of two DIMMs. The DIMMs with two physical banks use both blocks, while one bank DIMMs just use a single block. If a set of DIMMs does not completely fill the 2 GB space, the OS is expected to allocate around the resulting gaps in memory. The minimum memory configuration would be two 32 MB DIMMS or 64 MB.

Figure 34:
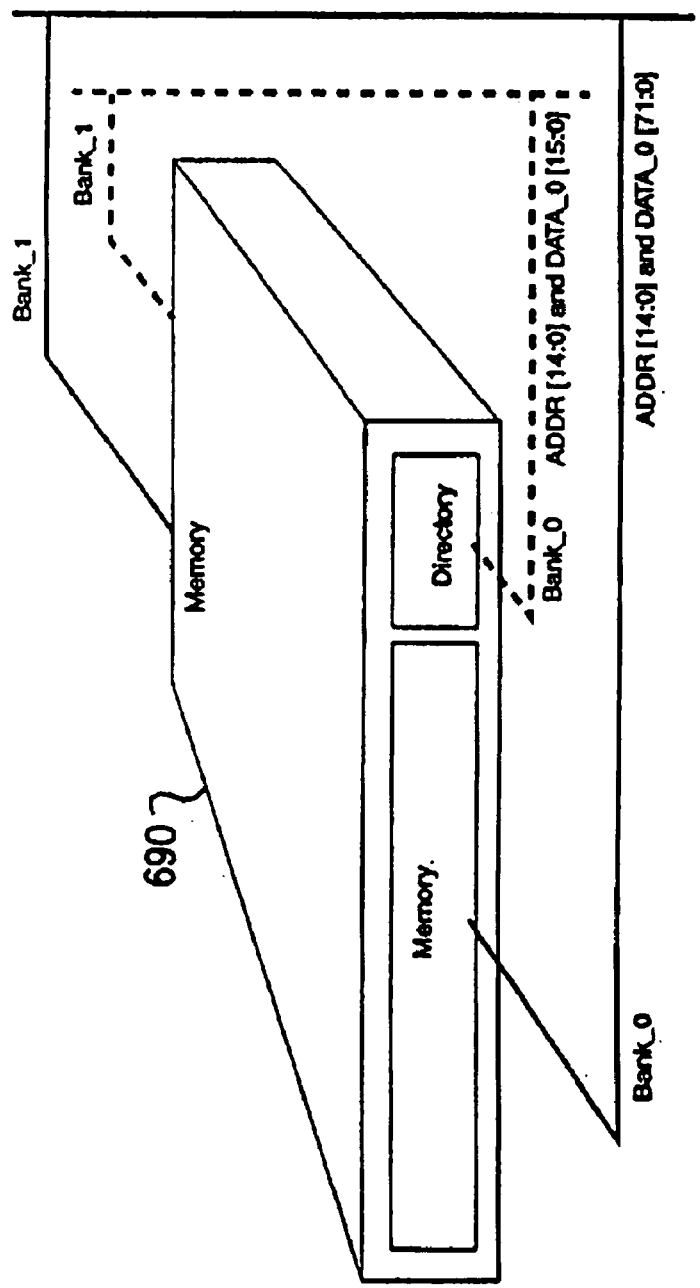
FIG. 34 is a block diagram of one embodiment of a pair of "premium" memory DIMMs 690 (wherein one half of the pair is shown).
Figure 35:
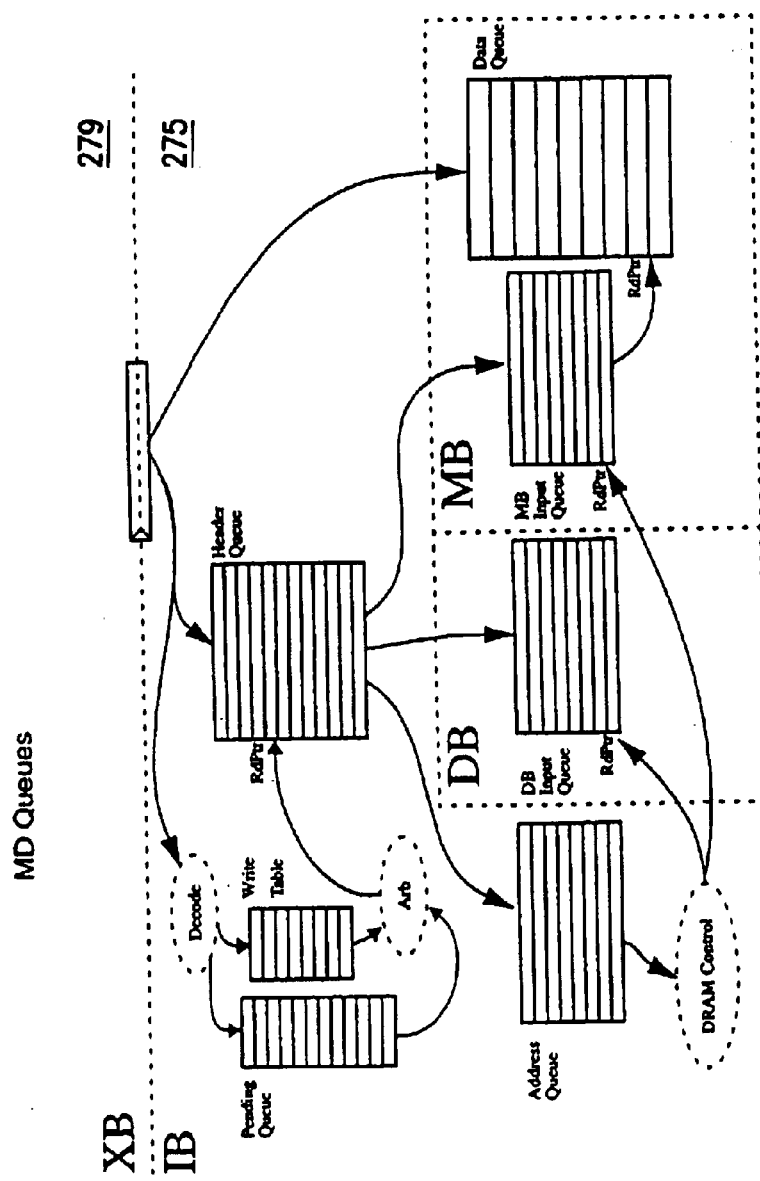
FIG. 35 is a block diagram of one embodiment of the queues of MD 275.

All of the DDR-SDRAM supported by the Bedrock MD 275 contain four internal (logical) banks. The Bedrock MD 275 interleaves across these four logical banks using the lowest possible address bits (right above the cache line size of 128 bytes). Table 59 (see FIG. 34A) shows how each address bit is used. The Bedrock MD 275 drives all the pins shown even if the smaller DIMMs might not receive or interpret every bit. Memory

Directory Addressing

On every coherent transaction, the Bedrock MD 275 performs a read-modify-write of the directory entry. In addition, it might perform a read of the protection entry and/or a read-modify-write of the page counter entry. The directory entry, protection entry, and page counter entry are all stored in the directory. The DIMM, Physical, Logical, and RAS addresses shown in Table 59 are the same for both memory and directory addresses. However, the directory CAS addresses are different for each type of entry. In the CASDir, CASProt, and CASCount fields, the constants are defined as follows: D=0, P=1, C=0, x=0, and Rgn refers to bits 4:0 of the protection region.

Page Handling

The SDRAM and DDR-SDRAM used in Bedrock, like all DRAM, are accessed using a row address and a column address. Multiple column addresses can be read sequentially without any extra delay. In order to change rows (also called pages), the DRAM must close the old row and only then open the new row. For this reason, an access to a new row is much more costly than an access to a new column.

In spite of this fact, the Bedrock MD 275 always closes the row (page) immediately after a transaction has finished (regardless of the address of subsequent transactions). This decision was made for a couple of reasons:

- By doing 4-way interleaving on the cache-line address and supporting full pipelining of four requests, the Bedrock MD 275 can still achieve full bandwidth.
- When multiple interfaces (and therefore multiple streams) are accessing memory (the only time when the memory interface can reach full bandwidth), keeping pages open loses much of its effectiveness.
- When a single stream is accessing memory, the excess bandwidth and the reordering capability of the arbitration logic can mitigate most, if not all, of the performance difference relative to keeping the page open.

Transaction Grouping

A full cache line read can move across the 128-bit wide memory interface in eight 5 ns cycles. Unfortunately, it takes 12 5 ns cycles to perform the directory read-modify-write necessary to maintain cache coherence. For this reason, the Bedrock MD 275 groups all transactions (whenever possible) into pairs. In this way, two reads, two modifies, and two writes can take place underneath two data reads or writes without losing any bandwidth. The Bedrock MD 275 can group any two coherent or full cache-line transactions. All partial transactions must execute by themselves.

Interfaces

The Bedrock MD 275 connects to the rest of the Bedrock system through the Bedrock crossbar. A single 1.6 GB/s link handles data and headers entering the MD 275 from the crossbar. Three 1.6 GB/s links handle data and headers entering the crossbar from the MD 275.

In order to better utilize the memory system, the Bedrock MD 275 treats requests from PI0, requests from PI1, requests from the NI or II, and replies as four separate virtual channels. By doing this, the MD 275 prevents bottlenecks where one stream would have to wait for a competing stream to drain before continuing. When messages arrive in the MD 275 (into the IB block), they are written into separate input queues based on their virtual channel. When messages leave the MD 275 (into the MOQ 3113; see FIG. 31), they are written into separate output queues based on their virtual channel (replies to PI0, replies to PI1, replies to NI or II, and requests). The arbitration engine in the IB block assures that the MD 275 fairly allocates bandwidth between the channels.

Message Types

At a high level, all the Bedrock MD 275 does is receive messages from the crossbar and generate responses back into the crossbar. For reference, Table 60 (see FIG. 34B) and Table 61 (see FIG. 34C) show all the messages received and generated by the Bedrock MD 275. The directory table (described in the SN1 Cache Coherence Protocol Specification) determines exactly which set of outgoing messages are generated in response to a particular incoming message.

Protection Model

A Bedrock system can scale up to 1024 processors. It would be almost impossible to run a single shared-memory operating system on a system that large. In order to make such systems usable, the Bedrock system must include support for multiple operating systems running on the same shared-memory base. In general, each operating system controls its own environment and can reset or reboot independently from the rest of the system. In order to prevent a single such operating system from taking down the entire system, the Bedrock MD 275 prevents certain processors or IO widgets from accessing certain memory regions. The information used to prevent access is stored in a special protection area of the directory memory and read, along with the directory, on every access.

In order to limit the amount of information needed, the Bedrock system stores protection information based on the region of the requesting processor or IO widget. There are never more than 64 regions in a system. For smaller systems (less than or equal to 64 Bedrock chips), one Bedrock chip equals a region. For systems between 65 and 128 Bedrock chips, two Bedrock chips equals a region. For large systems (up to 256 Bedrock chips or 1024 processors), four Bedrock chips equals a region.

For the most part, all processors and IO widgets inside the same operating system (also called cell) will have the same protection. For this reason, the Bedrock MD 275 uses a 64-bit local register called CurrentCell to specify which regions are inside the same operating system as the Bedrock chip. For requests from these "local" regions, the Bedrock MD 275 checks a single bit inside the directory entry. For all other requests, the Bedrock MD 275 reads a separate part of the directory memory that contains four bits for each region in the system (one for Processor Reads, Upgrades, and Write Invalidates, one for Processor WriteBacks and Replies, one for IO Reads and Write Invalidates, and one for IO Writebacks and Replies). Processor and IO protection are separated in order to allow cross-cell DMA without lowering the firewalls. Reads, Upgrades, and Write Invalids are separated from Writebacks and Replies in order to allow a two stage cell removal process (first disallow reads, then pull the cache lines to the home node, and then finally disallow writes and replies). For details on how to access the protection entries, please refer to the SN1 Programming Manual.

If a READ, RDSH, RDEX, REXU, or UPGRD request hits a line for which it does not have access, the Bedrock MD 275 returns an AERR (Access Error) instead of a normal response. If a WINv request hits a line for which it does not have access, it does not write the memory, and returns a WERR (Write Error). If a WB request or a SHWB, SXWB, or PGWB reply hits a line for which it does not have access, the Bedrock MD 275 acts differently if the requestor is inside or outside the CurrentCell. For requests or replies from inside the cell, the data is written to memory regardless of the protection value. If the firewall has been breached, the MD 275 returns a WERR message (in the case of a WB), stores error information in the MISC_ERROR register, and sends an interrupt to both local PIs. For requests and replies from outside the cell, the Bedrock MD 275 treats the WB, SHWB, SXWB, or PGWB the same as a WINV and does not write the memory unless the protection is valid.

Non-coherent read requests (RSHU and PRDU), do not check protection and can therefore be used to create safe communication between cells. PWRU requests check protection and are treated the same as a WINV PRDM and PWRM requests both check protection when they miss in the fetch-and-op cache. They both use a separate 64-bit protection field that is cached along with the fetch-and-op variable for cache hits. PRDH requests do not check protection. PWRH requests use the CurrentCell register as their protection register (preventing any processor outside the cell from writing to HSPEC space). The UAlias portion of HSPEC space (a non-coherent read section that is placed in HSPEC for internal R10000 reasons) is treated here as part of USPEC spec. For more information on USPEC, MSPEC, and HSPEC space, please refer to the SN1 Programming Manual.

Page Counters

In a NUMA (non-uniform memory architecture) machine such as Bedrock, program performance will change based on the placement of important data structures. In general, data wants to be close to the processors that access it. However, ensuring that the data is always placed correctly is a non-trivial problem and can not always be guaranteed. The Bedrock chip supports page migration in order to improve the situation when the operating system and application do not place data correctly.

Every operating system page (16 kB) contains four sets of two counters. Each set of counters refers to an interleave of the memory. Therefore, set 0 refers to cache lines 0, 4, 8, 12, etc, set 1 refers to cache lines 1, 5, 9, 13, etc, set two refers to cache lines 2, 6, 10, 14, etc, and set 3 refers to cache lines 3, 7, 11, 15, etc. While this is not an intuitive mapping of counters to addresses, it is necessitated by the decision to interleave on cache line boundaries.

The two counters that make up each set are a local counter and a remote counter. Local and remote are determined by a local register inside the Bedrock MD 275. This register (called the MigNodeMask) contains a 9-bit chipid mask (supporting up to 512 Bedrock chips). For any given access, if the source chipid ANDed with the mask is the same as the MD 275 chipid ANDed with the mask, then the access is considered to be local. Otherwise, the access is considered to be remote.

The counters themselves are stored in the directory memory along with the directory entries and the protection information (for a complete map of the directory memory, refer to the SN1 Programming Manual). In order to prevent the directory access from impacting memory bandwidth, the Bedrock MD 275 only increments and checks these page counters on every nth access. The value of n can be set in the MigIntervalCount local register.

On an access that results in a counter check, both counters are read into the Bedrock MD 275. If the access was local (as determined by the mask), then the local counter is incremented. If the access was remote, then the remote counter is incremented. After the increment, the incremented counter is compared against a threshold (set in the MigValueThresh register) and the difference between the two counters is compared against a threshold (set in the MigDiffThresh register). Two control bits (ValueInterrupt and DiffInterrupt) are read from the directory along with the counter. If the ValueInterrupt bit is set, then the MD 275 will send out an interrupt if the MigValueThresh was exceeded. If the DiffInterrupt bit is set, then the MD 275 will send out an interrupt if the MigDiffThresh register is set. See the SN1 Programming Manual for a full description of MD interrupts. Even if the corresponding interrupt bit is not set, exceeding either counter will cause the address and source of the access to be stored in the MigCandidate register. If either counter saturates on the increment, both counters will be shifted right by one.

Fetch-and-Op

In a shared memory system, both the operating system and user programs spend a large amount of time acquiring and releasing locks. Unfortunately, most simple synchronization algorithms do not scale well past a couple of processors. In order to get around this problem, the Bedrock MD 275 offers a special non-coherent synchronization mechanism that scales very well to large numbers of processors.

The Bedrock MD 275 maintains a cache (two 64-bit entries or four 32-bit entries) of recently accessed synchronization variables. Any uncached read or write to MSPEC space (PRDM or PWRM) first checks to see if it hits in the cache. If it does, the operation (discussed below) is immediately performed and the data or an acknowledgment is returned. If the read or write does not hit in the cache, then the oldest cache entry is written back, the new data is read in, the operation is performed, and the data or an acknowledgment is returned.

Operations are performed on the cache by setting bits five to three of the address to specific values. Since these address bits are no longer used to address memory, there can be at most two 64-bit (or four 32-bit) fetch-and-op variables per cache line. On a PRDM, the following operations can be performed: a straight fetch of the cache value, a fetch followed by an increment, a fetch followed by a decrement, a fetch followed by a clear, and a cache flush. On a PWRM, the following operations can be performed: a straight write of the cache value, a simple increment (ignoring the value sent with the PWRM), a simple decrement (ignoring the value sent with the PWRM), an AND of the cache value with the PWRM value, an OR of the cache value with the PWRM value, and a cache flush. For the exact encoding, please see the SN1 Programming Manual.

As mentioned above, the cache can be used by two 64-bit entries or four 32-bit entries (or by one 64-bit entry and two 32-bit entries). However, each pair of 32-bit entries must be in the same 64-bit doubleword. A 64-bit protection word is also cached along with each 64-bit entry (or each pair of 32-bit entries).

Backdoor ECC

The Bedrock MD 275 supports a backdoor path to read and write the ECC memory. Two address spaces inside the HSPEC space support backdoor ECC access. For write access (PWRH), both spaces perform a read-modify-write of the data in order to write the ECC memory. For read access (PRDH), the BDECC-NORMAL space simply returns the ECC value, while the BDECC-SCRUB space reads the data and ECC, returns the ECC value, corrects the data and ECC, and re-writes the corrected data and ECC. For a full description of the interface, please refer to the SN1 Programming Manual.

Backdoor Directory

While the directory memory is read and written on every coherent transaction, the data is only used inside the Bedrock MD 275. In order for the operating system to access the information stored in the directory (and to initialize the directory during boot-up), a separate backdoor path provides transparent access to the directory memory. Two address spaces inside the HSPEC space are used for backdoor directory operation. A read (PRDH) to either space returns the entire 32-bit (standard) or 64-bit (premium) directory word. A write (PWRH) to the BDDIR-ACCESS space causes the single protection bit inside the directory entry to be written. A write (PWRH) to the BDDIR-FULL space causes the entire directory word to be written.

The 32-bit or 64-bit directory word contains a 6-bit or 7-bit ECC field. Without special assistance, the operating system would need to pre-compute the ECC value whenever it needed to do a backdoor ECC write. In order to avoid this extra complexity, the Bedrock MD 275, by default, fills in the ECC fields with the correct value (regardless of the value sent with the write command). If the IgnoreECC bit is set in the DirectoryConfig register, then the Bedrock MD 275 will pass on the ECC bits without modification.

For complete information on the BDDIR address space and on the address mappings necessary to access a specific directory, protection, or page counter entry, please refer to the SN1 Programming Manual.

Flash PROM

The Bedrock MD 275 supports a 16 MB flash prom (two 8 MB parts) for boot code and system configuration/error information. The prom is accessed through the LBOOT and RBOOT spaces within the HSPEC spec. Since the processors must access the prom before the Bedrock chip has a chip-id, the processor interface catches accesses to LBOOT space on node 0 and directs them to the local MD 275. RBOOT space can be used by any processor to access the prom of any node once the chip-ids have been initialized.

For prom reads, there is a one-to-one mapping of HSPEC address to prom address (within the given space). The Bedrock MD 275 supports all read sizes (doubleword, word, half-word, and byte). For prom writes, there is an eight-to-one mapping of HSPEC address to prom address (within the given space). In other words, HSPEC address 0 corresponds to prom address 0 while HSPEC address 8 corresponds to prom address 1. The Bedrock MD 275 only supports byte writes of the flash prom.

Junk Bus

The Bedrock MD 275 supports a separate interface to components that have no relation to the core MD 275 functionality. The flash prom, four bands of LEDs, a UART, and two Synergies (this interface is used to read remote Synergy registers). Access to the Junk Bus is through the LREG and RREG address spaces within HSPEC space. The Bedrock MD 275 only supports 16-bit reads and writes of all Junk Bus devices except for the flash prom and Synergies, which support 64-bit reads 16-bit writes.

SDRAM and DDR-SDRAM Initialization

All SDRAM and DDR-SDRAM contain mode registers that need to be initialized during system boot. These mode registers are accessed through the same LREG and RREG address spaces that are used to access the Junk Bus.

Refresh

The SDRAM and DDR-SDRAM supported by the Bedrock MD 275 require a refresh command approximately once every 16 microseconds. In order to reduce the refresh power surge, the Bedrock MD 275 refreshes one bank of the SDRAM or DDR-SDRAM on each DIMM approximately every eight microseconds. The Bedrock MD 275 uses the auto-refresh feature of the SDRAM and DDR-SDRAM in order to refresh all four internal banks simultaneously. The refresh will occur during the first idle cycle inside the four microsecond window. If there are no idle cycles, the refresh will timeout and force its way through. The exact refresh interval is configurable by the RefreshControl register. If all DIMMs in the system only have one or two banks, the MD 275 will only perform refresh every eight or 16 microseconds.

Memory Testing

The Bedrock MD 275 supports a Build-In-Self-Test (BIST) feature that can test all of memory (data, ECC, and directory) much faster than it could otherwise be accessed. The goal of this feature is to keep as much control as possible in the hands of software, while keeping the speed advantages of hardware testing. First, the software must do the mode register write to initialize the memory configuration, turn on refresh and determine the size of each DIMM (i.e., by four or by eight parts—this is read from the system controller). This memory sizing operation is equivalent to an address decode test of memory. For this reason, the BIST function contains no support for address testing.

After the memory sizing has taken place and the software has configured the MemoryConfig register with the correct DIMM sizes, the actual BIST operation can begin. The software first sets up a couple of configuration registers. The 4-bit data pattern goes into the BISTDataPattern register. This pattern will replicated across all 144-bits of data memory and all 32-bits of directory data. Pattern sequencing information (always same pattern or invert alternate cycles) also goes into the BISTDataPattern register. The bank under test goes into the BISTControl register. Finally, a writing of the start bit in the BISTControl register starts off the BIST operation.

During the BIST, the Bedrock MD 275 initializes all banks under test to the desired pattern and then tests all banks under test. On the first error, the data pattern is stored in the BISTDataError registers (one for directory data, one for memory data, and one for the address) and the BIST operation is halted. Status reports can be read from the BISTStatus register. Once the BIST operation has completed, the Bedrock MD 275 will update a bit in the BISTStatus register. If BIST is restarted after an error, it will continue where it left off.

The flash prom and Junk bus cannot be accessed during BIST operation. Since the local registers are not accessed through the MD 275 (they are read through a special datapath from the LB block), they can proceed normally during BIST operation.

Soft-reset

In order to maintain the state of the node's memory through soft-reset, the MD 275 gates the internal reset of some of its functionality based on whether it is going through a soft or hard reset. During a soft-reset, the unit is initialized like a power-on reset except for the following exceptions:

The contents of the MEMORY_CONFIG and DIR_CONFIG registers are maintained. This ensures that settings that pertain to the size and width of the SDRAMs, synchronizer settings and directory flavor are preserved.

Soon after the reset signal goes away, the MD 275 issues a precharge to all banks of the SDRAMs in order to bring them to a known state (in case the reset signal came in the middle of an SDRAM access).

The contents of the REFRESH_CONTROL register are maintained. The refresh counter restarts its count at zero after the soft-reset and if refresh was enabled before the soft-reset, the MD 275 will resume issuing refreshes according to the threshold that was programmed.

Issue Block

All messages from the XBAR enter the MD 275 through the IB (Issue Block). The IB decodes the messages, reorders them for fairness and efficiency, issues the necessary addresses and commands to the DRAM, and synchronizes the DB and MB blocks with the incoming or outgoing data.

This section is broken up into three subsections: architecture, arbitration, and design. The overall structure of the Issue Block is discussed in the architecture section, while the arbitration algorithm (for all message types) is discussed in the arbitration section.

Architecture

When a message arrives in the MD 275 from the XB, the header is written into the 12-entry Header Queue (located in the IB block) and the corresponding data, if any, is written into the eight cache-line Data Queue (located in the MB block). In parallel with the Header and Data Queue writes, the incoming message is decoded and stored in the Pending Queue and Write Table. The Pending Queue maintains one entry for each entry in the Header Queue and the Write Table maintains one entry for each of the cache lines in the Data Queue (the Data Queue actually contains a ninth cache line for used internally by the MB that does not have an entry in the Write Table).

The XBAR divides incoming messages into one of four virtual channel based on source and type. Requests from PIO arrive on one channel, while requests from PI1, requests from the NI or II, and replies arrive on the other three channels. Each of the four input queues (Header, Data, Pending, and Write) allocates a quarter of its space to each virtual channel. The XB and IB both treat the four virtual channels as completely independent and support arbitrary interleaving.

In parallel with the Header Queue write, the IB compares the incoming message against all open banks (up to 4) and decodes the command (Read/Write, Full/Partial). The output of these operations are stored in the Pending Queue and used during arbitration. For incoming messages with data, the IB writes the Write Table once the tail bit has been received.

Once the decoded information for a message is in the Pending Queue and the Write Table, the arbitration logic can select it and issue it to the rest of the MD 275. A message is issued by reading its header out of the Header Queue and writing the relevant information into the three queues at the head of each datapath (address, directory, and memory). Once the message is in these three queues, it then can be issued to the DRAM and completed.

Arbitration

The arbitration section of the Issue Block takes the 12 entries in the Pending Queue and selects the "best" one to issue. Here, "best" is defined in such a way that there is a fair distribution between the three input request queues, writes and replies get enough bandwidth, all messages issue in a reasonable amount of time, and all DRAM constraints are observed.

In order to simplify things, the arbitration process is broken up into two stages: a local arbitration stage based on the individual message and a global arbitration stage based on the queue. Very few dependencies exist between the two stages, allowing them to run in parallel in the same cycle.

Local Request Arbitration

Each of the four virtual channels (requests from PI0, requests from PI1, requests from NI or II, all replies) performs its own independent local arbitration. In parallel, the global arbitration is selecting which of the four channels will actually win the full arbitration.

For the three request queues, the arbitration logic must first figure out which of the (up to three) requests in the queue are ready to execute. For a cached read, partial read, or partial write to be considered ready, it must meet the following requirements:

If the message is the oldest cached read, partial read, or partial write in the channel and a write timeout (described below) is not pending, then there must be space for at least three headers in the correct output header queue and space for a cache line of data in the correct output data queue. If the message is a cached read, partial read, or partial write or a write timeout is pending, then there must be space for at least six headers in the correct output header queue and specs for two cache lines of data in the correct output data queue. If the message is a cache line write, then there must be space for at least six headers in the correct output header queue.

The message must not conflict with any of the open banks.

For partial reads and partial writes, the address logic must be able to accept partials. For cached reads and cached writes, the address logic must be able to accept non-partials.

For cached writes and partial writes, the entire data packet must be present in the data queue.

For cached writes, there must be no ERESPs waiting to issue. (ERESPs are messages that are issued as writes and then need to be reissued as reads. Between the issue and the reissue, no new writes are allowed to win arbitration.)

For partial reads and partial writes, the message must be oldest partial in the channel (partials must issue in order).

For cached writes, the message must be the oldest cached write in the channel (cached writes issue in order).

Once the ready information is available for each of the (up to) three messages, the arbitration logic selects the message with the highest priority. Priorities are determined as follows:

1. Any cached write (if write timeout is asserted).
2. Oldest cached read, partial read, or partial write.
3. Any cached read, partial read, or partial write.
4. Any cached write.

Local Reply Arbitration

The reply channel is handled slightly differently than the three request channels. A reply is considered ready if the following criteria are satisfied:

The message must not conflict with any of the open banks.

The address logic must be able to accept non-partials.

The message is the oldest reply in the queue (replies issue in order).

For write replies, the entire data packet must be present in the data queue.

There are no priorities for the reply channel as the oldest message is always selected (if it is ready).

Global Arbitration

In order to allocate bandwidth fairly between the three request queues, the global arbitration logic maintains three LRU tables. The first LRU (Oldest) keeps track of the order in which the queues last issued a message marked as the oldest pending cached read, partial read, or partial write. The second LRU (Any) keeps track of the order in which the queues last issues any cached read, partial read, or partial write message. The third LRU (Write) keeps track of the order in which the queues last issued a cached write message.

The global arbitration selects the queues using the following priority scheme:

1. Ready reply with Reply Timeout
2. Ready cached write with Write Timeout. Selected using the Write LRU.
3. Ready cached read, partial read, or partial write marked as oldest. Selected using the Oldest LRU.
4. Ready cached read, partial read, or partial write. Selected using the Any LRU.
5. Ready cached write. Selected using the Write LRU.
6. Ready reply.

The Write LRU is updated whenever a cached write message issues. The Oldest LRU is updated whenever a message marked as the oldest cached read, partial read, or partial write issues. The Any LRU is updated whenever a cached read, partial read, or partial write issues.

Write Timeout

The write timeout logic makes sure that writes will not sit in the data queue forever. In addition, once the data queue for a channel is full, the write timeout logic forces the writes to issue, freeing up space for the next write message.

A write timeout is started after one of two conditions is met:

There are two cache lines of data in the data queue of any channel.

A user-setable number of read messages have issued since the last write message issued.

If one of the above conditions is true and there is not a reply timeout in progress, a write timeout will be asserted only on the virtual channel, containing a write message, that has the highest priority in the Write LRU. Once a write issues out of that channel, with the timeout asserted, then the timeout is broadcast to all three request channels. The timeout continues until something besides a cached write issues or four cached writes issue, whichever comes first. After the timeout has completed, at least four messages, of any type, must issue before the timeout can be reasserted.

Reply Timeout

The reply timeout logic makes sure that replies eventually issue. A reply timeout is asserted if more than a user-setable number of requests have issued since the last reply was issued, and there is no write timeout in action.

Junk Bus and PROM

The Bedrock MD 275 talks to non-DRAM external devices using a separate proprietary bus. The MD 275 recognizes four different types of devices on this bus: an EPROM, a UART, LEDs, and one or more "Junk" buses. Each type of device has its own address space within the LREG or RREG portion of HSPEC space (see Table 42).

Figure 36:
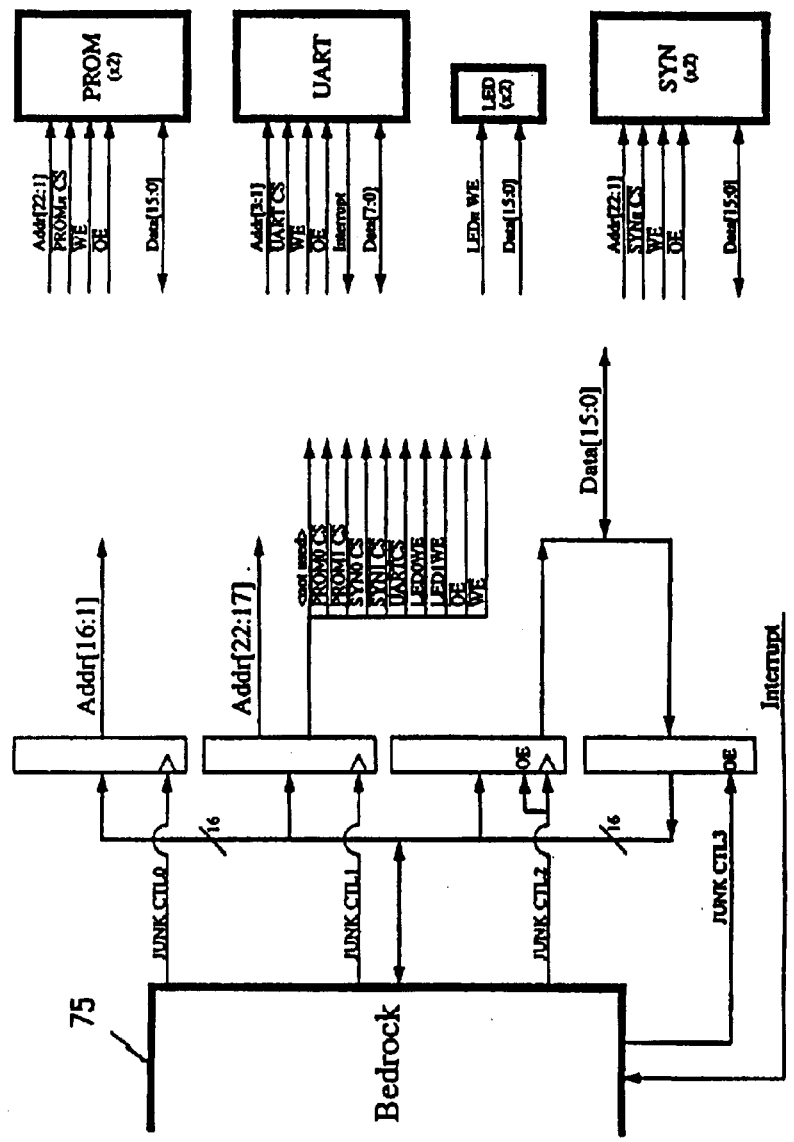
FIG. 36 is a block diagram of one embodiment of the interface between MD 279 and external EPROM, UART, LED, and Synergy bridge chip.

The bus connects to the Bedrock MD 275 using 16 address/data pins, four control pins, and an Interrupt line. FIG. 36 shows a diagram of the interface.

Memory Block

Figure 37:
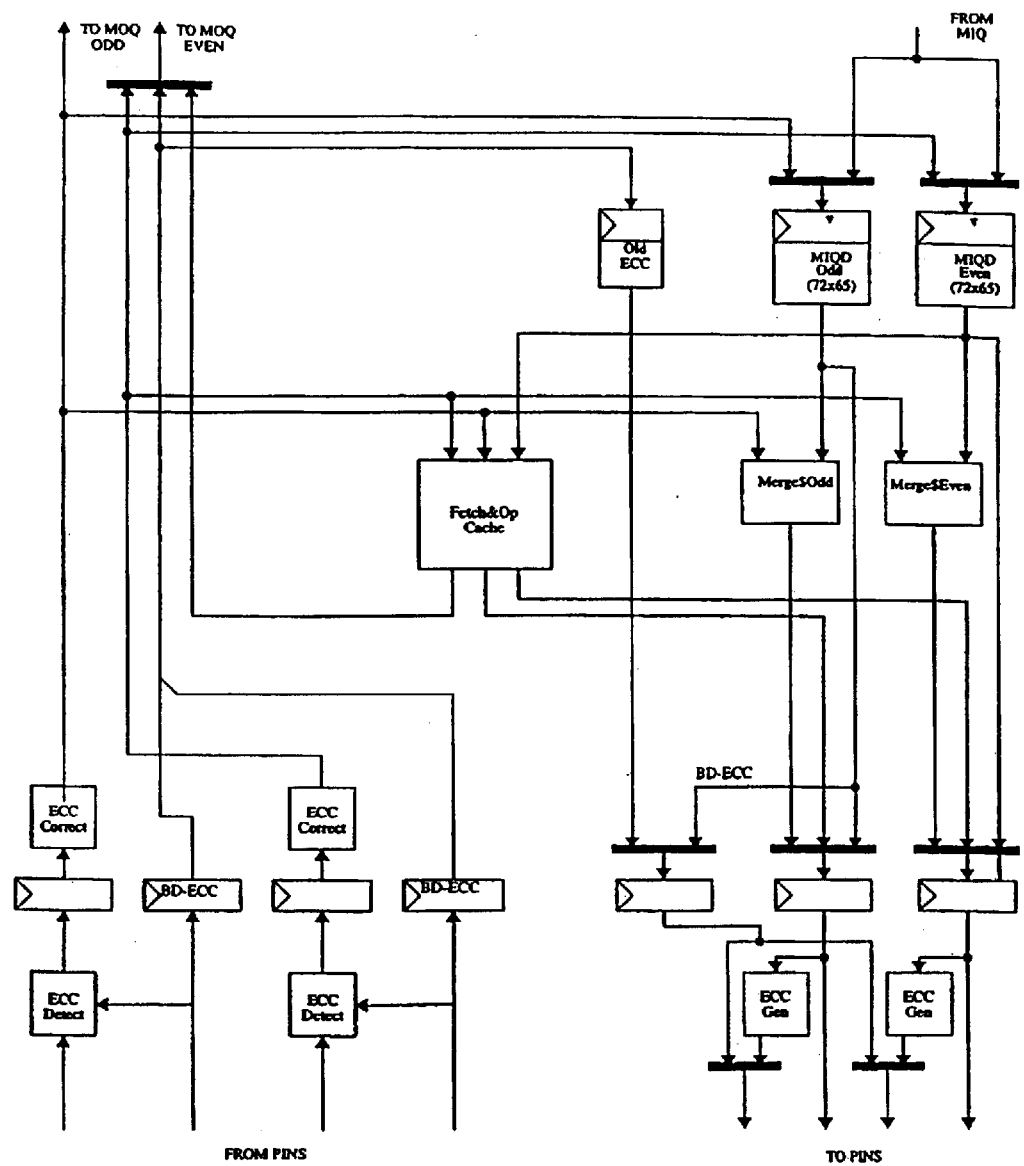
FIG. 37 shows one embodiment of a Memory Block datapath.
Figure 38:
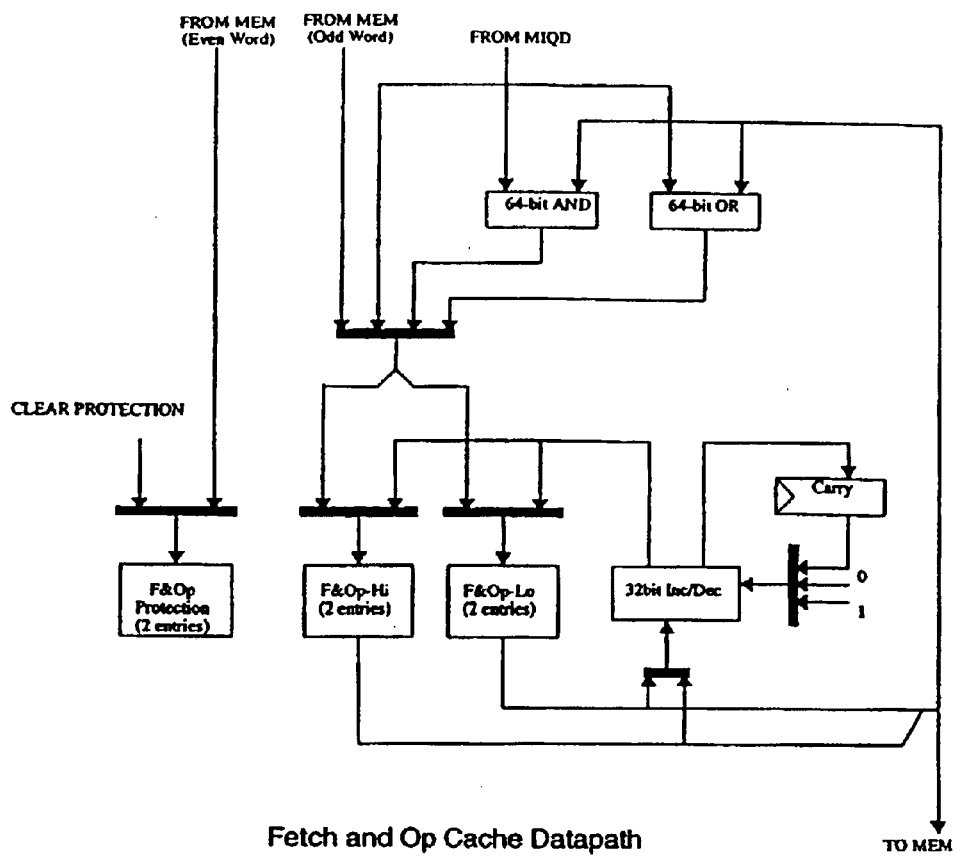
FIG. 38 is a block diagram of Fetch and OP Cache datapath.

FIG. 37 shows a block diagram of the Memory Block datapath. This datapath transfers data from the pins to the output data queue (MOQD 3114), and from the input data queue (MIQD) to the pins. Inside the datapath are a couple of special subblocks that allow read-modify-write operations of cache lines, and that implement Fetch&Op operations.

The Merge Cache supports read-modify write operations on cache lines. The Bedrock MD allows uncached write operations on a byte boundary. However, in order to save SDRAM cost, protection information (ECC) is only stored on 64-bit quantities. Therefore, in order to perform an uncached write, the MD must perform a read-modify-write operation. First, the Memory Block reads an entire cacheline, storing the needed 128-bits in the Merge Cache. The Memory Block then reads the store information out of the MIQD and overwrites the selected bytes with new data. Now that the correct data is available, it is sent through ECC generation and written back to memory.

The Fetch-and Op-block implements a two entry cache in order to improve synchronization operations.

Basic Operation

Normal Read

A normal read proceeds by taking in data from the pins, detecting and correcting ECC errors (if we are not ignoring ECC errors) and then passing this data on to the MOQ. ValidData and DataTail signals are sent to the MOQ 3113 to indicate that valid data is present.

Normal Write

The Odd and Even MIQD queues each contain seventy-two 65-bit entries, each entry being a 64-bit word, and a UCE bit associated with that word. The seventy-two entries are enough for two complete cache lines of data from each of the input queues (P0, P1, and Misc), and one extra cache line that is used only by the MB to do read-modify-writes of individual cache lines. The MIQD is written one 64-bit word at a time by the XB. When told to do a normal write, the MB reads MIQD Odd and MIQD Even in parallel, latches this data, and on the next cycle generates the ECC bits, and sends the data to the pins. Note that during a normal write ECC bits are generated regardless of whether the IgnoreECC bit is set or not.

FIG. 37 shows one embodiment of a Memory Block Datapath.

Partial Read

A partial read proceeds by reading an entire cache line from memory, but only sending the 128-bits that contain the requested data to the MOQ. DataValid and DataTail are set when the appropriate 128-bit quantity is available.

Partial Write

Partial write is a 2-phase operation. In the first phase the appropriate cache line is read into the MIQD, and the 128-bit quantity that requires modification is read into the Merge Cache. During the second phase of the partial write, the cache line is written back to memory. The partial write data is taken from the read into the Memory Cache. During the second phase of the partial write, the cache line is written back to memory. The partial write data is taken from the MIQD and merged with the data in the Merge Cache based on ByteEnable signals. All the other 128-bit pieces of the cache line are written back to memory unchanged from the MIQD. Normally ECC is regenerated on the writeback. However, in the case that we are ignoring ECC, the old ECC that the line had previously will be written back instead.

Fetch-and-Op Write Miss

A Flush operation is performed to write out the data currently in the cache, followed by a Fill operation, followed by a Write operation.

Fetch-and-Op Protection

Fetch-and-Op protection has two parts. The first part is the normal directory protection check that occurs over in the Directory Block, and occurs during a Fill operation. If the DB detects an access error, then the protection word in the Fetch-and-Op cache is cleared, and no Fetch-and-Op operations will be allowed. The DB also notifies the IB that an access error occurred on a Fetch-and-Op fill.

The second part of the protection check occurs during a Read Hit or Write Hit operation. The IB has sent the Protection Region bits that address one of the 64 bits in the Fetch-and-Op protection register. If this is set then the operation is allowed to proceed, otherwise the Fetch-and-Op cache remains unchanged.

Fetch-and-Op Operation

The Bedrock MD implements the same Fetch-and-Op commands as the SN0 MD. A small fetch-and-op cache (2 entries) allows a low occupancy (~20 ns) transaction which significantly speeds up program synchronization.

FIG. 37 shows a block diagram of the Fetch-and-Op Cache datapath. There are two entries in the cache. Each entry consists of a 64-bit protection word, and 64-bit data word, which can be considered as a single 64-bit word, or as 2 32-bit words, shown as F&Op-Hi, and F&Op-Lo in the diagram. The four key operations performed by the Fetch-and-Op Cache are: fill, read, write, and flush. A short summary of each operation is described below:

Fill—On a fill operation, data is loaded from memory directly into the Fetch-and-Op Cache. No arithmetic or logical operations are performed.

Read—On a read operation, data is taken from the Cache, sent to the MOQD, and the cache entry is cleared, incremented, decremented, or left unmodified. No logical operations are performed.

Write—On a store operation, data is taken from the MIQD, optionally ANDed or ORed with the value in the Cache, and then stored in the Cache. It can also ignore the incoming data from the MIQD, and simply increment or decrement the value in the Cache.

Flush—On a flush operation, data is taken from the Cache and returned to memory. This is a two phase operation similar to a partial write operation: the entire cache line is read from memory and stored in the MIQD, then the cache line is written back, with the first two words taken from the Fetch-and-Op Cache rather than the MIQD.

We can do a read or write to the Fetch-and-Op Cache, and for each case there are three possibilities: a hit in the cache (Hit case), a miss in the cache and the cache entry is unused (Load case), and a miss in the cache with the cache entry currently in use (Miss case). Each of these cases is handled by some combination of Fill, Read, Write, and Flush operations.

Fetch-and-Op Read Hit: A Read operation is performed.

Fetch-and-Op Write Hit: A Write operation is performed.

Fetch-and-Op Read Load: A Fill operation is performed to load the correct data into the cache, followed by a Read operation.

Fetch-and-Op Write Load: A Fill operation is performed to load the correct data into the cache, followed by a Write operation.

Fetch-and-Op Read Miss: A Flush operation is performed to write out the data currently in the cache, followed by a Fill operation, followed by a Read operation.

Backdoor Data ECC Operation

Backdoor ECC Read

A backdoor ECC read proceeds by collecting the ECC bits from either the top 8 double words in a cache line, or the bottom 8 double words in a cache line. The IB always brings in the critical part of the cache line first, so the MB collects the ECC bits from the first 4 cycles, 16 ECC bits per cycle. These ECC bits are then sent as a single 64-bit word of the MOQ.

If IgnoreECC is not set, then ECC errors in the cache line will be detected and corrected (single bit error case) during backdoor ECC reads.

Backdoor ECC Write

A backdoor ECC write proceeds in a fashion similar to a partial write. A backdoor ECC write writes the ECC bits of 2 aligned 64-bit words at one time. We first read in a complete cache line from memory, and write it into the MIQD. Note that the IB does critical half cache line re-ordering in this case, so the words for which we want to write the ECC will always be in the first 4 cycles. The MB looks at the byte enables to determine which 2 words will have their ECC bits written (only two of the byte enable bits should be set). The merge cache is written with the 128 bits for which we wish to do a backdoor ECC write. The cache line is then written back to memory, and on the appropriate cycle the backdoor ECC bits are read from the MIQD at the same time as the Merge Cache data, and the full 144-bits are written to memory. Note that the ECC bits are the 16 bottom bits of the word read from the MIQD.

Backdoor ECC writes are primarily intended for use with IgnoreECC set. If IgnoreECC is not set, then ECC errors will be detected and corrected on the read of the cache line. Also, ECC bits will be regenerated for all words that we are not writing directly with backdoor ECC write.

ECC Scrub Operation

The ECC scrub operation is used to correct single bit ECC errors in memory. It is a 2-phase operation which involves reading in a cache line and writing the corrected cache line into the MIQD. Then writing back the data to memory while regenerating the correct ECC. Note that since the purpose of the Scrub operation is to correct known errors, single bit ECC errors on the read do not generate an interrupt, and do not affect the error registers, even if IgnoreECC is not set. However, double bit errors will still be detected when IgnoreECC is not set.

Directory Block

The directory block (DB) is responsible for implementing the SN1 cache coherence protocol. While the inbound-message block (IB) decides which incoming transactions to handle and issues all the addresses to the SDRAMs, and the memory block (MB) handles the data to and from memory, the DB maintains coherence information in the directory and generates all headers for outgoing messages.

The primary functions of the DB are:

Store up to 6 pending requests for the DB pipeline.

Determine output message headers and sometimes output message data, based on the incoming message, the protection permission for the source of the incoming message, and the current directory state.

Maintain directory state. ECC is generated and checked. Two different directory entry sizes are supported (32/64 bits).

Update page migration counters. Generate interrupts if the count (or difference between the counts) exceeds a user defined threshold.

Log errors (directory state memory errors and incoming message protocol errors).

Allow direct reads/writes of the directory memory. These are supported through uncached HSPEC space as well as a special mode in which cached reads return a doubleword of data.

Allow the local registers to be read and written (The IB handles the interface to the local block).

Network Interface Unit 274

The network interface unit (NI) 274 acts as a bridge between the Bedrock crossbar 279 and the Bedrock's SN1Net port 73. The NI274 handles all aspects of the SN1Net connection, and can be attached to an SN1 router 76, or directly to a peer node controller 75's NI 274.

Since the SN1Net message format differs from the Bedrock crossbar's message format, the NI translates all messages flowing between the two interfaces. The NI performs these translations at full bandwidth, with a single cycle of latency in each direction. All Bedrock side message buffering takes place within the crossbar, with the NI mediating the flow control information between the crossbar and the remote SN1Net agent.

Figure 39:
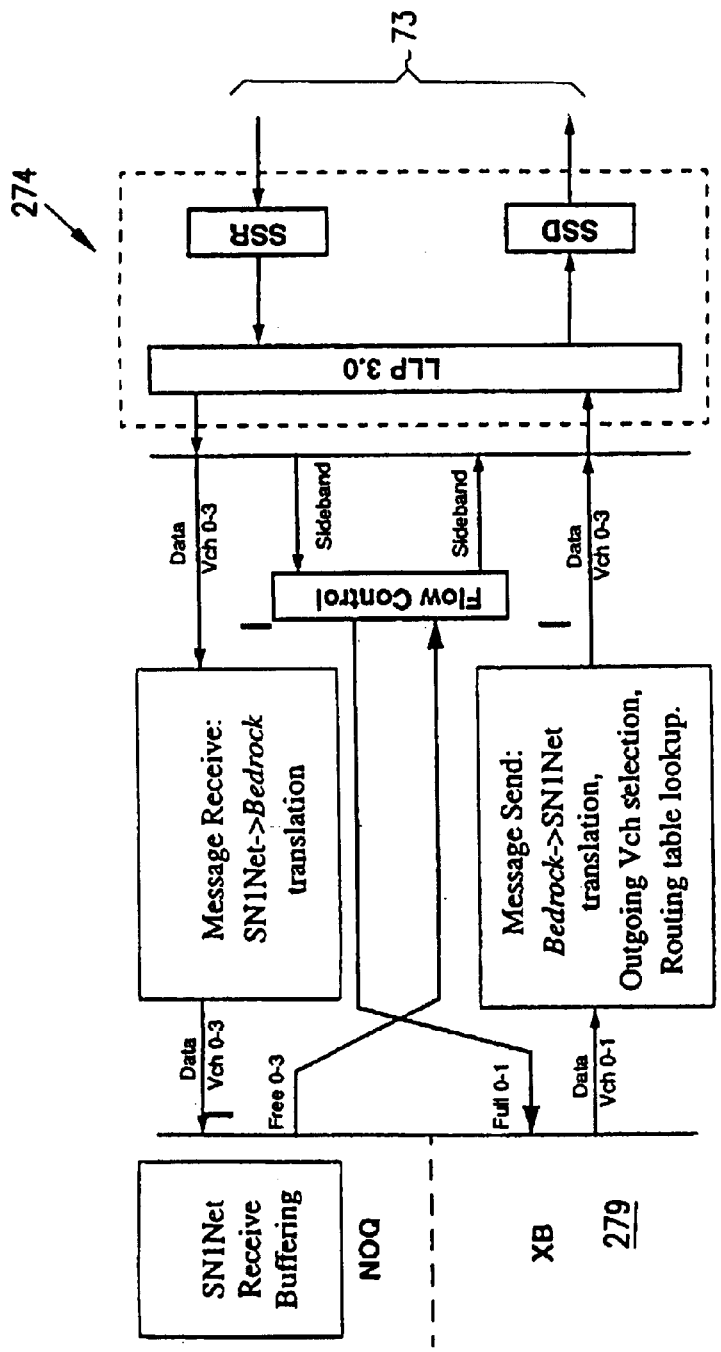
FIG. 39 is a block diagram of the main address and data paths of the NI 274.

Throughout this document, the terms "send" and "outgoing" refer to messages being sent from the Bedrock to SN1Net, while "receive" and "incoming" refer to messages being received at the Bedrock from SN1Net. FIG. 39 is a block diagram of the main address and data paths of the NI 274.

SN1Net Interface

FIG. 41 shows a block diagram of the connections between node controller 75 and router 76 of one embodiment.

At the physical layer, the NI connects to SN1Net via two unidirectional, source synchronous 20-bit data ports operating with STI signal technology (refer to FIG. 41). All the signals are differential, resulting in 44 signal pins per port. The physical layer circuitry consists of a source synchronous driver (SSD) and source synchronous receiver (SSR) that implement the conversion between 800 MHz serial data on the pins and 200 MHz parallel data used by the chip core.

The Link Level Protocol (LLP version 3.0) resides above the physical layer to provide reliable, in-order delivery of 128-bit data atoms known as micropackets. See the Link Level Protocol specification for details on the operation of this protocol layer. The SSD, SSR, and LLP send and receive modules implement the same protocol as those used on the SN1 router 76. Most aspects of the SSD/SSR interface are handled within the LLP. An exception is control of the SSR's data sampling window which is done via the d_avail_select port. The sample setting is set in NI_PORT_PARMS register with the D_AVAIL_SEL bits.

SN1Net virtual channel tagging, message framing, and credit-based flow control are layered above the LLP, allowing SN1 coherence protocol messages to be composed from micropacket sequences. This information is passed on from the LLP as sideband data (Refer to FIG. 40, which shows message sideband encoding).

Crossbar Interface

Both directions of the NI's crossbar interface are simplified by the exact bandwidth match between internal Bedrock and SN1Net transfers. All single-cycle Bedrock headers are followed by a dead-cycle on the crossbar, thus consuming equal bandwidth to the two-cycle SN1Net headers. All quadword data micropackets consume two data cycles on the crossbar, and doubleword data micropackets are followed by a dead-cycle on the crossbar, again matching the SN1Net bandwidth.

All messages received from SN1Net are translated at full bandwidth and forwarded to the crossbar's NOQ section where they may be buffered or sent directly to the crossbar switch. The NOQ fill level is communicated via the NI to the remote SN1Net peer using the sideband virtual channel flow control protocol.

SN1Net to Bedrock Internal Message Conversion

This section describes how SN1Net messages arriving at the NI port are converted to Bedrock internal message format.

NOTE: When receiving router network micropackets, Bedrock considers any micropacket that follows a micropacket-with-its-Tail-bit-set to be a router network header. After reset, the first micropacket received is assumed to be a Header.

Bedrock to SN1Net header conversion is message-type independent.

In brief,

Bedrock Source[10:0]=SN1Net Source

Bedrock Supplemental[10:0]=SN1Net Supplemental

Bedrock Command[6:0]=SN1Net Command[30:24]

SN1Net Addr[2:0]=0, as all addresses are byte aligned

SN1Net Addr[34:33]=0, reserved for future node memory expansion

SN1NetAddr[42:35] is the node number, from BedrockAddress[40:33]

Bedrock Internal to SN1Net Message Conversion

This section describes how Bedrock internal messages exiting the NI port are converted to SN1 Net message format.

Note: The content of the Destination Field of the SN1Net Header corresponds to the contents of the Bedrock Internal Header's Address field, Source field or Supplemental field, depending on the command (as summarized in Table 120 below).

TABLE 120

Processor Physical Address to SN1Net Address

| T-Rex + Physical Address | SN1Net Address | Description |
|---|---|---|
| | 47:46 | Zero (Future Expansion to 8K Nodes) |
| 40:33 | 42:35 | Node Number (256 Nodes) |
| | 34:33 | Zero (Future Expansion to 32 Gbytes) |
| 32:3 | 32:3 | Node Memory Address (8 Gbytes) |
| 2:0 | 2:0 | Always Zero; all addresses must be byte aligned |

TABLE 121

Converting Bedrock Internal Header into SN1Net Header

| Command Type | Sample Command | SN1Net Source | SN1Net Dest | SN1Net PreXsel |
|---|---|---|---|---|
| Request 1 | DNET_RDSH | Source[10:0] | Address[40:33] | MD, PI0, PI1[d] |
| Request 2 | DNET_IRSHU | Source[10:0] | Suppl[10:3] | PI0, PI1 or II[e] |
| Request 3 | DNET_INVAL | Source[10:0] | Suppl[10:3] | PI0 or PI1[f] |
| Request 4 | DNET_PRDI | Source[10:0] | Address[40:33] | II |
| Request 5 | DNET_PWRI | Source[10:0] | Address[40:33] | PIx, LB or II[g] |
| Request 6 | DNET_VRD | Source[10:0] | 8'h0 | LB |
| Reply 1 | DNET_SACK | {NODE_ID, Source[2:0]} | Source[10:3] | PIx or II[h] |
| Reply 2 | DNET_SXFER | Source[10:0] | Address[40:33] | MD |
| Reply 3 | DNET_VRPLY | {NODE_ID, Source[2:0]} | Source[10:3] | LB |

[d]For Request 1 barrier commands (PRDB, PWRB & BAR) select P0/1. This is based on Source field subnode bits [2:0]=. All other commands select MD.
[e]For Request 2, the Pre-Xsel field is based on the Supplemental[2:0]. A master of IO or GBR uses II, and, a master of PROC uses FI0/1 based on the Supplemental field subnode bit.
[f]For Request 3, select PI0/1 based on the Supplemental field subnode bit.
[g]Request 5 is PIO to Bedrock widget. The PreXsel field depends on address bits [23:21]. An address in the IO range uses II ([23:21] = 0 × 6), an address in the PI range uses PI0/1 (PI0 = 0 × 4 & PI1 = 0 × 5 for [23:21]), and all other addresses use LB. Access to PIx/LB/II registers require address[31:24] = 0 × 01 (BW0/SW1).
[h]For Reply 1 the PreXsel field depends on Source field bits [2:0]. A master of IO or FBR uses II, and a master of PROC uses PI0/1 based on the subnode bit, Source[2].

TABLE 122

DeviceID Encoding

| Source[2:0] or Suppl[2:0] | Unit |
|---|---|
| 000 | Processor Interface 0, Processor 0 |
| 001 | Processor Interface 0, Processor 1 |
| 010 | Real Time/GBR IO |
| 011 | Normal I/O |
| 100 | Processor Interface 1, Processor 0 |
| 101 | Processor Interface 1, Processor 1 |
| 110–111 | Reserved |

Register Access

Access to registers in the NI space is mediated by the Local Block (LB). Register read and write requests are received by the LB, which uses a dedicated register data and address bus to transfer register data to/from the NI. Access protection is also controlled by the LB. However, the NI will detect read access errors to registers address space that does not exist. This error is passed on to the LB.

The IO Interface unit (II) of the Bedrock chip implements the interface to the Crosstalk interface, which connects to I/O devices such as disk controllers and network boards (e.g., Ethernet).

FIG. 42 shows a high level diagram of the IO unit and its position relative to the rest of node controller 75 and input/output port 79. The interface between Bedrock's Crossbar (XB) unit and II is composed of four XB queues. The names of the four queues are prefixed by "RQ" or "RP", indicating that they carry request messages or response messages, respectively. The remainder of the name indicates whether the II section is the receiver of the message (the input queue, "IIQ") or the sender of the message (the output queue, "IOQ"). FIG. 60 lists the types of messages that can be produced or consumed by each interface.

The II section performs two basic functions: (1) it provides a method by which IO devices can read and write host memory ("DMA" operations), and it provides a method by which the processors in the system can control IO devices ("PIO" operations). Thus, the term "DMA" refers to the case where an IO device is the initiator of a request and the term "PIO" refers to the case where a processor somewhere in the system is the source of the request. In order to control II itself, a third basic function is also implemented, called "Local PIO". This term reflects the fact that a processor is the initiator of the request, and the object of the request is a register which is internal (local) to II.

For DMA operations, an IO device initiates a request by sending a Crosstalk request message into the Crosstalk receive interface. The request is recorded within II in a state vector called a Credit Response Buffer (CRB). The request is reformatted to the Bedrock-internal message format, then sent to the XB unit by way of the Request IOQ for dispatch to the home node of the memory which is the target of the request. The II section participates in the SN1 Coherence Protocol, and may need to take several actions (described later) to gain access to the target memory. As these actions are taken, the state of the request is updated in the CRB. Once a response is received from the XB by way of the Response IIQ, it is forwarded to the Crosstalk Transmit Interface and the CRB is retired.

For PIO operations, a processor initiates a request by sending a router network request message into the Request IIQ. If the request is a read request, the node number and processor number of the request is recorded in a structure called a PIO Response Buffer (PRB). If the request is a write request, the requestor is given a write response immediately by sending it out the Response-IOQ. The request is then reformatted to Crosstalk format and sent to the target IO device by way of the Crosstalk Transmit Interface. The II section does not have any work to do with regard to cache coherence for PIOs, because accesses to IO space are defined as having left the coherence domain. When a read response is received on the Crosstalk Receive Interface, the information stored in the PRB is used to reformat the response into a Bedrock-internal message, and it is sent out across the Response-IOQ. When a write response is received on the Crosstalk Receive Interface, it is discarded after checking for errors and other status information.

PIO operations to II-local registers operate very much like PIO operations to IO devices. The only difference is the obvious difference that the target of the request is internal to II, so the request doesn't involve the Crosstalk interface.

Message Flow

In order to prevent buffer overflows and deadlock conditions, hardware flow control mechanisms must be used. These flow control mechanisms form a hierarchy, with low level signal handshaking at the bottom of the hierarchy and message-synchronized flow control at the top of the hierarchy. This section is an overview of the flow control aspects of II.

In order to prevent deadlock within a node or between nodes, II assures that it will pop requests and responses off of the IIQ in a finite amount of time. This assurance remains even in the face of certain errors, especially those that involve the Crosstalk Interface. The II further attempts to minimize the time a message spends on the IIQ.

Because II implements the Crosstalk interface, it implements the Crosstalk Credit mechanism. This credit mechanism keeps message input buffers from overflowing (both IO devices and II).

The mechanisms described in the preceding two paragraphs are not independent. In fact, the Crosstalk Credit mechanism could undermine the assurance of IIQ forward progress when there is a slow IO device. (II cannot accept any further PIO requests when it has no Crosstalk Credits, thus possibly stalling the IIQ.) To mitigate this problem, a mechanism called "PIO conveyor Belt" is implemented by II. This mechanism manages a second set of credits, called "PIO Credits." These PIO Credits manage access to particular IO devices (as opposed to Crosstalk Credits, which control access to all IO devices), and when a particular IO device cannot accept another request, any new request for that IO device is popped from the IIQ and given a negative acknowledge. This action causes the requester to requeue the request and send it again, thus implying a "conveyer belt", which gives the mechanism its name.

The CRB as a Partial Merge Buffer

The SN1 Network Protocol and Cache Coherence Protocol operate on memory data one cacheline at a time. But IO devices need to be able to operate on byte-sized chunks of memory data, so II must provide the mechanisms for doing this. For reads, this simply means that whenever an IO device requests memory read data, an entire cacheline is sent to II, which then forwards the interesting bytes to the device. For writes, it is more complicated.

When an IO device writes main memory in chunks smaller than cachelines, II will (1) request the cacheline from the system (2) receive the cacheline in a buffer when the system returns it, (3) merge the byte data into the cacheline, and (4) write the entire cacheline back to main memory. Just as all other requests from Crosstalk, a CRB is assigned to maintain the coherence information for the cacheline, and the cacheline buffer associated with the CRB is used to perform the merge.

The merging of partial cacheline writes (also called "partial writes") represents the only case where II requests an exclusive copy of a cacheline. Upon completion of the merge, the line is immediately written back, so it is not held in the dirty exclusive state.

Credit Response Buffers (CRB)

The Coherent Resource Buffers (or CRBs) are internal II state describing cachelines which are being manipulated by II. Since the II must participate in the SN1 Cache Coherence Protocol, it must maintain certain state information relative to each cacheline for which it has requests in flight.

In general, every request that is received from Crosstalk uses one CRB for each cacheline it touches. As the request is forwarded to the router network 575, some information is left behind in a CRB so that when a response is received from the router network 575, II knows what to do with it. Given the complexity of the SN1 Cache Coherence Protocol, II may participate in several exchanges with the directory or the owner of the cacheline before a response is received that can finally be forwarded to the requestor on Crosstalk. Thus, each CRB represents the "current state" in the state machine that manages II's participation in the Cache Coherence Protocol.

The rest of the state machine that manages II's participation in the Cache Coherence Protocol is the so-called "CRB Table". The CRB Table is simply a big chunk of combinational logic that looks at the incoming message, the CRB implied by the incoming message (determined by a CAM lookup of the address in the message), and other II-internal factors. Given all these inputs, the CRB Table produces the next CRB state, which is used to update the CRB, and the responses to the messages: requests or responses to the router network 575 or Crosstalk 82. Sometimes an incoming message only updates the CRB, and doesn't produce an outgoing message.

There is only one CRB Table, and it is shared in a pipelined fashion with all fifteen CRBs.

PTO Response Buffers (PRB)

CRBs keep information about outstanding DMA requests (requests which are initiated by Crosstalk). In a similar manner, information about outstanding PIO requests (requests which are initiated on the router network 575) is kept in PIO Response Buffers (PRBs). When a processor in the SN1 system makes a request to an I/O device on Crosstalk, certain state must be maintained so that when the response comes back from that device, II knows where to send it. For reasons which will be described later, this information is only kept for PIO Read requests.

The information about outstanding reads is kept in registers called PIO Read Table Entries (PRTEs). There are eight PRTEs, one for each possible outstanding read. There is a PRB table which functions in a manner similar to the CRB table, taking the state of the outstanding request (described by the PRB and the PRTE associated with that request) and the incoming message, and deriving the next state and response messages. Because this is on the I/O side of the coherence boundary (PIO requests, by definition, leave the coherence domain), the current state embodied by the PRBs and PRTEs is much simpler than in the CRB, as is the PRB table.

II-Internal Registers

The II is configured and controlled by many internal (local) registers. They are mentioned here because they represent the rest of the II-internal state required to make sense of the II interfaces as described in the subsequent sections of this document.

IIQ Interface

Requests

The only requests from the router network 575 received by II are interventions (messages regarding cachelines that II owns), and PIO reads and writes (to either Crosstalk or II local registers). The table of FIG. 42 [__] summarizes the requests received by II.

Local Block

The Local Block (LB) of the Bedrock chip contains the PIO Access Machine, some registers, the Invalidate Engine, the Vector PIO Machine and a real-time clock generator.

The input signals which enter the LB and the output signals which are driven by the LB can be aggregated into several different groups. Each such group constitutes a particular interface. Together, these interfaces comprise the entire interface of the LB unit. Each of the following subsections describes a particular group.

| Clock, Reset and JTAG | | |
|---|---|---|
| Signal name | Direction | Description |
| CLOCK | input | system clock |
| RESET_LB | input | hard system reset (active high) |
| RESET_LB_SOFT | input | soft node reset (active high) |
| JTAG_ID[31:0] | output | JTAG info (rev, part num, mfctr) |
| LB_II_JTAG_ID_31_28[31:28] | output | JTAG info (REVISION) |
| LB-II-JTAG-ID-11-0[11:0] | output | JTAG info (MANUFACTURER) |

Assertion of the RESET_LB input causes the LB to reset all its state machines and initialize its registers to their specified reset values. The LB will abort any operation that is in progress (e.g., a PIO read or write request, or an LINVAL request). Assertion of the RESET_LB_SOFT input causes the LB to reset all its state machines and abort any operation that is in progress, but registers retain their current contents (i.e., they are not re-initialized). The RESET_LB_SOFT input is intended for diagnostic purposes while the Bedrock chip is subjected to testing in the lab after prototype chips are available. If a node becomes "stuck" such that no further progress is possible, the RESET_LB_SOFT input can be used to restore the chip to a state in which software can examine the contents of registers so as to determine the cause of the failure.

| Signal name | Direction | Description |
|---|---|---|
| Rq Flits From LIQ to LB | | |
| LIQ_LB_RqAvail | input | flit is available on RqData signal |
| LIQ_LB_RqTail | input | flit is last one in packet |
| LIQ_LB_RqData[66:0] | input | contents of flit |
| LB_LIQ_RqReady | output | LB is able to receive rq flit |
| LIQ_LB_RpValid | input | a valid flit is on RpData signal |
| LIQ_LB_RpTail | input | flit is last one in packet |
| LIQ_LB_RpData[66:0] | input | contents of flit |
| Rq and Rp Flits From LB to LOQ | | |
| LB_LOQ_Data[66:0] | output | contents of flit (may be rq or rp) |
| LB_LOQ_RqAvail | output | rq flit is available on Data signal |
| LB_LOQ_RpAvail | output | rp flit is available on Data signal |
| LB_LOQ_Xsel[2:0] | output | encoded destination |
| LB_LOQ_Tail | output | flit is last one in packet |
| LOQ_LB_RqReady | input | LOQ is able to receive rq flit |
| LOQ_LB_RpReady | input | LOQ is able to receive rp flit |

System Configurations and Topologies

SN1 apparatus of the present invention are modular computer systems which span the range of two to 512 CPUs. They are made up of separate rack-mounted modules which include node having two or four CPUs (C-Bricks), 8-port routers (R-Bricks), various IO bricks (I-Bricks, P-Bricks, and/or X-Bricks), Power Bays, and/or disk drive bays (D-Bricks). All of these modules (or "bricks") are mounted in a rack or racks and interconnected with cables. In one embodiment, a systems and method is used such as described further in application Ser. No. 09/408,874, filed on Sep. 29, 1999, entitled "MODULAR COMPUTING ARCHITECTURE HAVING COMMON COMMUNICATION INTERFACE".

These systems are extremely flexible in configuration, since the amount of CPU, memory, IO and disk resource can all be independently selected. High-availability systems, where all functionality is fully redundant, may be easily configured.

All SN1 systems (with the exception of systems containing eight or fewer CPUs, which are a special case that are implemented without using a router R-Brick) include groupings of a Power Bay, a router (R-Brick), and 4-processor nodes (C-Bricks), plus one or more I/O bricks. The other nodes are cabled to the router, and in large systems, the routers are cabled to each other. This configuration gives an excellent value, yielding a combination of low cost, high bandwidth, and low latency, and it easily supports the configuration of high-availability systems. Up to 24 CPUs with a fairly substantial I/O system may be configured in a single rack. Up to 32 CPUs may be constructed in a single rack, with a separate rack for IO. Larger systems are implemented using multiple racks.

Systems involving over one hundred twenty-eight (128) CPUs are configured with additional routers 76 installed in some of the racks, known as metarouters, which allow interconnection of larger numbers of nodes. Modules within the racks are organized and installed identically for all configurations, and no re-cabling is ever required within a rack to expand the configuration.

In systems of 16 or fewer CPUs, space is available within the rack for installation of I/O and disk bricks. For larger systems, I/O and disk modules are mounted in separate racks which contain no nodes 370 or routers 76.

Node: Processor/Memory

A SN1 system includes one or more nodes 370. Each node 370 includes two or four processors 74 and their associated caches, main memory 77, and I/O port 273 and a port 274 into the router network. A central ASIC (application-specific integrated circuit), node controller 75, connects these four subsystems.

CPU Types

In some embodiments of the present invention, two families of CPUs are supported in SN1 systems: MIPS "T-Rex" processors (e.g., the R12000S processor and its follow-on processors available from SGI, assignee of the present invention) and Intel "Merced" processors (a type of processor anticipated to be available from Intel Corporation). Each type of CPU is implemented on a different board design used to implement the various embodiments of each node 370. Upgrades may be achieved by replacing the (node 370) C-Brick. In one embodiment, MIPS and Merced nodes are not to be mixed within a single system, although systems using both processor types may be connected as a cluster using interconnects other than CrayLink2.

MIPS CPUs

In one embodiment, SN1 supports MIPS T-Rex CPUs, starting with the T-Rex Shrink (R12000S) CPU, which is packaged in a flip-chip package and supports a 200 MHz SYSAD speed (SYSAD is the processor interface 71). In various embodiments, additional MIPS processors are planned to be developed for SN1 enhancements.

In one embodiment, cache sizes for MIPS SN1 nodes are four and eight MB. In one embodiment, the cache is built from nine 256 k×18 or 512 k×18 SSRAMs (synchronous static random access memory chips). The secondary cache for the T-Rex Shrink processor operates at ½ of the CPU core clock.

Merced CPUs

In one embodiment, SN1 supports Merced-type CPUs. In one embodiment, Merced CPUs are supported by introducing an additional processor interface ASIC, which adapts two Merced CPUs to communicate on one of the SYSAD busses (a processor interface bus 71 of node controller 75). Two processor interface ASIC s are provided per node to implement support for four Merced CPUs. The processor interface ASIC also supports a level-3 cache, which is implemented using DDR SDRAM chips (double-data rate synchronous dynamic random access memory, such as are available from Hitachi and NEC of Japan, and are being sampled by IBM Corp.). This cache improves the effective memory access time for the CPUs, and is also used to perform the protocol translations needed to allow the Merced CPUs to operate in the SN1 system, which is based on the protocols employed in MIPS CPUs.

Main Memory Configuration

In one embodiment, SN1 systems employ custom DIMMs (dual in-line memory modules) containing DDR SDRAM for main memory. The DIMMs that are used in larger SN1 systems (those systems which are capable of scaling beyond 128 processors) are physically similar but contain one additional memory chip to provide enough directory memory to allow building configurations of up to 512 CPUs. These DIMMS are called "premium DIMMs" in this document, and those without the extra directory memory are called "standard DIMMs." Other than the difference in the directory memory, premium and standard DIMMs are identical and share a common PCB (printed circuit board) design. In systems of less than 128 CPUs, it is acceptable to use the two types interchangeably, and to mix them within a node. In these embodiments, the ratio of (memory data space) to (directory data space) on each of the plurality of memory/directory cards is set to a value that is based on a size of the multiprocessor computer system. In some embodiments, the size is measured as the number of CPUs in the system, and in particular, whether there are (128) or more processors. When (128) or more processors are included, the premium DIMMs having an extra memory chip (i.e., a lower ratio of (memory data space) to (directory data space)) are used.

In one embodiment, the board of each node 370 includes eight DIMM sockets, arranged as four banks of two DIMMs each. Note that this is half the number of DIMM slots implemented in prior systems. This decision was made because of the greater memory densities available in the SN1 time frame. Main memory is implemented using DDR SDRAM parts running at 100 MHz address/200 MHz data and supplying a peak of 3200 Mbyte/sec of bandwidth. The DIMMS employ 128 and 256 Mbit DRAM technology to offer a variety of DIMM sizes to meet various customer needs. With 256 Mbit technology, each SN1 node can support up to eight Gbytes (gigabytes) of memory.

All SN1 DIMMs are built from two base printed circuit types, one supporting x4 memory (four-bit wide data path) chips for data/ECC and the other supporting x8 memory (eight-bit wide data path) chips. The following table enumerates the various types that are implemented in various embodiments. All types may be implemented in either standard or premium; the planned implementation is to make the smallest chosen size available in standard only and all other sizes in premium only. The types which are used for one embodiment are shown in bold. Those marked with a * are premium DIMMs.

DIMM Table

| DIMM Size | Fab Type | DRAM Tech | Data DRAM | Dir DRAM | Min. Increment (2 DIMMS) | Max Node Capacity |
|---|---|---|---|---|---|---|
| 128 MB | x8 | 128 Mbit | 9–16 M × 8 | 1–8 M × 16 | 256 MB | 1 GB |
| 256 MB | x8 |  | 18–16 M × 8 | 1–8 M × 16 | 512 MB | 2 GB |
| 512 MB* | x4 |  | 36–32 M × 4 | 4–16 M × 8 | 1 GB | 4 GB |
| 512 MB* | x8 | 256 Mbit | 18–32 M × 8 | 2–16 M × 16 | 1 GB | 4 GB |
| 1024 MB* | x4 |  | 36–64 M × 4 | 4–32 M × 8 | 2 GB | 8 GB |

The above table identifies the data memory increment DIMM kits. An increment requires two memory/directory data DIMMs.

In one embodiment, all DIMMs contain an serial PROM which is readable by the system controller. The PROM contains part number, date code, memory chip manufacturer, and other information as specified in the JEDEC standard for SPID PROMs. The DIMM includes a write-enable pin to allow programming of the PROM in the factory. This pin is not be connected on the node board, thereby making it impossible to write the PROM in the system 100.

The C-Brick

The C-Brick for one embodiment houses a single node of up to four CPU's, together with eight DIMM slots, the node controller 75, and L1 system controller. The design of the C-box, in one embodiment, accommodates either a MIPS T-Rex CPU implementation or an Intel Merced CPU implementation. The C-Brick design is based around a removable logic carrier that slides in and out of the front side of the C-Brick for service. This logic carrier unit holds the node electronics, front panel, hot plug fans, L1 display, and cosmetic plastics.

Visible from the front of the C-Brick are the L1 display and 3 front mounted fans. The fans are removable from the front, redundant and hot swappable.

The rear of the C-Brick contains connectors for 48 VDC input power, D-NET, XTalk2 I/O, and USB. The USB port is used for connection to an optional L2 system controller in small systems without a R-Brick. The same USB port could also connect to a L3 system controller if desired.

Fan replacement is the only type of service which is able to be performed while the C-Brick is operating. All other maintenance activities (such as DIMM replacement) will require the brick to be powered down, and the logic carrier unit to be removed from the brick.

"C" Node Brick MIPS T-Rex CPU Implementation

The T-Rex node board set includes a main board and up to two processors boards (PIMM's). The main board of one embodiment is a half-panel (11×17 inches) 16 layer board that holds the node controller 75, eight DIMM sockets for memory 77, three 48 VDC-to-low-voltage DC-DC converters, L1 system controller, and connections to the PIMM (processor in-line module) boards.

Each processor board holds two MIPS CPUs 74 that are soldered directly to the board, along with their L2 cache memory. Each PIMM will provide its own 48 VDC-to-low-voltage conversion through the use of two DC-DC converters on each PIMM. Electrical connection between the main board and each PIMM is provided by two 240-position area-array connector.

CONCLUSION

A first aspect of the present invention provides a multiprocessor computer system (for example, a small multiprocessor system 400 having only two node controllers 75 connected to one another using an interprocessor channel 73, or a multiprocessor system 100 or 500 having up to hundreds or thousands of node controllers 75 connected together through a router network 575 or other interprocessor communications fabric 575). One such embodiment of the system includes a first node controller 75, a second node controller 75, a first plurality of processors 141 operatively coupled to the first node controller 75, a second plurality of processors 141 operatively coupled to the second node controller 75, a first memory 77 operatively coupled to the first node controller 75, a first input/output system 79 operatively coupled to the first node controller 75, and an interprocessor communications network 575 operatively coupled between the first node controller 75 and the second node controller 75. In this embodiment, the first node controller 75 includes: a crossbar unit 279, a memory port 275 operatively coupled between the crossbar unit 279 and the first memory 77, an input/output port 273 operatively coupled between the crossbar unit 279 and the first input/output system 79, a network port 274 operatively coupled between the crossbar unit 279 and the interprocessor communications network 575, and a plurality of independent processor ports 270, including a first processor port 271 operatively coupled between the crossbar unit 279 and a first subset 241 of the first plurality of processors 74, and a second processor port 272 operatively coupled between the crossbar unit 279 and a second subset 242 of the first plurality of processors 74.

In some embodiments of the system, the first node controller 75 is fabricated onto a single integrated-circuit chip 475.

In some embodiments of the system, the first memory 77 is packaged on a plurality of plugable memory/directory cards 600 wherein each card 600 includes a plurality of memory chips 610 including a first subset of memory chips 620 dedicated to holding memory data and a second subset of memory chips dedicated to holding directory data. Further, the memory port 275 includes a memory data port 613 including a memory data bus 611 and a memory address bus 612 coupled to the first subset of memory chips 610, and a directory data port 623 including a directory data bus 621 and a directory address bus 622 coupled to the second subset of memory chips 620. In some such embodiments, the ratio of (data space in the first subset of memory chips 610) to (data space in the second subset of memory chips 620) on each of the memory/directory cards is set to a value based on a size of the multiprocessor computer system.

In some embodiments of the system, the crossbar unit 279 selectively combines two serially received doublewords of data into a single quadword micropacket for transmission through the crossbar unit 279, and wherein each doubleword contains at least 64 bits of data and the single quadword contains at least 128 bits of data.

In some embodiments of the system 400, the first node controller 75 and the second node controller 75 are directly connected to one another by the interprocessor communications network 73. In other embodiments of the system 100, 300, the first node controller 75 and the second node controller 75 are indirectly connected to one another through a router chip 76 that is also connected to one or more other node controllers 75.

Another aspect of the present invention provides a first node controller 75 for use in a multiprocessor computer system 100, 300, 500 having one or more other node controllers 75. This first node controller 75 includes a crossbar unit 279, a memory port 275 operatively coupled to the crossbar unit 279 for communicating to a memory 77, an input/output port 273 operatively coupled to the crossbar unit 279 for communicating to a first input/output system 79, a network port 274 operatively coupled to the crossbar unit 279 for communicating to a second node controller 75 across an interprocessor-communications network 575, and a plurality of independent processor ports 270. These processor ports 270 include a first processor port 271 operatively coupled to the crossbar unit 279 for communicating to a first subset 241 of a first plurality of processors 74, and a second processor port 272 operatively coupled to the crossbar unit 279 or communicating to a second subset 242 of the first plurality of processors 74.

In various embodiments of the node controller, various details are optionally included, as described above for embodiments of the first system aspect of the invention.

Another aspect of the present invention provides a multiprocessor system 100, 300, or 500 (the "second system") that includes one or more node controllers 75 including a first node controller 75, a first plurality of processors 74 operatively coupled to the first node controller 75, a first memory 77 operatively coupled to the first node controller 75. This first node controller 75 is packaged as a single integrated circuit chip 475 that includes a crossbar unit 279, a memory port 275 operatively coupled between the crossbar unit 279 and the first memory 77, and a plurality of independent processor ports, including a first processor port operatively coupled between the crossbar unit 279 and a first subset 241 of the first plurality of processors 74, and a second processor port 272 operatively coupled between the crossbar unit 279 and a second subset 242 of the first plurality of processors 74, wherein the first subset 241 includes a plurality of processors 74 and the second subset 242 includes a plurality of processors 74.

In some embodiments of the second system, the system further includes a first input/output system 79 operatively coupled to the first node controller 75, and the first node controller 75 further includes an input/output port 273 operatively coupled between the crossbar unit 279 and the first input/output system 79.

In some embodiments of the second system, the system further includes an interprocessor communications channel 73 operatively coupled between the first node controller 75 and a second node controller 75; and the first node controller 75 further comprises a network port 274 operatively coupled between the crossbar unit 279 and the interprocessor communications channel 73.

In some embodiments of the second system, the system further includes a first input/output system 79 operatively coupled to the first node controller 75, and an interprocessor communications network 575 operatively coupled between the first node controller 75 and a second node controller 75. The first node controller 75 of these embodiments further includes an input/output port 273 operatively coupled between the crossbar unit 279 and the first input/output system 79, and a network port 274 operatively coupled between the crossbar unit 279 and the interprocessor communications network 575.

In some embodiments of the second system, the first memory 77 is packaged on a plurality of plugable memory/directory cards 600, each card including a plurality of memory chips including a first subset of memory chips 610 dedicated to holding memory data and a second subset of memory chips 620 dedicated to holding directory data, wherein the memory port 275 further includes a memory data port 613 including a memory data bus 611 and a memory address bus 612 coupled to the first subset of memory chips 610, and a directory data port 623 including a directory data bus 621 and a directory address bus 622 coupled to the second subset of memory chips 620. In some such embodiments, the ratio of (data space in the first subset of memory chips 610) to (data space in the second subset of memory chips 620) on each of the plurality of memory/directory cards 600 is set to a value that is based on a size of the multiprocessor computer system.

Another aspect of the present invention provides a method usable with one or more of the above described systems. The method includes transmitting data between the memory port 275 and the first processor port 271, between the memory port 75 and the second processor port 272, between the memory port 275 and the input/output port 273, and between the memory port 275 and the network port 274.

Some embodiments of the method further include transmitting data directly between the first node controller 75 and the second node controller 75 that are directly connected to one another by the interprocessor communications channel 73.

Some embodiments of the method further include transmitting data indirectly between the first node controller 75 and the second node controller 75 through an interprocessor fabric 575 that is also connected to one or more other node controllers 75.

Some embodiments of the method further include transmitting data between any two of the memory port, the first processor port, the second processor port, the input/output port and the network port.

In some embodiments of the method, the transmitting of data between any two of the memory port, the first processor port, the second processor port, the input/output port and the network port is performed in a non-blocking manner such that a plurality of such transmissions occur simultaneously.

Another aspect of the present invention provides a system that varies the relative size of the directory based on a size of the system, such as the number of processors, the amount of memory, and/or the number of nodes. Some such embodiments provide a multiprocessor system 100, 300 or 500 that includes a plurality of node controllers 75 including a first node controller 75, wherein each one of the plurality of node controllers 75 includes a memory port 275 and a separate network port 274 and a separate first processor port 277 and optionally a second processor port 272, an interprocessor communications network operatively coupled to the network port 274 of each respective one of the plurality of node controllers 75, a plurality of processors 74 operatively coupled to the first processor port of each respective one of the plurality of node controllers 75, including a first plurality of processors 74 operatively coupled to first processor port 271 of the first node controller 75, and a plurality of separate memories 77, wherein one or more of the plurality of separate memories 77 is operatively coupled locally to the memory port 275 of each respective one of the plurality of node controllers 75, including a first memory 77 operatively coupled locally to the memory port 275 of the first node controller 75, wherein the first memory is packaged on a plurality of plugable memory/directory cards 600. Each of these cards 600 include a plurality of memory chips 610 including a first subset of memory chips 610 dedicated to holding memory data and a second subset of memory chips 620 dedicated to holding directory data. The memory port 275 of the first node controller 75 further includes a memory data port 613 including a memory data bus 611 and a memory address bus 612 coupled to the first subset of memory chips 610 on each of a plurality of memory/directory cards 600 such that memory data is accessed simultaneously from the plurality of memory cards 600, and a directory data port 613 including a directory data bus 621 and a directory address bus 622 coupled to the second subset of memory chips 620 on each of the plurality of memory/directory cards 600 such that directory data is accessed simultaneously from a plurality of memory cards 600 independent of memory data accesses. In some of these embodiments, the ratio of (data space in the first subset of memory chips 610) to (data space in the second subset of memory chips 620) on each of the plurality of memory/directory cards 600 is set to a value that is based on a size of the multiprocessor computer system. In various embodiments, the size that determines the ratio is based on a number of processors 74, an amount of memory 77, a number of routers 76, and/or a number of node controllers 75.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A multiprocessor computer system comprising:
a first node controller;
an interprocessor communications network operatively coupled between the first node controller and a second node controller; and
wherein the first node controller comprises:
a crossbar unit;
a plurality of ports operatively coupled to the crossbar unit, including a first port and a second port, both of a first port type that is configured to be connected to one or more processors, and each operatively coupled to the crossbar unit, and a third port of a second port type that is configured to be connected to a memory, and that is operatively coupled to the crossbar unit, wherein the first port type has a different overall function than the second port type but wherein the first port and the second port have substantially identical function.

2. The system according to claim 1, wherein the first node controller is fabricated onto a single integrated-circuit chip.

3. The system according to claim 1, further comprising:
a first plurality of processors operatively coupled to the first node controller;
a first memory operatively coupled to the first node controller;
wherein the first node controller is fabricated onto a single integrated-circuit chip, and wherein the first port is operatively coupled between the crossbar unit and a first subset of the first plurality of processors, wherein the second port is operatively coupled between the crossbar unit and a second subset of the first plurality of processors, and wherein the third port is operatively coupled between the crossbar unit and the first memory.

4. The system according to claim 3, further comprising:
a third node controller,
a plurality of processors operatively coupled to the third node controller; and
wherein the first node controller includes a fourth port of a third port type, and wherein the fourth port is operatively coupled between the crossbar unit and an interprocessor communications channel between the first node controller and the third node controller.

5. The system according to claim 4, wherein the first node controller and the third node controller are directly connected to one another by the interprocessor communications channel.

6. The system according to claim 3, wherein the first memory is packaged on a plurality of plugable memory/directory cards, each card comprising:
a plurality of memory chips including a first subset of memory chips dedicated to holding memory data and a second subset of memory chips dedicated to holding directory data; and
wherein the memory port further comprises:
a memory data port including a memory data bus and a memory address bus coupled to the first subset of memory chips; and
a directory data port including a directory data bus and a directory address bus coupled to the second subset of memory chips.

7. The system according to claim 6, wherein a ratio of (data space in the first subset of memory chips) to (data space in the second subset of memory chips) on each of the plurality of memory/directory cards is set to a value that is based on a size of the multiprocessor computer system.

8. A first node controller for use in a multiprocessor computer system having one or more other node controllers, the first node controller comprising:
a crossbar unit;
a memory port operatively coupled to the crossbar unit for communicating to a memory;
an input/output port operatively coupled to the crossbar unit for communicating to a first input/output system;
a network port operatively coupled to the crossbar unit for communicating to a second node controller across an interprocessor-communications network; and
a plurality of independent processor ports, including a first processor port operatively coupled to the crossbar unit for communicating to a first subset of a first plurality of processors, and a second processor port operatively coupled to the crossbar unit for communicating to a second subset of the first plurality of processors.

9. The first node controller according to claim 8, wherein the first node controller is fabricated onto a single integrated-circuit chip.

10. The first node controller according to claim 8, wherein the memory is packaged on a plurality of plugable memory/directory cards, each card comprising:
a plurality of memory chips including a first subset of memory chips dedicated to holding memory data and a second subset of memory chips dedicated to holding directory data; and
wherein the memory port further comprises:
a memory data port including a memory data bus and a memory address bus coupled to the first subset of memory chips; and
a directory data port including a directory data bus and a directory address bus coupled to the second subset of memory chips.

11. The first node controller according to claim 10, wherein the ratio of (data space in the first subset of memory chips) to (data space in the second subset of memory chips) on each of the plurality of memory/directory cards is varied based on a size of the multiprocessor computer system.

12. The first node controller according to claim 8, wherein the crossbar unit selectively combines two serially received doublewords of data into a single quadword micropacket for transmission through the crossbar unit, and wherein each doubleword contains at least 64 bits of data and the single quadword contains at least 128 bits of data.

13. The first node controller according to claim 8, wherein the first node controller and the second node controller are directly connected to one another by the interprocessor communications network.

14. The first node controller according to claim 8, wherein the first node controller and the second node controller are indirectly connected to one another through an interprocessor communications network that is also connected to one or more other node controllers.

15. A multiprocessor system comprising:
one or more node controllers including a first node controller;
a first plurality of processors operatively coupled to the first node controller; and
a first memory operatively coupled to the first node controller;

wherein the first node controller is packaged as a single integrated circuit chip that comprises:

a crossbar unit;

a memory port operatively coupled between the crossbar unit and the first memory; and a plurality of independent processor ports, including a first processor port operatively coupled between the crossbar unit and a first subset of the first plurality of processors, and a second processor port operatively coupled between the crossbar unit and a second subset of the first plurality of processors, wherein the first subset includes a plurality of processors and the second subset includes a plurality of processors.

16. The system according to claim 15, wherein the system further comprises:

a first input/output system operatively coupled to the first node controller, wherein the first node controller further comprises an input/output port operatively coupled between the crossbar unit and the first input/output system.

17. The system according to claim 15, wherein the system further comprises:

an interprocessor communications network operatively coupled between the first node controller and a second node controller, wherein the first node controller further comprises a network port operatively coupled between the crossbar unit and the interprocessor communications network.

18. The system according to claim 15, wherein the system further comprises:

a first input/output system operatively coupled to the first node controller; and an interprocessor communications network operatively coupled between the first node controller and a second node controller; and wherein the first node controller further comprises:

an input/output port operatively coupled between the crossbar unit and the first input/output system; and a network port operatively coupled between the crossbar unit and the interprocessor communications network.

19. The system according to claim 15, wherein the first memory is packaged on a plurality of plugable memory/directory cards, each card comprising:

a plurality of memory chips including a first subset of memory chips dedicated to holding memory data and a second subset of memory chips dedicated to holding directory data; and wherein the memory port further comprises:

a memory data port including a memory data bus and a memory address bus coupled to the first subset of memory chips; and a directory data port including a directory data bus and a directory address bus coupled to the second subset of memory chips.

20. The system according to claim 19, wherein the ratio of (data space in the first subset of memory chips) to (data space in the second subset of memory chips) on each of the plurality of memory/directory cards is set to a value that is based on a size of the multiprocessor computer system.

21. A method for coupling units in a multiprocessor computer system that includes at least a first node controller, a second node controller, a first plurality of processors operatively coupled to the first node controller, a second plurality of processors operatively coupled to the second node controller, a first memory operatively coupled to the first node controller, a first input/output system operatively coupled to the first node controller, and an interprocessor communications network operatively coupled between the first node controller and the second node controller, wherein the first node controller includes a memory port coupled to the first memory, an input/output port coupled to the input/output system, a plurality of independent processor ports, including a first processor port operatively coupled to a first subset of the first plurality of processors, and a second processor port operatively coupled to a second subset of the first plurality of processors, the method comprising:

transmitting data between the memory port and the first processor port, transmitting data between the memory port and the second processor port, transmitting data between the memory port and the input/output port, and transmitting data between the memory port and the network port.

22. The method according to claim 21, wherein the interprocessor communications network comprises a interprocessor communications channel, and further comprising transmitting data directly between the first node controller and the second node controller that are directly connected to one another by the interprocessor communications channel.

23. The method according to claim 21, wherein the interprocessor communications network comprises a interprocessor communications fabric, and further comprising transmitting data indirectly between the first node controller and the second node controller through the interprocessor communications fabric that is also connected to one or more other node controllers.

24. The method according to claim 21, further comprising:

transmitting data between any two of the memory port, the first processor port, the second processor port, the input/output port and the network port.

25. The method according to claim 21, wherein the transmitting of data between any two of the memory port, the first processor port, the second processor port, the input/output port and the network port is performed in a non-blocking manner such that a plurality of such transmissions occur simultaneously.

26. A multiprocessor computer system comprising:

a plurality of node controllers including a first node controller, wherein each one of the plurality of node controllers includes a memory port and a separate network port and a separate first processor port;

an interprocessor communications network operatively coupled to the network port of each respective one of the plurality of node controllers;

a plurality of processors operatively coupled to the first processor port of each respective one of the plurality of node controllers, including a first plurality of processors operatively coupled to first processor port of the first node controller; and a plurality of separate memories, wherein one or more of the plurality of separate memories is operatively coupled locally to the memory port of each respective one of the plurality of node controllers, including a first memory operatively coupled locally to the memory port of the first node controller;

wherein the first memory is packaged on a plurality of plugable memory/directory cards, each said card comprising:

a plurality of memory chips including a first subset of memory chips dedicated to holding memory data and a second subset of memory chips dedicated to holding directory data; and wherein the memory port of the first node controller further comprises:

a memory data port including a memory data bus and a memory address bus coupled to the first subset of memory chips on each of a plurality of memory/directory cards such that memory data is accessed simultaneously from the plurality of memory cards; and a directory data port including a directory data bus and a directory address bus coupled to the second subset of memory chips on each of the plurality of memory/directory cards such that directory data is accessed simultaneously from a plurality of memory cards independent of memory data accesses.

27. The system according to claim 26, wherein the ratio of (data space in the first subset of memory chips) to (data space in the second subset of memory chips) on each of the plurality of memory/directory cards is set to a value that is based on a size of the multiprocessor computer system.

28. A multiprocessor computer system comprising:

a first node controller;

a second node controller;

a first plurality of processors operatively coupled to the first node controller;

a second plurality of processors operatively coupled to the second node controller;

a first memory operatively coupled to the first node controller;

a first input/output system operatively coupled to the first node controller; and an interprocessor communications network operatively coupled between the first node controller and the second node controller; and wherein the first node controller comprises:

a crossbar unit;

a memory port operatively coupled between the crossbar unit and the first memory;

an input/output port operatively coupled between the crossbar unit and the first input/output system;

a network port operatively coupled between the crossbar unit and the interprocessor communications network; and a plurality of independent processor ports, including a first processor port operatively coupled between the crossbar unit and a first subset of the first plurality of processors, and a second processor port operatively coupled between the crossbar unit and a second subset of the first plurality of processors.

29. The system according to claim 28, wherein the first node controller is fabricated onto a single integrated-circuit chip.

30. The system according to claim 28, wherein the first memory is packaged on a plurality of plugable memory/directory cards, each card comprising:

a plurality of memory chips including a first subset of memory chips dedicated to holding memory data and a second subset of memory chips dedicated to holding directory data; and wherein the memory port further comprises:

a memory data port including a memory data bus and a memory address bus coupled to the first subset of memory chips; and a directory data port including a directory data bus and a directory address bus coupled to the second subset of memory chips.

31. The system according to claim 30, wherein the ratio of (data space in the first subset of memory chips) to (data space in the second subset of memory chips) on each of the plurality of memory/directory cards is set to a value that is based on a size of the multiprocessor computer system.

* * * * *

UNITED STATES PATENT AND TRADEMARK OFFICE
CERTIFICATE OF CORRECTION

PATENT NO. : 6,751,698 B1
DATED : June 15, 2004
INVENTOR(S) : Deneroff et al.

It is certified that error appears in the above-identified patent and that said Letters Patent is hereby corrected as shown below:

<u>Title page,</u>
Item [75], Inventors, delete "San Jose" and insert -- Los Gatos --, therefor; and delete "Swami" and insert -- Swaminathan --, therefor.

Signed and Sealed this

Twenty-eighth Day of September, 2004

JON W. DUDAS
*Director of the United States Patent and Trademark Office*